(12) United States Patent  
Shiomoto et al.

(10) Patent No.: US 7,200,330 B2  
(45) Date of Patent: Apr. 3, 2007

(54) OPTICAL DYNAMIC BURST SWITCH

(75) Inventors: Kohei Shiomoto, Iruma (JP); Naoaki Yamanaka, Tokyo (JP); Eiji Oki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 781 days.

(21) Appl. No.: 10/285,388

(22) Filed: Oct. 31, 2002

(65) Prior Publication Data

US 2003/0128981 A1 Jul. 10, 2003

(30) Foreign Application Priority Data

| Nov. 2, 2001 | (JP) | 2001-337587 |
| Nov. 2, 2001 | (JP) | 2001-337590 |
| Nov. 2, 2001 | (JP) | 2001-337601 |
| Nov. 2, 2001 | (JP) | 2001-337891 |
| Nov. 2, 2001 | (JP) | 2001-338050 |
| Mar. 6, 2002 | (JP) | 2002-060102 |
| Mar. 6, 2002 | (JP) | 2002-060119 |
| Mar. 6, 2002 | (JP) | 2002-060127 |

(51) Int. Cl.
*H04J 14/00* (2006.01)

(52) U.S. Cl. .................. 398/51; 398/50; 398/54; 398/56

(58) Field of Classification Search .......... 398/45, 398/50, 51, 56, 54
See application file for complete search history.

(56) References Cited

U.S. PATENT DOCUMENTS

| 6,519,062 B1* | 2/2003 | Yoo ............................. 398/49 |
| 6,522,435 B1* | 2/2003 | Chang et al. ................ 398/49 |
| 6,665,495 B1* | 12/2003 | Miles et al. .................. 398/54 |
| 6,671,256 B1* | 12/2003 | Xiong et al. ................. 370/230 |
| 6,678,474 B1* | 1/2004 | Masuda et al. ............... 398/75 |
| 6,763,192 B1* | 7/2004 | Jagannathan ................. 398/54 |
| 6,772,219 B1* | 8/2004 | Shobatake ................... 709/238 |
| 6,898,205 B1* | 5/2005 | Chaskar et al. ............. 370/450 |

(Continued)

FOREIGN PATENT DOCUMENTS

EP 0 883 266 A2 12/1998

(Continued)

OTHER PUBLICATIONS

Daniel J. Blumenthal et al. (All-Optical Lable Swapping Networks and Technologies, Journal of lightwave technology, vol. 18, No. 12, Dec. 2000).*

Daisaki Shimazaki et al., "A moving virtual source scheme in optical burst switching networks", Technical Report of IEICE, The Institute of Electronics, Information and Communication Engineers, Sep. 2001, pp. 31-36.

K. Shiomoto et al., U.S. Appl. No. 10/284,744, filed Oct. 31, 2002, entitled "Optical Dynamic Burst Switch".

K. Shiomoto et al., U.S. Appl. No. 10/285,300, filed Oct. 31, 2002, entitled "Optical Dynamic Burst Switch".

*Primary Examiner*—M. R. Sedighian
(74) *Attorney, Agent, or Firm*—Darby & Darby

(57) ABSTRACT

The present invention relates to a node which is used in the structure of an optical communication network. This node has a signal transmission function for performing data transfer and a signal receiving function for performing data signal reception, and includes a unit for establishing and releasing a cut through path to a next stage node. Moreover, it includes a unit for detecting the arrival of a leading packet of burst data, and the unit for establishing and releasing the cut through path includes a unit for establishing a cut through path to the next stage node, when the arrival of a leading packet of burst data is detected by the leading packet arrival detection unit.

58 Claims, 59 Drawing Sheets

U.S. PATENT DOCUMENTS

| | | | |
|---|---|---|---|
| 6,907,002 B2 * | 6/2005 | Beshai et al. | 370/230 |
| 6,956,868 B2 * | 10/2005 | Qiao | 370/466 |
| 6,963,564 B1 * | 11/2005 | Liu | 370/389 |
| 2001/0017866 A1 * | 8/2001 | Takada et al. | 370/535 |
| 2002/0057474 A1 * | 5/2002 | Boroditsky et al. | 359/119 |
| 2002/0109878 A1 * | 8/2002 | Qiao | 359/118 |
| 2002/0109879 A1 * | 8/2002 | Wing So | 359/118 |
| 2002/0186433 A1 * | 12/2002 | Mishra | 359/128 |

FOREIGN PATENT DOCUMENTS

| | | |
|---|---|---|
| EP | 1 073 307 A2 | 1/2001 |
| JP | 03-195235 A1 | 8/1991 |
| JP | 06-244867 A1 | 9/1994 |
| JP | 08-317050 A1 | 11/1996 |
| JP | 09-172457 A1 | 6/1997 |
| JP | 09-270822 A1 | 10/1997 |
| JP | 10-111847 A1 | 4/1998 |
| JP | 11-017679 A1 | 1/1999 |
| JP | 2000-138684 A1 | 5/2000 |
| JP | 2000-261478 A1 | 9/2000 |
| JP | 2000-324162 | 11/2000 |
| JP | 2001-045052 A1 | 2/2001 |
| JP | 2001-086125 A1 | 3/2001 |
| JP | 2001-136178 A1 | 5/2001 |
| JP | 2001-308917 A1 | 11/2001 |
| JP | 2002-044125 A1 | 2/2002 |
| WO | 01/84875 | 11/2001 |

* cited by examiner

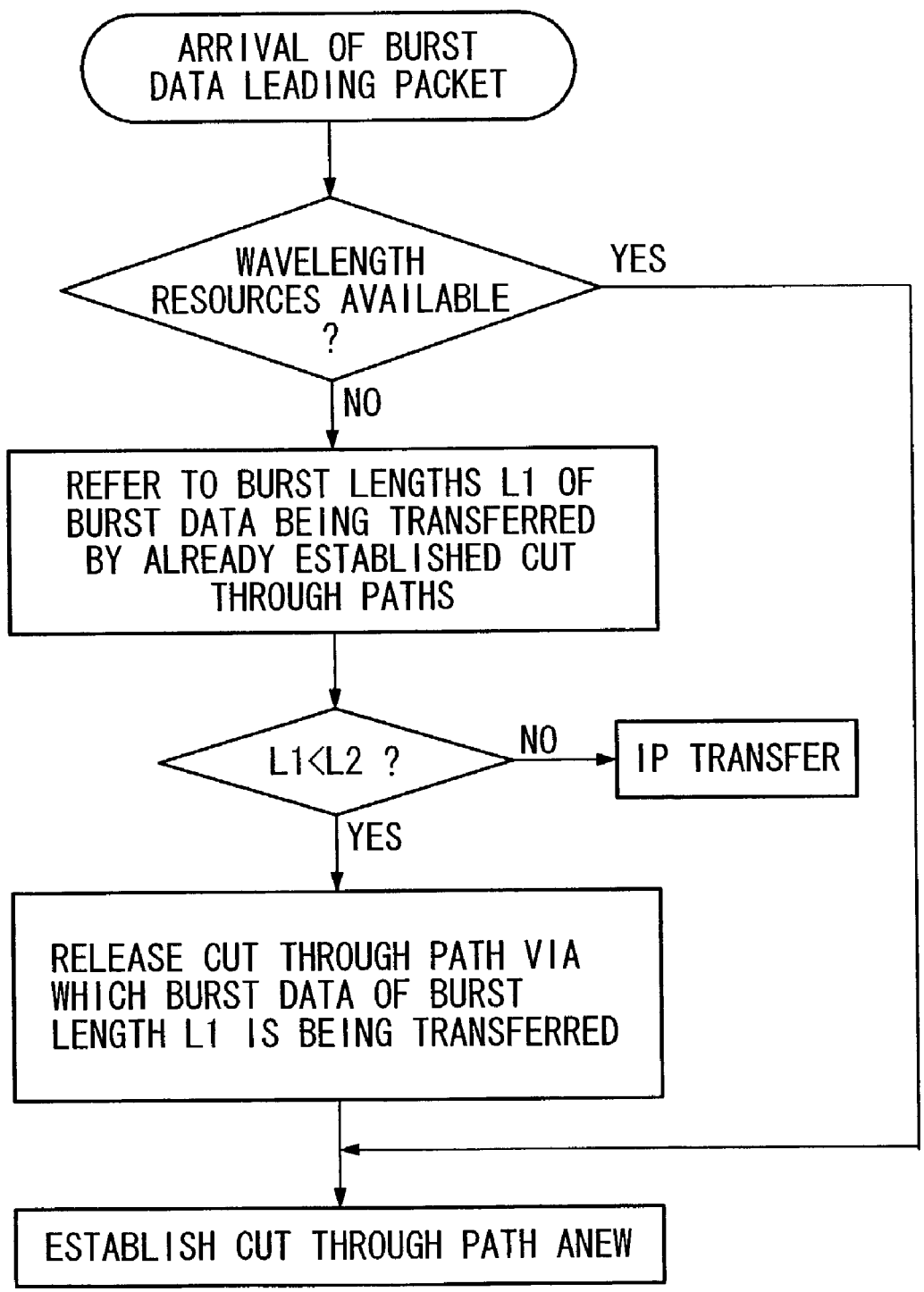

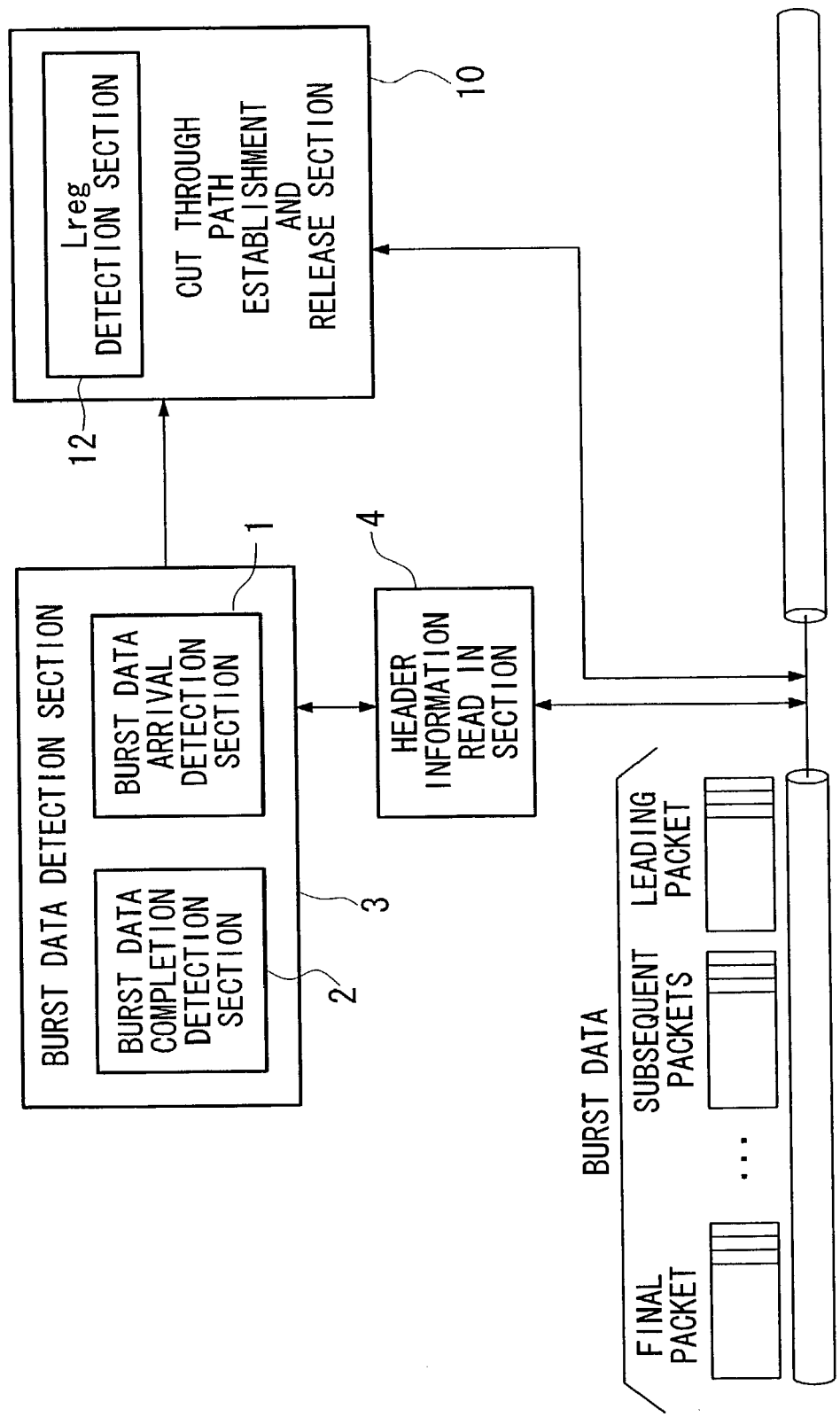

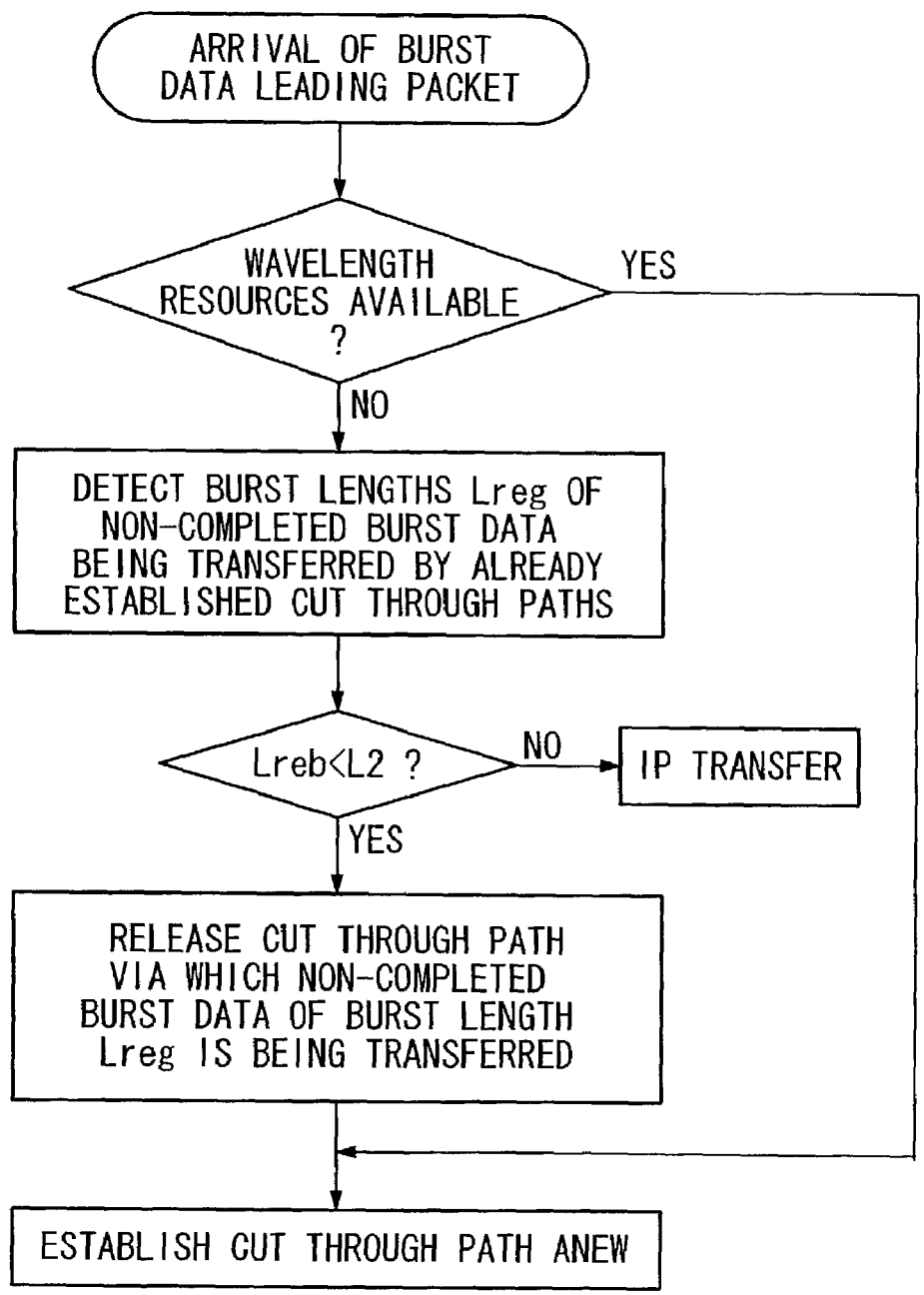

(TRANSMITTED BY DATA TRANSFER SOURCE)

(TRANSMITTED BY ENROUTE NODE A)

SUBSEQUENT PACKET (TRANSMITTED BY DATA TRANSFER SOURCE)

LEADING PACKET (TRANSMITTED BY ENROUTE NODE A)

LEADING PACKET

SUBSEQUENT PACKET

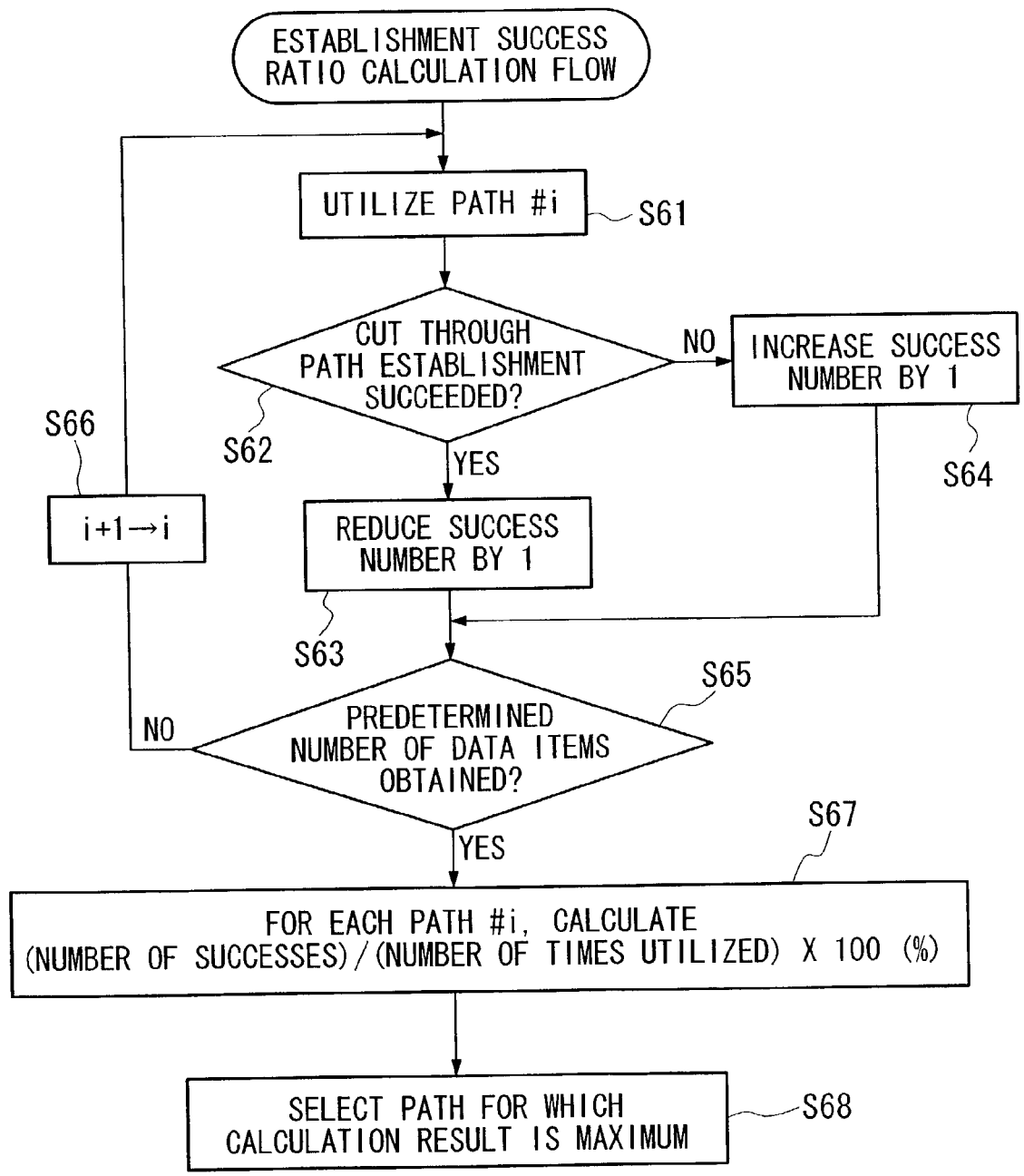

OPTICAL DYNAMIC BURST SWITCH

BACKGROUND OF THE INVENTION

1. Field of the Invention

The present invention relates to a node (an optical dynamic burst switch) which takes advantage of optical communication, and which is included in an optical communication network which uses optical wavelengths as a communication medium for burst data transfer.

This application is based on patent applications Nos. 2001-337587, 2001-337590, 2001-337601, 2001-337891, 2001-338050, 2002-060102, 2002-060119, and 2002-060127 filed in Japan, the contents of which are incorporated herein by reference.

2. Description of the Related Art

In data transfer by an IP (Internet Protocol) network, a router which acts as a node reads in the header information of an IP packet, and transfers that IP packet along a path to its destination. This is performed repeatedly between a plurality of nodes, and as a result the IP packet makes its way to the desired destination. With this type of transfer method for an IP packet it becomes necessary to read in the header information of each individual IP packet, since the transfer is performed in individual IP packet units.

On the other hand, recently, the demand has abruptly increased for high capacity transfer of consecutive data such as moving image data and the like. This type of consecutive high capacity data is termed 'burst data', and it is accommodated by being divided into a large number of IP packets. Since to perform transfer by individual IP packet units is inefficient for this type of burst data transfer, a cut through path is established between specified nodes, and the data transfer is performed in one stroke with this cut through path, without reading in the header information of the IP packets. In particular, it is effective to perform data transfer in this manner by using optical path.

That is, with data transfer using optical path upon a transmission path between nodes, at each node, the optical signal which has arrived after having been transmitted by optical path is temporarily converted to an electrical signal, and the header information of the IP packet is read in, and, after its destination path has been decided upon, the procedure of again converting it into an optical signal and again transmitting it to the optical path becomes necessary. By contrast to this, with data transfer using a cut through path according to wavelength path, there is no necessity to convert the optical signal to an electrical signal in order to read in the header information, and it is possible to perform burst data transfer with extremely good efficiency, since it is possible to transfer the optical signal just as it is from the start point of the cut through path until its end point.

With this type of conventional optical communication, when transferring burst data using a cut through path, it is necessary to set and fix the cut through path in advance. In order to set the cut through path in advance in this manner, a request to the effect that it is desired to establish a cut through path is made to each of the routers en route from the starting point to the end point, and the establishment of the cut through path in advance for the first time is completed by each of the routers responding to this request.

At this time, when trying to establish the settings for each of the routers for the cut through path, first, the header information of the optical IP packet which has arrived is converted into an electrical signal, and then the fact is read in as to whether or not information which corresponds to an establishment request for a cut through path is included within this header information; and, if such an establishment request is included, a wavelength is selected for cut through path establishment, and when the wavelength has been selected the cut through path establishment is actually performed. And, since it is not necessary to read in the header information of the IP packets any longer for the wavelength which has been set for the cut through path, these IP packets should be transferred as optical signals just as they are, and setting changes are performed for discriminating them from other wavelengths and handling them.

However, it requires quite a lot of time for this type of setting procedure. For example, 2t may be required for establishment the cut through path. And, if 3t is required for the transfer of the burst data using this cut through path, therefore a total of 5t is required from the establishment of the cut through path until the burst data transfer has been completed. In this example, almost half of the time period of 5t which is used for the burst data transfer is employed for establishing the cut through path. If it were possible to allot to the data transfer itself the time period which is required for establishing the cut through path in advance in this way, it would be possible to anticipate a substantial enhancement of data transfer efficiency.

Furthermore, as has been described above, in order to establish the cut through path, a request for establishing the cut through path is transmitted from the node upon the transmission side (an edge node or the like upon the transmission side) towards the node upon the receiving side (an edge node or the like upon the reception side). The request packet which contains this request is an IP packet, and it reaches the node upon the receiving side while its header information is read in by each node. If due to insufficiency of network resources or the like a problem arises with establishing the cut through path during this process, a signal which conveys the information that this has happened is transmitted towards the node upon the transmission side. When this is received at the node upon the transmission side, either the establishment of the cut through path is retried, or the process is discarded.

Furthermore, although it is desirable for the cut through path to be linked together into a single unit from the node upon the transmission side to the node upon the reception side, it may happen, depending upon the distance between the node upon the transmission side and the node upon the reception side, that deterioration of the signal quality due to loss and crosstalk upon the optical signal becomes conspicuous, in which case 3R (Reshaping, Retiming, Regenerating) processing may become necessary at one node or another, so that it becomes necessary to perform calculations in order to determine whether or not, and at which node or nodes, 3R processing should be performed.

Although in this manner a cut through path is itself most suitable for burst data transfer, it is necessary for the user who is the source of data transmission to establish the cut through path while ensuring network resources in consideration of the amount of data which he himself will attempt to transmit from now on, and there is the problem that labor and a certain time period are required for this establishment procedure.

Furthermore although, after the establishment of the cut through path has succeeded and the burst data transfer has been performed, release of this cut through path should be performed, actual release of the cut through path is not performed unless the user who is the source of data transmission transmits a release request, and the possibility is not excluded that invalid retention of a cut through path may occur.

In addition, in the conventional technology, the path over which the node upon the transmission side transmits the burst data is determined as being a particular one according to a predetermined policy. For example, if the path selection is based upon a policy of "the shortest path is taken as the most suitable path", then the burst data is transmitted over that path for which the distance between the node upon the transmission side and the node upon the reception side is the shortest. And it is decided whether or not it is possible to ensure resources at the relay nodes upon this path.

In this manner, according to the conventional technology, it is attempted to ensure resources upon the single path which has been decided upon according to the predetermined policy, and if there is a difficulty with this ensuring of resources, even if the node upon the transmission side performs a retry, this retry will be performed for the same path as before.

In addition, although the cut through path may be the most suitable one for burst data transfer using wavelength path, during transmission the signal quality of the optical signal may deteriorate due to various factors. Accordingly, the length of a cut through path for which signal transmission without performing 3R processing is possible is inevitably limited.

In the prior act, the points at which 3R processing is to be performed are determined by calculation. In this conventional calculation for determining the points at which 3R processing is to be performed, there are two points at which problems arise. First, the factors which cause deterioration of the signal quality are various, and a large amount of data processing becomes necessary in order to perform the calculations, in consideration of these large number of factors. Accordingly, the time period required for these calculations also becomes long; this is the first problematical point. Secondly, the reliability of the results which are obtained by this type of calculation is not necessarily high, and, for safety in practice, countermeasures such as the provision of extra 3R processing points and the like are necessary, and there is the problematical point that this is not desirable from the point of view of planning in order effectively to take advantage of network resources.

SUMMARY OF THE INVENTION

A primary objective of the present invention is to provide a node, a program, and a recording medium which are ones which operate against this type of background, and with which it is not necessary to establish the cut through path in advance, so that it is possible to perform burst data transfer at high efficiency; and with which, furthermore, the labor and time required for establishing the cut through path and also the number of invalid retentions are reduced, and with which, furthermore, the buffer capacity which is required can be reduced.

A further objective of the present invention is to provide a node, a program, and a recording medium which are ones which operate against this type of background, and with which a plurality of paths are set up as path candidates for ensuring resources, and it is possible to increase the success ratio of cut through path establishment and to provide quick cut through path establishment and effective exploitation of network resources, by performing ensuring of resources based upon the policy that it will be acceptable if the ensuring of resources for any one among the path candidates is successful.

A yet further objective of the present invention is to provide a node, an optical path network, a program, and a recording medium which are ones which operate against this type of background, and with which, along with it being possible to reduce the labor and the time period which are required for determining the points at which 3R processing is to be performed, it is also made possible to specify their positions accurately, so that it is possible to anticipate effective exploitation of network resources.

In this specification, the node on the side which, before data transfer, transmits a request for establishing a path is termed "the node upon the transmission side", and the node which is the final terminating point for this request is termed "the node upon the reception side". During the data transfer after establishment of the path, either one of the node upon the transmission side or the node upon the reception side can become the source from which data is generated or the destination for data signal reception. Furthermore, the path which has been established may be a unidirectional path, or may be a bi-directional path.

The present invention is distinguished by the feature that the cut through path is not established in advance before the transfer of burst data, but rather, by detecting the leading packet of this burst data at the time point that the burst data arrives, establishment of the cut through path is performed sequentially for each node. By doing this, as compared to the case of establishing a cut through path in advance, the time period required for establishment is shortened, and it is possible to perform burst data transfer at high efficiency.

In detail, the node according to the present invention comprises a unit for detecting the arrival of a leading packet of burst data, and the unit for establishing and releasing the cut through path comprises a unit for establishing a cut through path from the transmission side edge node or the relay node to the next stage node, when the arrival of a leading packet of burst data is detected by the leading packet arrival detection unit.

By doing this, it is not necessary to establish the cut through path in advance, and accordingly it is possible to perform the burst data transfer at high efficiency.

Furthermore, the node according to the present invention may desirably comprise a unit for detecting the arrival of a final packet of burst data, and the unit for establishing and releasing a cut through path may comprise a unit for, when the arrival of a final packet of burst data has been detected by the final packet arrival detection unit, releasing a cut through path which is established with the transmission side edge node, the relay node, or the reception side edge node, after the passage of the final packet.

By doing this, cut through paths which are no longer in use are released quickly, so that it is possible to take advantage quickly and effectively of the wavelength which was being occupied by the cut through path.

It is desirable, with the node of the present invention, for subsequent burst data amount information to be written in leading packet as header information, and for the leading packet arrival detection unit to comprise a burst data leading packet arrival detection unit which refers to this subsequent burst data amount information.

This burst data amount information, for example, may be packet number information for the packets subsequent to the leading packet, or may be packet length information. For example, if the packets which make up the burst data are fixed length packets, it is possible to know the amount of the burst data from information which specifies the number of subsequent packets. Furthermore, if the packets which make up the burst data are variable length packets, it is possible to know the amount of the burst data from the information which specifies the length of the subsequent packets.

With the node according to the present invention, desirably, a threshold value may be set for the packet number information or the packet length information, and the burst data leading packet arrival detection unit may comprise a unit which compares together the packet number information or the packet length information and the threshold value, and, if the packet number information or the packet length information is greater than the threshold value, detects the packet as a leading packet of burst data.

Here, the node according to the present invention may comprise a unit for collecting together processing load information, and also a unit which sets the threshold value adaptively according to a relationship between this processing load information which has been collected together by the collection together unit, and a target value for processing load which is set in advance.

By doing this, along with making the most effective use of bandwidth resources, it is possible to perform network administration at high efficiency by bringing the processing load at each node near to its target value.

Furthermore, with the node according to the present invention, a data base in which the circumstances of use of optical wavelengths are recorded may be provided, and: the establishment unit may comprise a unit for referring to the data base and establishing a cut through path via an optical wavelength which is not in use, and updating in the data base to 'in use' the circumstances of use of the optical wavelength which was used; and the unit for releasing the cut through path after the passage of the final packet may comprise a unit for updating in the data base to 'vacant' the circumstances of use of the optical wavelength which has been released after the release of the cut through path.

By doing this, it is possible to shorten the time period which is required for selecting a wavelength, since it is possible for each node to recognize wavelength information relating to possible establishment of a cut through path.

The establishment unit may desirably comprise: a unit for retaining burst data amount information for burst data being transferred by cut through paths which are already established; a unit for, if wavelength resources are not available for newly establishing a cut through path for transferring burst data which has newly arrived, referring to the burst data amount information for the burst data which is being transferred by cut through paths which are already established, which is being retained in the retaining unit; and a unit for establishing a cut through path for transferring the newly arrived burst data by comparing together the result of referring to the referring unit, and the burst data amount information for the burst data which has newly arrived, and releasing one or another of the cut through paths through which is being transferred burst data of a smaller burst data amount than the burst data amount of the burst data which has newly arrived.

Or, the establishment unit may comprise a unit for, if wavelength resources are not available for newly establishing a cut through path for transferring burst data which has newly arrived, detecting the not yet transferred burst data amount of burst data being transferred by cut through paths which are already established; and a unit for establishing a cut through path for transferring the burst data which has newly arrived by releasing one or another of the cut through paths through which is being transferred burst data of which the not yet transferred burst data amount, according to the result of detection by the detection unit, is smaller than the burst data amount which is obtained by referring to the burst data amount information of the burst data which has newly arrived.

According to this structure, if wavelength resources are not available for newly establishing a cut through path, and if burst data has newly arrived, it is possible to re-scrutinize the circumstances of use of the already established cut through paths, and it can be decided whether or not to perform the transfer of the burst data which has newly arrived by establishment afresh of a cut through path would be most efficient from the point of view of the optical communication network as a whole; and, if it is decided that to do so would provide greater efficiency, such a change over of cut through path is executed.

Furthermore, it is possible for path information for establishing a cut through path to be written in advance into the leading packet, and for the data transfer source to select a desired path. Furthermore, it is possible to shorten the time period which is required for establishment of a cut through path by doing this, without it being necessary to retrieve the IP routing table for each node.

In this connection, the node according to the present invention comprises a unit for detecting the arrival of a leading packet of burst data, and, in this leading packet, path information is written in advance for establishing a cut through path from the transmission side edge node to the reception side edge node, and the cut through path establishment and release unit comprises a unit for establishing a cut through path from the transmission side edge node or the relay node to a next stage node, when the arrival of a leading packet of burst data is detected by the leading packet arrival detection unit, by referring to the path information; and this establishment unit comprises a unit for sequentially deleting the portion of the path information which has been used for establishing the cut through path to the next stage node.

This path information may be, for example, wavelength information; or it may be address information for each node upon the network.

In this manner, it is possible to select the path desired by the data transfer source by writing the path information in advance into the leading packet of burst data. Furthermore it is possible to shorten the time period which is required for establishing the cut through path, since it is not necessary to retrieve the IP routing table at each node.

If such path information is written in advance into the leading packet, it is possible for the node according to the present invention to comprise, for example, a unit for collecting together network topology information; and in this case: respective units are provided for notifying to the collection unit, wavelength resource information which they retain; a unit is provided for writing the path information into a leading packet; and this writing in unit comprises a unit for referring to wavelength resource information for each node which has been collected together by the collecting unit and generating the path information. By doing this, it is possible to collect together the path information by providing, so to speak, an operator system which manages the entire optical communication network on a supervisory basis.

Or, with such path information being written in advance into the leading packet, it is possible for the node according to the present invention to comprise respective units for mutually notifying to one another wavelength resource information which they retain, and a unit for writing the path information into a leading packet, with this writing in unit comprising a unit for referring to wavelength resource information for each node which is retained by the transmission side edge node and generating the path information.

By doing this, it is possible for each node to collect together the path information in an autonomous distributed manner.

And the present invention is distinguished in that the cut through path is not established in advance before the burst data transfer, but rather, at the time point that the burst data arrives at the transmission side edge node, by the leading packet of this burst data being detected, the transmission side edge node establishes a cut through path. At this time, the burst data is temporarily accumulated in the transmission side edge node until the establishment of the cut through path from the transmission side edge node to the reception side edge node is completed, and the burst data which has thus been accumulated is transferred to the reception side edge node at the time point that the establishment of the cut through path is completed.

With the node according to the present invention, a unit for detecting the arrival of a leading packet of burst data is provided, and the unit for establishing and releasing the cut through path comprises a unit for establishing a cut through path to the next stage node, when the arrival of a leading packet of burst data is detected by the leading packet arrival detection unit; and there are provided a unit for temporarily accumulating burst data which arrives until the establishment of the cut through path by this establishment unit has been completed, and a unit for transferring to the next stage node, using the cut through path, the burst data which has been temporarily accumulated, when the establishment of the cut through path by this establishment unit has been completed.

By doing this, the time period required for establishing the cut through path is shortened as compared with the case in which the cut through path is established in advance, and it is possible to perform burst data transfer at high efficiency. Furthermore, by not performing the burst data transfer until the establishment of the cut through path to the next stage node has been completed, it is possible to simplify the control procedure for resending processing and the like in the event of failure partway through establishment of the cut through path. Yet further, since the burst data is temporarily accumulated, during this interval, it is possible to establish the cut through path by selecting the route which can make most economical use of the resources of the optical network.

It is desirable, if the transfer speed between a first node and a second node is termed v1, the transfer speed between a third node and a fourth node is termed v2, and the transfer speed between the second node and the fourth node is termed v3, for, if a communication path is used which is made up from the second node and the fourth node for which v1≦v3 and moreover v2≦v3, the temporary accumulation unit to be comprised in the second node.

In other words, if the data transfer speed from the first node to the second node is very much delayed as compared with the data transfer speed upon the optical network, even if the transfer of burst data is waited for during the time interval from the arrival of the leading packet of burst data to the establishment of the cut through path, the establishment of the cut through path is already completed at the time point when the data transfer source has completed the transmission of the final packet of burst data, so that, if the transfer of the burst data is started with the transmission side edge node as the data transfer source, no problem arises as to whether or not temporarily the burst data has been waited for.

Furthermore, if the data transfer speed from the third node to the fourth node is very much slower as compared with the data transfer speed upon the optical network, then, if the burst data which was being awaited this time reaches the second node during the interval while the third node is receiving the burst data which was transferred to the fourth node the time before, no problem arises, whether or not the burst data was being waited for temporarily at the second node as a data transfer destination.

In this manner, by applying the present invention as limited to a communication path which satisfies the above described conditions, it is possible to implement burst data transfer with almost no awareness at the data transfer source and the data transfer destination of the residence time of the burst data.

Moreover the present invention is distinguished by the fact that the cut through path is not established in advance before the burst data transfer, but rather, at the time point that the burst data arrives, when each node sequentially establishes a cut through path by the leading packet of this burst data being detected, if partway through a node exists at which it is impossible to establish a cut through path, then temporarily the burst data is accumulated at this node, and the burst data is again transmitted at the time point that it becomes possible to establish a cut through path. By doing this, the time period required to establish the cut through path is shortened in comparison to the case in which the cut through path is established in advance, and it is possible to perform burst data transfer at high efficiency.

Here, with the node according to the present invention, a unit for detecting the arrival of a leading packet of burst data is provided, and the unit for establishing and releasing the cut through path comprises: a unit for establishing a cut through path to the next stage node, when the arrival of a leading packet of burst data is detected by the leading packet arrival detection unit; a unit for, when the establishment of a cut through path by this establishment unit is impossible, accumulating the burst data which arrives at the node at which this establishment has become impossible for a predetermined time period; and a unit for, when within the predetermined time period the establishment of a cut through path by the establishment unit has been successful, transferring to the next stage node the burst data which has accumulated in the unit for accumulating the burst data for the predetermined time period, using the cut through path.

By doing this, when sequentially establishing a cut through path by node interval units, even if a block is generated, it is possible to evade it. Accordingly it is possible to perform burst data transfer at high efficiency, by establishing a cut through path as circumstances demand.

And the present invention is distinguished by the fact that the cut through path is not established in advance before the burst data transfer, but rather, at the time point that the burst data arrives, by the leading packet of this burst data being detected, each node sequentially establishes a cut through path. By doing this, the time period required to establish the cut through path is shortened in comparison to the case in which the cut through path is established in advance, and it is possible to perform burst data transfer at high efficiency.

Furthermore, if subsequent burst data is transmitted directly after transmission of the leading packet, since a delay is experienced if the burst data is transmitted in the state in which the cut through path is not yet established, which is undesirable, and in the worst case the situation may arise that the burst data is discarded, therefore the present invention is distinguished by the fact that the burst data transfer is started after interposing a predetermined time period between the leading packet and the packets subsequent to it.

This predetermined delay time period may be made to be a time period which is equivalent to the sum of the cut through path establishment processing time periods for the plurality of relay nodes enroute in the interval from the transmission side edge node to the reception side edge node It should be understood that it is not absolutely necessary to calculate the sum of these cut through path establishment processing time periods in real time; the use of statistical information from the past will be acceptable. Furthermore it will also be acceptable for the cut through path not to be one determined by the relay nodes en route, but to be an anticipated path. By doing this, it is possible to relax the severity by which the burst data subsequent to the leading packet transmitted from the transmission side edge node experiences a delay or is discarded, and it is possible to set the delay time period between the time instant that the leading packet is transmitted and the time instant that the subsequent burst data is transmitted to the most suitable value. Furthermore, by doing this, it is possible to manage with a smaller buffer capacity for the relay nodes.

Here, with the node according to the present invention, a unit for detecting the arrival of a leading packet of burst data is provided, and the unit for establishing and releasing the cut through path comprises a unit for establishing a cut through path to the next stage node, when the arrival of a leading packet of burst data is detected by the leading packet arrival detection unit; and the transmission side edge node comprises a unit for delaying the transmission of burst data following the leading packet by the sum total of the cut through path establishment processing time periods at that plurality of the relay nodes which it is predicted, by leading packets which it transmits itself, that the cut through path which is established will pass through.

The present invention is distinguished by the fact that it is not necessary to establish a cut through path before the transfer of burst data. Furthermore, the present invention is distinguished by the fact that the release of the cut through path is performed quickly after the burst data transfer has been completed. Yet further, the present invention is distinguished by the fact that it is not necessary to calculate the points at which 3R processing becomes necessary in advance. Due to this, it is possible to reduce the labor and time required for establishing the cut through path, and also to reduce the amount of invalid cut through path retentions.

And the present invention is distinguished by the fact that the cut through path is not established in advance before the burst data transfer, but rather establishment of the cut through path is performed along with the data transfer as far as possible, and the system switches over to IP transfer at the time point that a problem arises with establishing the cut through path. By doing this, the present invention is distinguished by the fact that the cut through path establishment is not performed before the transfer of burst data, and accordingly it is possible to reduce the labor and the time period which are required for establishing the cut through path.

For example, it is possible for subsequent burst data amount information to be written in the leading packet as header information, and for the leading packet arrival detection unit to comprise a burst data leading packet arrival detection unit which refers to this subsequent burst data amount information. At this time, for example, the burst data amount information may be packet number information or packet length information for packets subsequent to the leading packet.

Furthermore, for example, information which indicates that the packet is the final packet of burst data may be written as header information into the final packet, and the final packet arrival detection unit may comprise a unit for detecting the final packet of burst data by referring to this information which indicates that this is the final packet.

The present invention is distinguished by the fact that, by doing this, it is possible quickly to perform release of the cut through path when the transfer of the burst data has been completed, so that it is possible to reduce invalid cut through path retentions.

The unit for determining whether or not establishment is possible may comprise, for example, a unit for determining whether or not a vacant wavelength is available for establishing a cut through path to the next stage node, for determining the difference between the permissible transfer speed up to this node itself and the permissible transfer speed to the next stage node, and for determining the signal quality of the burst data.

When burst data, for which it has been determined by the unit for determining whether or not establishment is possible that establishment of a cut through path is not possible because the permissible transfer speed to the next stage node is smaller than the permissible transfer speed up to this node itself, is accumulated in the temporary accumulation unit, the unit for establishing a cut through path may comprise a unit for establishing a cut through path at a permissible transfer speed to the next stage node, and may further comprise a unit for transferring to the next stage node, using the cut through path, the burst data which has been accumulated in the temporary accumulation unit while performing rate conversion upon the burst data in order to bring it equivalent to the permissible transfer speed to the next stage node.

By doing this, it is possible to perform burst data transfer at high efficiency by changing over between a plurality of cut through paths whose transfer speeds are different.

The unit for establishing a cut through path at the permissible transfer speed to the next stage node may comprise a unit for establishing a plurality of cut through paths to the next stage node, and may further comprise a unit for transferring the burst data which has been accumulated in the temporary accumulation unit to the next stage node while dispersing it almost uniformly among the plurality of cut through paths.

By doing this, it is possible to compensate for the lowering of the transfer speed when changing over from a cut through path whose transfer speed is high to a plurality of cut through paths whose transfer speeds are low, by using this plurality of cut through paths whose transfer speeds are low in parallel.

Furthermore, the node according to the present invention may comprise a unit for, when it has been determined by the unit for determining whether or not establishment is possible that it is impossible to establish a cut through path because of deterioration of the signal quality of the leading packet of burst data which has arrived, notifying this fact to the preceding stage node, and may further comprise a unit for performing 3R (Reshaping, Retiming, Regenerating) processing of burst data which arrives, according to notification by this notification unit.

By doing this, it becomes unnecessary to calculate in advance the points at which 3R processing is to be performed, and it is sufficient to perform 3R processing at the time point that deterioration in the signal quality occurs, so that it is possible to reduce the labor and the time period which are required for establishing the cut through path.

When a next stage node is a node which is included in the most suitable route for transfer of the burst data, and it has been determined by the unit for determining whether or not establishment is possible that it is impossible to establish a cut through path because no vacant wavelength is available for establishing a cut through path to this next stage node, the unit for establishing a cut through path may comprise a unit for establishing a cut through path by substituting for the next stage node, as the node, a neighboring node which has a vacant wavelength for establishing a cut through path, irrespective of whether or not it is included upon the most suitable route.

For example, when the most suitable route is the shortest route, based upon the consideration that it is best to perform the transfer of burst data with a cut through path even if it is somewhat circuitous, finally, the cut through path is established via a neighboring node for which it is possible to establish such a cut through path. By doing this, it is possible to keep the possibility of interrupting the cut through path partway along it low.

When a next stage node is a node which is included in the most suitable route for transfer of the burst data, and it has been determined by the unit for determining whether or not establishment is possible that it is impossible to establish a cut through path because no vacant wavelength is available for establishing a cut through path to this next stage node, a unit may be provided for notifying the preceding stage node of this fact, and the unit for establishing and releasing a cut through path of the preceding stage node which has received notification by the notification unit may comprise a unit for establishing a cut through path by substituting for the next stage node, as the node, a neighboring node which has a vacant wavelength for establishing a cut through path, irrespective of whether or not it is included upon the most suitable route.

In other words, since it has been decided that it is impossible to establish a cut through path because no vacant wavelength is available, and accordingly there is a possibility of this node falling into a state of congestion, when it has been decided that it is impossible to establish a cut through path because no vacant wavelength is available, the system returns to the preceding stage node and attempts to establish a cut through path from there onward, based upon the concept that it will be easier to establish a cut through path by returning to the node one previous and newly obtaining, from there, a node to become the next stage. This procedure will be acceptable even if this cut through path is not included in the most suitable route.

When no vacant wavelength is available for establishing a cut through path to a next stage node, and it has been determined by the unit for determining whether or not establishment is possible that it is impossible to establish a cut through path, and the individual packets which make up the burst data are transferred individually according to IP address by the IP transfer unit, a unit may be provided for storing cut through path request information which conveys indicates that it is really wished to transfer the packets making up the burst data which are being transferred individually according to the IP address by a cut through path; and the cut through path establishment unit may comprise a unit for: when a vacant wavelength for establishing a cut through path to the next stage node appears, and the decision result of the unit for determining whether or not establishment is possible transits from the decision that it is impossible to establish such cut through path to the decision that it is possible, establishing a cut through path for cut through transfer from partway through the burst data which is being transferred as individual packets according to the IP address, according to the cut through request information which is stored in the storage unit.

In other words, for a burst data transfer for which a cut through path has been blocked partway through and has accordingly never been established, so that the burst data transfer is being performed by IP transfer, cut through request information to the effect that it is wished to change over from IP transfer to cut through path transfer is recorded, and, at the time point that establishment of a cut through path actually becomes possible, it is possible to perform the changeover from IP transfer to cut through path transfer.

Furthermore, according to the present invention, in order to make large the proportion of occupation of the intervals using cut through paths upon the path between the node upon the transmission side and the node upon the reception side, a plurality of paths are established between the node upon the transmission side and the node upon the reception side, statistical information is taken related to the occupation proportion of intervals using cut through paths from among this plurality of paths, and that path is selected for which the occupation proportion of intervals using cut through paths is the greatest.

It should be noted that, when a plurality of path candidates have been established between the node upon the transmission side and the node upon the reception side, some policy is established, for example, when a plurality of path candidates of equal length are present, for selecting a plurality of path candidates whose distance is the shortest; or, when a plurality of path candidates whose lengths are different are present, for selecting a plurality of path candidates in sequence from that path candidate whose length is the shortest; or the like.

In other words, one aspect of the present invention is an optical path network, distinguished in that there are provided: a node upon the transmission side, a node upon the reception side, and relay nodes which are arranged upon paths between the node upon the transmission side and the node upon the reception side; and these relay nodes include unit for establishing optical paths according to the IP addresses of the IP packets which arrive; and the unit which establishes these optical paths includes a unit for detecting the arrival of a leading packet of burst data, a cut through path establishment unit which establishes a cut through path to the next stage relay node when it has been detected by this detection unit that a leading packet of burst data has arrived, a unit for detecting the arrival of a final packet of burst data, and a cut through path release unit for releasing a cut through path after the passage of the final packet, when the arrival of the final packet of burst data has been detected by this detection unit; while the cut through path establishment unit includes a unit for deciding whether or not it is possible to establish a cut through path up to the relay node at the next stage, a unit for notifying the result of this decision by this decision unit to the node upon the transmission side, a unit for temporarily accumulating the burst data which arrives when the result of this decision by this decision unit is that it is impossible to establish a cut through path, and an IP transfer unit for transferring the individual packets which make up the burst data which has been accumulated in this temporary accumulation unit individually according to their IP addresses; furthermore, a plurality of paths are established in advance between the node upon the transmission side and the node upon the reception side; and the node upon the reception side includes a unit for calculating the respective success ratios for establishment of these cut through paths by the cut through path establishment unit according to the results of the decisions notified by the notification unit relating to the plurality of paths, and a unit for transmitting burst data upon the path for which the cut through path establishment success ratio is the highest, according to the results of calculation by the calculating unit.

That is, an optical path network is provided with which, if the node according to the present invention is used as a relay node, when the arrival of a leading packet of burst data has been detected, a cut through path is established to the next stage node, and, when the arrival of a final packet of burst data is detected, the cut through path which is already established is released after the passage of this final packet, and at this time a decision is made as to whether or not a cut through path can be established to the next stage relay node, the result of this decision is notified to the node upon the transmission side, and, if the result of this decision is that it is impossible to establish a cut through path, then the burst data which arrives is temporarily accumulated, and each of the individual packets which makes up this accumulated burst data is individually transmitted according to its IP address; and there are also provided a unit for calculating the respective establishment success ratios for cut through paths according to the results of decisions which have been notified by the next stage relay node relating to a plurality of paths up to the node upon the reception side, and a unit for transmitting the burst data upon the path for which, according the results of calculation by this calculation unit, the cut through path establishment success ratio is the highest.

In this manner, the present invention is distinguished by the fact that the cut through path is not established in advance before the burst data transfer, but rather establishment of the cut through path is performed along with the data transfer as far as possible, and the system switches over to IP transfer at the time point that a problem arises with establishing the cut through path.

For example, it is possible for data giving the amount of subsequent burst data to be written in the leading packet as header information, and the leading packet arrival detection unit may include a burst data leading packet arrival detection unit which refers to this subsequent burst data amount information. At this time, the burst data amount information may be, for example, packet number information or packet length information for packets subsequent to the leading packet.

Furthermore, for example, information which indicates that the packet is the final packet of burst data may be written as header information into the final packet, and the final packet arrival detection unit may include a unit for detecting the final packet of burst data by referring to this information which conveys the purport that this is the final packet.

The present invention is distinguished in that, by doing this, when the burst data transfer is completed, release of the cut through path is performed quickly, and accordingly it is possible to reduce the number of invalid cut through path retentions.

The unit for determining whether or not establishment is possible may include, for example, a unit for determining whether or not a vacant wavelength is available for establishing a cut through path to the next stage node, for determining the difference between the permissible transfer speed up to this node itself and the permissible transfer speed to the next stage node, and for determining the signal quality of the burst data.

Moreover, it is desirable to provide a unit for, when it has been determined by the unit for determining whether or not establishment is possible that it is impossible to establish a cut through path because of deterioration of the signal quality of the leading packet of burst data which has arrived, notifying this fact to the preceding stage node, and a unit for performing 3R processing of burst data which arrives, according to notification by this notification unit.

By doing this, it is not necessary to calculate in advance the points at which 3R processing is required to be performed, and it is acceptable to perform 3R processing at the time point that deterioration of the signal quality actually occurs, so that it is possible to reduce the labor and the time period which are required for establishing the cut through path.

The present invention is distinguished by the fact that it is acceptable not to perform establishment of the cut through path in advance of the burst data transfer. Moreover, the present invention is distinguished by the fact that it is not necessary to calculate in advance the points at which 3R processing is required to be performed.

Furthermore, the present invention is distinguished by the fact that a plurality of paths are established between the node upon the transmission side and the node upon the reception side, and in that it is possible to perform burst data transfer reliably at high speed, by performing the burst data transfer based upon a policy that any one of these cut through paths which has been successfully established will be acceptable.

It should be understood that, when thus establishing a plurality of paths are established between the node upon the transmission side and the node upon the reception side, some policy is established, for example, when a plurality of path candidates of equal length are present, for selecting a plurality of path candidates whose distance is the shortest; or, when a plurality of path candidates whose lengths are different are present, for selecting a plurality of path candidates in sequence from that path candidate whose length is the shortest; or the like.

In other words, with the optical path network according to the present invention, there are provided: a node upon the transmission side, a node upon the reception side, and relay nodes which are arranged upon paths between the node upon the transmission side and the node upon the reception side; and these relay nodes include unit for establishing optical paths according to the IP addresses of the IP packets which arrive; and the unit which establishes these optical paths includes a unit for detecting the arrival of a leading packet of burst data, a cut through path establishment unit which establishes a cut through path to the next stage relay node when it has been detected by this detection unit that a leading packet of burst data has arrived, a unit for detecting the arrival of a final packet of burst data, and a cut through path release unit for releasing a cut through path after the passage of the final packet, when the arrival of the final packet of burst data has been detected by this detection unit; while the cut through path establishment unit includes a unit for deciding whether or not it is possible to establish a cut through path up to the relay node at the next stage, a unit for temporarily accumulating the burst data which arrives when the result of this decision by this decision unit is that it is impossible to establish a cut through path, and an IP transfer unit for transferring the individual packets which make up the burst data which has been accumulated in this temporary accumulation unit individually according to their IP addresses; furthermore, a plurality of paths are established in advance between the node upon the transmission side and the node upon the reception side; and the node upon the transmission side includes a unit for transmitting the same burst data upon a plurality of paths, while the node upon the reception side includes a unit for discarding, among the same burst data which arrives individually from the plurality of paths, the received burst data other than those burst data which arrive most quickly.

By doing this, even if, among a plurality of paths, there is a path for which a failure occurs during cut through path establishment, nevertheless it is possible to transfer the burst data reliably at high speed, since it will be acceptable for the establishment of any one of the cut through paths to succeed, provided that it is possible to transfer the burst data to the node upon the reception side.

Or, the cut through path establishment unit may include a unit for deciding whether not it is possible to establish a cut through path to the next stage node, a unit for notifying the result of this decision by this decision unit to the node upon the transmission side, a unit for temporarily accumulating the burst data which arrive when the result of this decision by this decision unit is that it is impossible to establish a cut through path, and an IP transfer unit for transferring the individual packets which make up the burst data which has been accumulated in this temporary accumulation unit individually according to their IP addresses; and, furthermore, a plurality of paths are established in advance between the node upon the transmission side and the node upon the reception side; and the node upon the transmission side includes a unit for transmitting the same burst data upon a plurality of paths, and a unit for stopping the transmission of the same burst data for paths among the plurality of paths for which it has been established, according to notification by the notification unit, that the establishment of a cut through path is impossible; and, in the relay nodes, the same burst data is accumulated in their own the temporary accumulation unit, while they include a unit for discarding this burst data if a predetermined time period has elapsed after the arrival of the same burst data; and the node upon the reception side includes a unit for discarding, among the same burst data which arrives individually from the plurality of paths, the received burst data other than those burst data which arrive most quickly.

By doing this, even if among the plurality of cut through paths there is a path for which the establishment has failed, since the situation will be acceptable provided that it is possible to transfer the burst data to the node upon the reception side over whichever cut through path has been successfully established, in addition to it being possible to transfer the burst data reliably and quickly, by stopping the transfer of burst data quickly for the cut through path the establishment of which has failed, it is possible to avoid invalid network traffic and useless consumption of network resources.

Or a plurality of paths may be established in advance between the node upon the transmission side and the node upon the reception side, with the node on the transmission side including a unit for transmitting the same data upon this plurality of paths, and the node on the reception side including a unit for notifying the relay node to the effect that, among the same burst data which arrives individually from the plurality of paths, that burst data which has arrived most quickly is being received, and a unit for discarding the burst data other than those burst data which arrive most quickly; and with the relay node including a unit for, if, according to notification by the notification unit, it itself is present upon a path other than the path for which the node upon the reception side has succeeded in reception, stopping the transmission of the same burst data, and, if the same burst data is accumulated in its own the temporary accumulation unit, discarding this burst data.

By doing this, even if among the plurality of cut through paths there is a path for which the establishment has failed, since the situation will be acceptable provided that it is possible to transfer the burst data to the node upon the reception side over whichever cut through path has been successfully established, in addition to it being possible to transfer the burst data reliably and quickly, by stopping the transfer of burst data quickly for the cut through path the establishment of which has failed, it is possible to avoid invalid network traffic and useless consumption of network resources.

Or a plurality of paths may be established in advance between the node upon the transmission side and the node upon the reception side, and the node upon the transmission side may comprise a unit for transmitting the same burst data to each of this plurality of paths individually, while the node upon the reception side may include a unit for notifying the relay node to the effect that, among the same burst data which arrives individually from the plurality of paths, that burst data which has arrived most quickly is being received, and a unit for discarding the burst data other than those burst data which arrive most quickly; and with the node upon the transmission side including a unit for stopping the transmission of the same burst data upon a path other than the path for which the node upon the reception side has succeeded in reception, according to notification by the notification unit; and furthermore with the relay node comprising a unit for accumulating the same burst data in its own temporary accumulation unit, and for discarding this burst data if the arrival of the same burst data is interrupted for a predetermined time period.

By doing this, even if among the plurality of cut through paths there is a path for which the establishment has failed, since the situation will be acceptable provided that it is possible to transfer the burst data to the node upon the reception side over whichever cut through path has been successfully established, in addition to it being possible to transfer the burst data reliably and quickly, by stopping the transfer of burst data quickly for the cut through path the establishment of which has failed, it is possible to avoid invalid network traffic and useless consumption of network resources.

If the node according to the present invention is utilized as the node upon the transmission side, and is provided to an optical path network in which, when a relay node has detected the arrival of a leading packet of burst data, a cut through path is established to the next stage relay node, and, when the arrival of the final packet of burst data is detected, the cut through path which is already established is released after the passage of the final packet of burst data, and at this time it is decided whether or not it is possible to establish a cut through path to the next stage relay node, and the result of this decision is notified to the node upon the transmission side; and if the result of this decision is that it is impossible to establish a cut through path, then the burst data which arrives is temporarily accumulated, and the individual packets which make up this accumulated burst data are transferred individually according to their IP addresses, then there may further be comprised a unit which transmits the same burst data individually upon a plurality of paths, and a unit for stopping the transmission of the same burst data, for those paths among the plurality of paths for which the establishment of a cut through path has become impossible, according to the notification.

Or, if the node according to the present invention is utilized as the node upon the transmission side, and is provided to an optical path network in which, when a relay node has detected the arrival of a leading packet of burst data, a cut through path is established to the next stage relay node, and, when the arrival of the final packet of burst data is detected, the cut through path which is already established is released after the passage of the final packet of burst data, and at this time it is decided whether or not it is possible to establish a cut through path to the next stage relay node, and the result of this decision is notified to the node upon the transmission side; and if the result of this decision is that it is impossible to establish such a cut through path, then the burst data which arrives is temporarily accumulated, and the individual packets which make up this accumulated burst data are transferred individually according to their IP addresses, and the node upon the reception side, which constitutes the data transfer destination, notifies to the node upon the transmission side the fact that, among the same burst data which arrives individually from the plurality of paths, that burst data which has arrived most quickly is being received, then there may be further comprised a unit which transmits the same burst data individually upon a plurality of paths, and a unit for stopping the transmission of the same burst data upon the paths among the plurality of paths other than the path for which reception in the node upon the reception side has been successful, according to the notification.

Moreover, if the node according to the present invention is utilized as a relay node, and is provided to an optical path network in which it is connected to both the node upon the transmission side and also to the node upon the reception side, and in which a plurality of paths are established in advance between the node upon the transmission side and the node upon the reception side, and the node upon the reception side transmits this same burst data individually upon a plurality of paths, and the transmission of the same burst data is stopped for a path among the plurality of paths for which it has been notified that the establishment of a cut through path is impossible, and including a unit which establishes an optical path according to the IP addresses of the IP packets which arrive, then this optical path establishment unit may comprise unit for detecting the arrival of a leading packet of burst data, unit for establishing a cut through path which establishes a cut through path to the next stage relay node when the arrival of a leading packet of burst data has been detected by this detection unit, unit for detecting the arrival of a final packet of burst data, and cut through path release unit which, when the arrival of a final packet of burst data has been detected by this detection unit, releases a cut through path which has been already established after the passage of the final packet of burst data; and the cut through path establishment unit may comprise a unit for deciding whether or not it is possible to establish a cut through path to the next stage node, a unit for notifying the result of this decision by the decision unit to the node upon the transmission side, a unit for temporarily accumulating the burst data which arrives if the result of this decision by the decision unit is that it is impossible to establish a cut through path, and an IP transfer unit which transfers the individual packets which make up the burst data which have been accumulated in this temporary accumulation unit individually by IP transfer; and there may also be included a unit for accumulating this same burst data in the temporary accumulation unit of its own, and for discarding this burst data if the arrival of the burst data is interrupted for a predetermined time period.

Moreover, if the node according to the present invention is utilized as a relay node, and is provided to an optical path network in which it is connected to both the node upon the transmission side and also to the node upon the reception side, and in which a plurality of paths are established in advance between the node upon the transmission side and the node upon the reception side, and the node upon the reception side transmits this same burst data individually upon a plurality of paths, and the node upon the reception side notifies to the relay node the fact that, among the same burst data which arrives individually from the plurality of paths, that burst data which has arrived most quickly is being received, and which also includes a unit for establishing an optical path according to the IP addresses of the IP packets which arrive, this unit for establishing an optical path may include a unit for detecting the arrival of a leading packet of burst data, a unit for establishing a cut through path which establishes a cut through path to the next stage relay node when the arrival of a leading packet of burst data has been detected by this detection unit, a unit for detecting the arrival of a final packet of burst data, and a cut through path release unit which, when the arrival of a final packet of burst data has been detected by this detection unit, releases a cut through path which has been already established after the passage of the final packet of burst data; and the cut through path establishment unit may comprise a unit for deciding whether or not it is possible to establish a cut through path to the next stage node, a unit for temporarily accumulating the burst data which arrives if the result of this decision by the decision unit is that it is impossible to establish a cut through path, an IP transfer unit which transfers the individual packets which make up the burst data which have been accumulated in this temporary accumulation unit individually according to their IP addresses, and a unit for, if it itself, according to the notification, is a relay node upon a path other than the path for which reception by the node upon the reception side has been successful, stopping the transmission of the same burst data, if the same burst data is accumulated in its own the temporary accumulation unit, and discards the burst data.

Moreover, if the node according to the present invention is utilized as the node upon the reception side, and is provided to an optical path network in which the node upon the transmission side, which is the data transmission source, transmits the same burst data upon a plurality of paths, and with which, when a relay node has detected the arrival of a leading packet of burst data, a cut through path is established to the next stage node, and when the arrival of the final packet of burst data is detected, the already established cut through path is released after the passage of the final packet; and, at this time, it is decided whether or not it is possible to establish a cut through path to the next stage relay node, and, if the result of this decision is that it is impossible to establish such a cut through path, the burst data is temporarily accumulated, and the individual packets which make up this burst data which has been accumulated are individually transferred according to their IP addresses, then there may be included a unit for discarding, among the same burst data which arrives individually from the plurality of paths, the received burst data other than those burst data which arrive most quickly.

And further, if the node according to the present invention is utilized as the node upon the reception side, and is provided to an optical path network in which the node upon the transmission side, which is the data transmission source, transmits the same burst data upon a plurality of paths, and in which, when the arrival of a leading packet of burst data is detected, a cut through path is established to the next stage relay node, and, when the arrival of the final packet of burst data is detected, the already established cut through path is released after the passage of the final packet; and, at this time, it is decided whether or not it is possible to establish a cut through path to the next stage relay node, and, if the result of this decision is that it is impossible to establish such a cut through path, the burst data is temporarily accumulated, and the individual packets which make up this burst data which has been accumulated are individually transferred according to their IP addresses, then there may be included a unit for notifying to the relay node the fact that, among the same burst data which have arrived by the plurality of paths, the burst data which have arrived the most quickly have been received, and a unit for discarding the burst data other than those burst data which arrive most quickly.

Finally, if the node according to the present invention is utilized as the node upon the reception side, and, when a relay node has detected the arrival of a leading packet of burst data, a cut through path is established to the next stage relay node, and, when the arrival of the final packet of burst data is detected, the cut through path which is already established is released after the passage of the final packet of burst data, and at this time it is decided whether or not it is possible to establish a cut through path to the next stage relay node, and if the result of this decision is that it is impossible to establish a cut through path, then the burst data which arrives is temporarily accumulated, and the individual packets which make up this accumulated burst data are transferred individually according to their IP addresses; and if the node upon the transmission side, which is the data transmission source, is provided to an optical path network in which the same burst data is transmitted upon a plurality of paths, there may further be provided a unit for notifying to the node upon the transmission side the fact that, among the same burst data which are arriving from the plurality of paths, the burst data which have arrived most quickly have been received, and a unit for discarding the burst data other than those burst data which arrive most quickly.

In this manner, the present invention is distinguished by the fact that the cut through path establishment is not performed before the transfer of burst data, and accordingly a changeover is made to IP transfer at the time point that difficulty is experienced with the establishment of the cut through path. By doing this, the present invention is distinguished by the fact that it is not necessary to perform the cut through path establishment in advance before the transfer of burst data, and accordingly it is possible to reduce the labor and the time period which are required for establishing the cut through path.

Furthermore, the present invention is distinguished by the fact that a plurality of paths are established between the node upon the transmission side and the node upon the reception side, and in that data transfer is performed based upon a policy that by performing the burst data transfer based upon a policy that any one of these cut through paths which has been successfully established will be acceptable, whereby it is possible to perform the burst data transfer reliably and at high speed.

For example, it is possible for subsequent burst data amount information to be written in the leading packet as header information, and for the leading packet arrival detection unit to include a burst data leading packet arrival detection unit which refers to this subsequent burst data amount information. At this time, the burst data amount information may, for example, be packet number information or packet length information for packets subsequent to the leading packet.

Furthermore, for example, information which indicates that the packet is the final packet of burst data may be written as header information into the final packet, and the final packet arrival detection unit may include a unit for detecting the final packet of burst data by referring to this information which indicates that this is the final packet.

Furthermore, the present invention is distinguished by the fact that the cut through path is released quickly after the burst data transfer has been completed, so that it is possible to reduce the number of invalid cut through path retentions.

The unit for determining whether or not establishment is possible may include, for example, a unit for determining whether or not a vacant wavelength is available for establishing a cut through path to the next stage node, for determining the difference between the permissible transfer speed up to this node itself and the permissible transfer speed to the next stage node, and for determining the signal quality of the burst data.

Furthermore, it is desirable for the node of the present invention to include a unit for, when it has been determined by the unit for determining whether or not establishment is possible that it is impossible to establish a cut through path because of deterioration of the signal quality of the leading packet of burst data which has arrived, notifying this fact to the preceding stage node, and further to include a unit for performing 3R processing of burst data which arrives, according to notification by this notification unit.

According to this, it is not necessary to calculate in advance the points at which 3R processing is required to be performed, and it is acceptable to perform 3R processing at the time point that deterioration of the signal quality actually occurs, so that it is possible to reduce the labor and the time period which are required for establishing the cut through path.

The node of the present invention is distinguished by the fact that there are provided: a unit for, before the establishment of an optical path, transmitting an optical packet for test upon the path which is scheduled for establishment; a unit for receiving this optical packet for test and determining its signal quality; a unit for, when the signal quality as determined by this determination unit deteriorates, notifying a preceding stage node to this effect; and a unit for, when such a notification is received, thereafter performing 3R (Reshaping, Retiming, Regenerating) processing for optical packets via the path.

In other words, with the present invention, upon a path such as a cut through path by wavelength path over which optical signal data is being transferred just as it is, it is not necessary to calculate in advance each of the points at which 3R processing is required to be performed, and it is acceptable to perform 3R processing at the time point that deterioration of the signal quality actually occurs, so that it is possible to reduce the labor and the time period which are required for establishing the cut through path. Furthermore, since the positions of the implementation points for 3R processing are determined upon by experiment using optical packets for test, accordingly their positions are found accurately, and it is not necessary to provide any extra 3R implementation points, so that it is possible to take advantage of network resources efficiently.

As has been explained above, according to the present invention, it is not necessary to establish the cut through path in advance, so that it is possible to perform burst data transfer reliably at high efficiency and at a high speed, and moreover the buffer capacity in the relay nodes is reduced, so that it is possible to reduce the labor and the time period which are required for establishing the cut through path, and also the number of invalid retentions.

Furthermore, according to the present invention, along with it being possible to reduce the labor and the time period which are required for establishing the points for implementing 3R processing, it is also possible to specify these positions accurately, so that effective utilization of network resources can be anticipated.

BRIEF DESCRIPTION OF THE DRAWINGS

FIG. 9 is a flow chart showing the operation of the cut through path establishment and release section of the second embodiment of the present invention.

FIG. 10 is a block diagram for a burst data detection section and a cut through path establishment and release section of the third embodiment of the present invention.

FIG. 11 is a flow chart showing the operation of the cut through path establishment and release section of the third embodiment of the present invention.

FIG. 59 is a flow chart showing the control flow of an establishment success ratio calculation, in the fortieth embodiment of the present invention.

DETAILED DESCRIPTION OF THE PREFERRED EMBODIMENTS

In the following various embodiments of the present invention will be explained with reference to the drawings.

It should be understood that although, in the following description of the embodiments of the present invention, a transmission side edge node S and a reception side edge node R have been explained separately for the convenience of description, in fact the edge nodes are provided both with functions for the transmission side and also with functions for the reception side, and they can perform communication in both directions.

Embodiment 1

Figure 1:
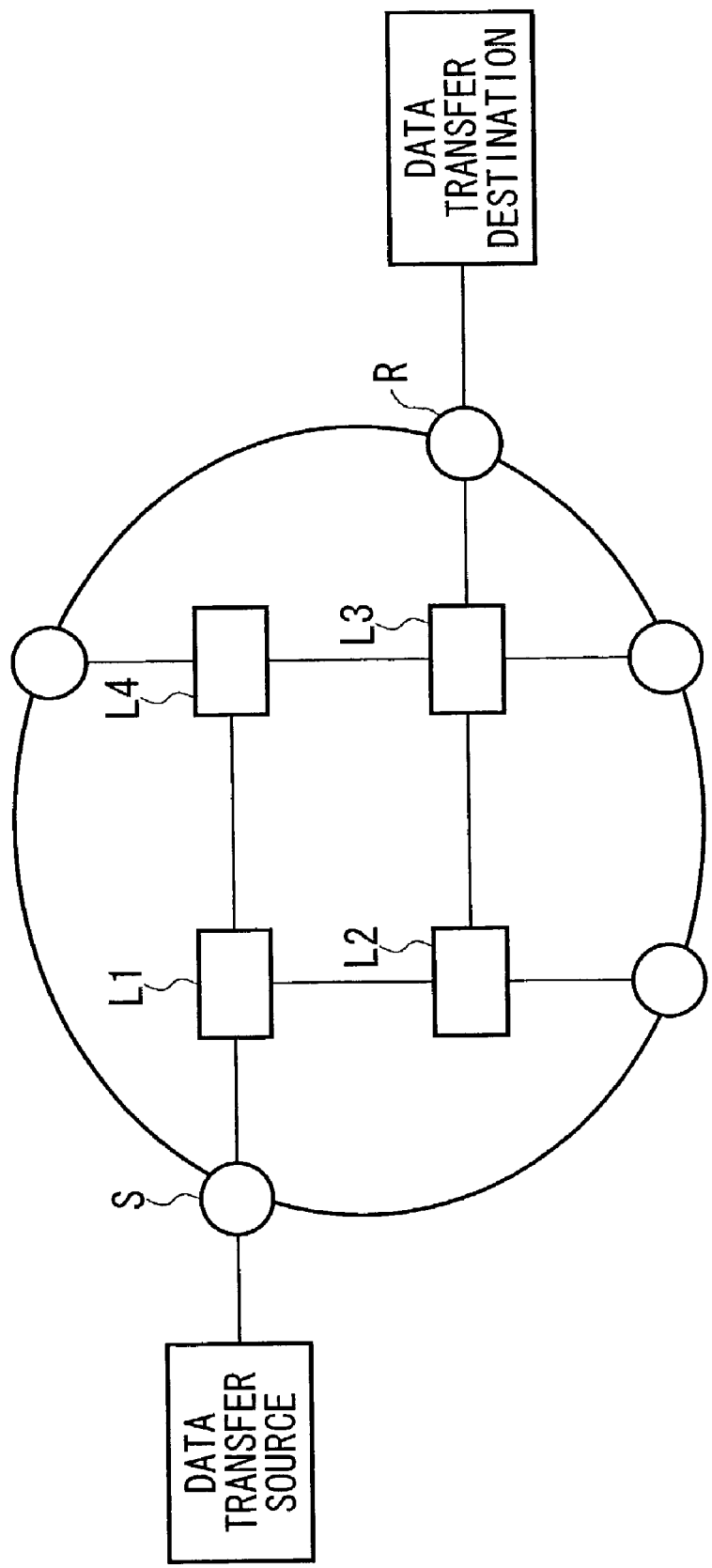
FIG. 1 is a schematic diagram showing an optical communication network according to an embodiment of the present invention.
Figure 2:
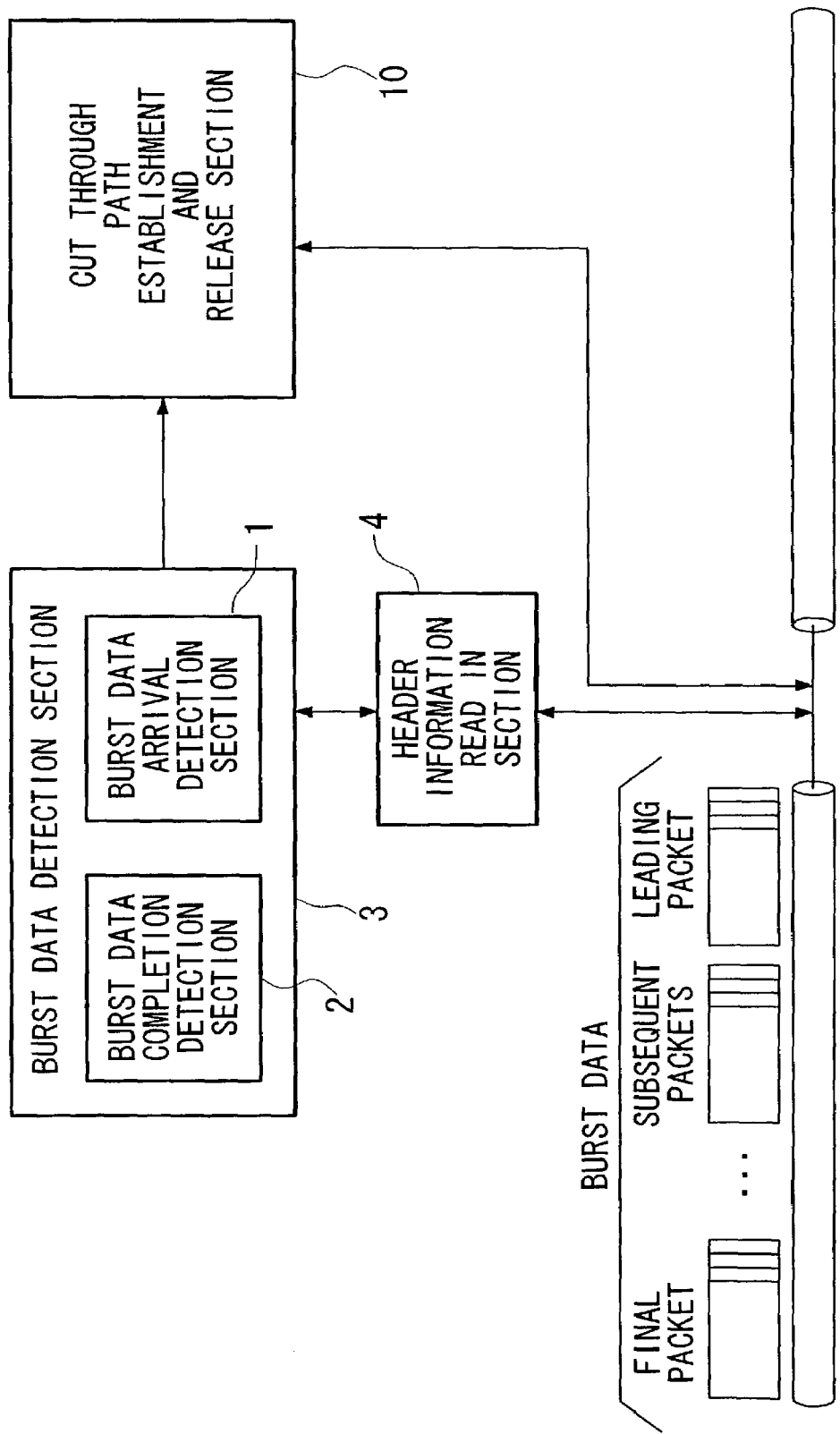
FIG. 2 is a diagram for explanation of a burst data detection section and a cut through path establishment and release section of the first embodiment of the present invention.
Figure 3:
FIG. 3 is a diagram showing the structure of a packet which is used in the embodiments of the present invention.
Figure 6:
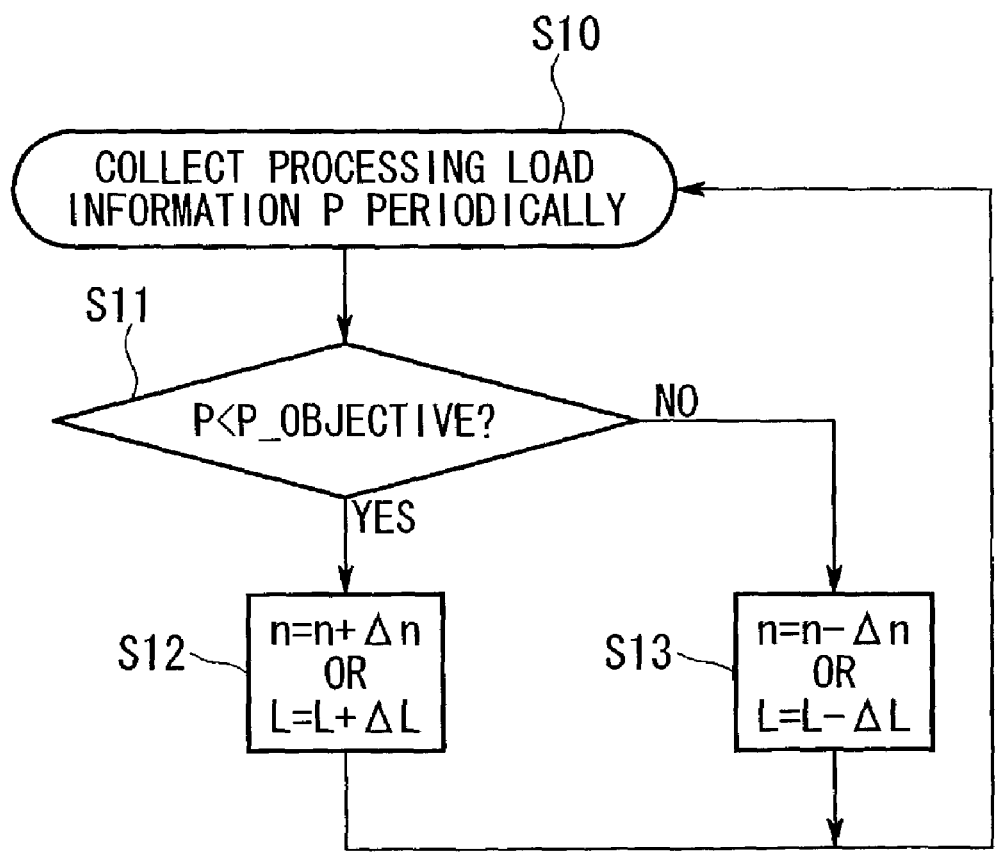
FIG. 6 is a flow chart showing the operation for dynamically setting a limit value, with the first embodiment of the present invention.
Figure 4:
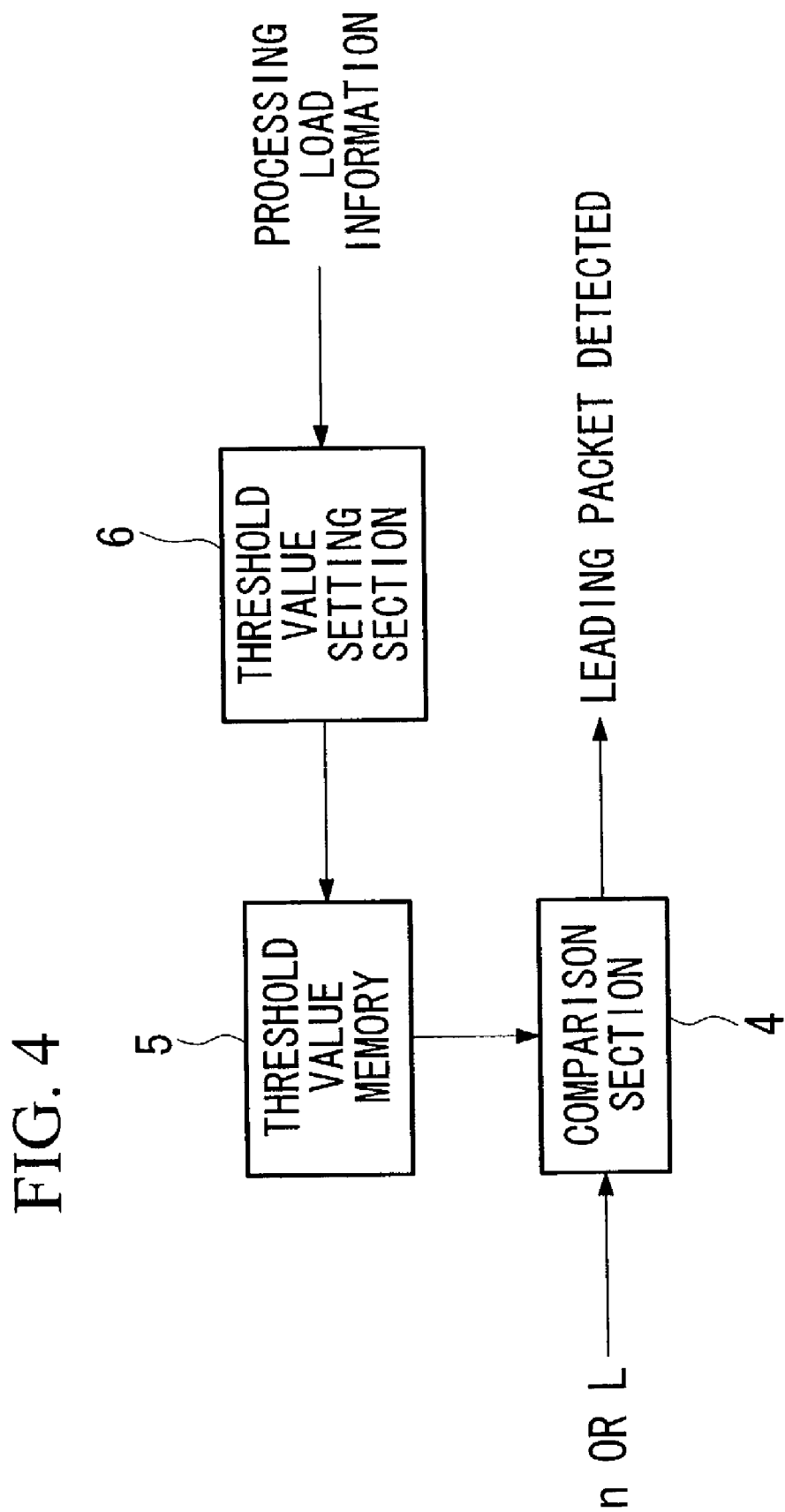
FIG. 4 is a block diagram for a burst data arrival detection section of the first embodiment of the present invention.
Figure 5:
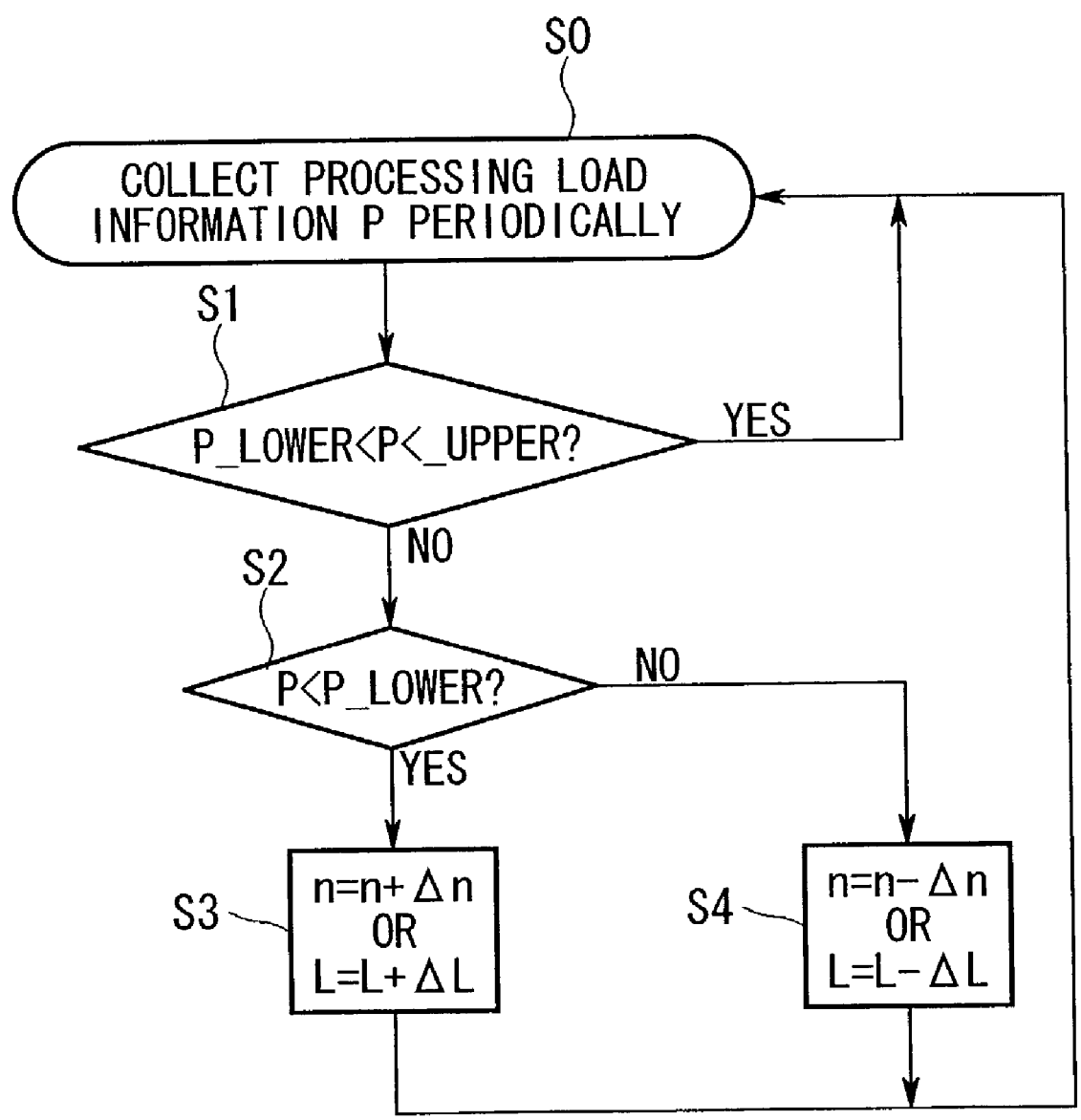
FIG. 5 is a flow chart showing the operation for dynamically setting a limit value, with the first embodiment of the present invention.
Figure 7:
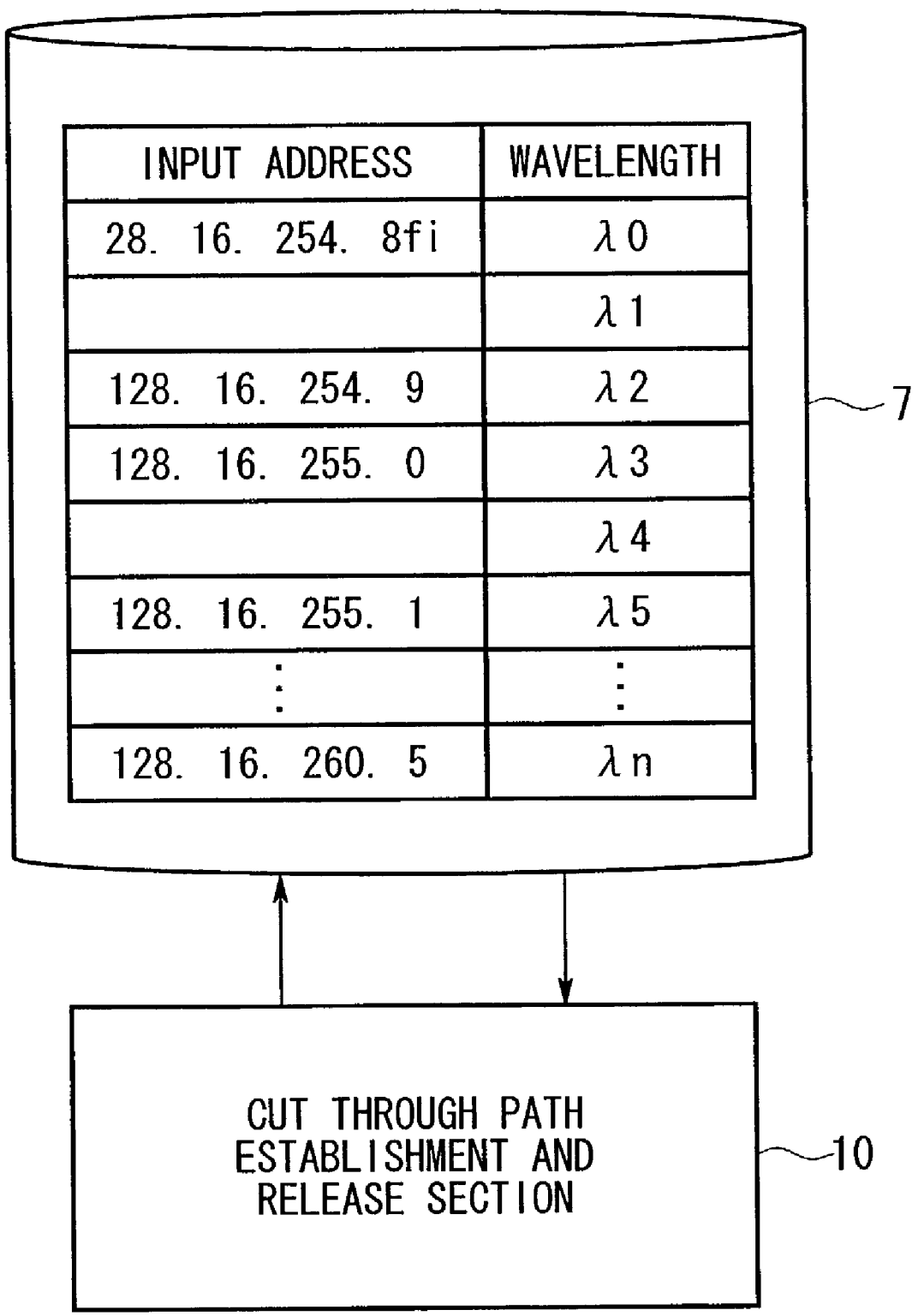
FIG. 7 is a diagram for explaining a data base of the first embodiment of the present invention.

An optical communication network according to the first embodiment of the present invention will now be explained with reference to FIGS. 1 through 7. FIG. 1 is a schematic diagram showing an optical communication network according to an embodiment of the present invention; FIG. 2 is a diagram for explanation of a burst data detection section and a cut through path establishment and release section of the first embodiment of the present invention; FIG. 3 is a diagram showing the structure of a packet which is used in the embodiments of the present invention; FIG. 4 is a block diagram for a burst data arrival detection section of the first embodiment of the present invention; FIGS. 5 and 6 are flow charts showing the operation for dynamically setting a limit value, with the first embodiment of the present invention; and FIG. 7 is a diagram for explaining a data base of the first embodiment of the present invention.

As shown in FIG. 1, the present invention is an optical communication network which comprises a transmission side edge node S which accomodates a data transfer source, a reception side edge node R which accomodates a data transfer destination, and relay nodes L1 through L4 which are arranged between the reception side edge node R and the transmission side edge node S; and, as shown in FIG. 2, a cut through path establishment and release section 10 which establishes and releases cut through paths between the transmission side end node S and the reception side edge node R, via the relay nodes L.

Here, the point in which the present invention is distinguished, is that a burst data arrival detection section 1 is provided which detects the arrival of leading packets of burst data at the transmission side edge node S and the relay nodes L, and that, when the arrival of a leading packet of burst data at the transmission side edge node S or a relay node L1 through L4 has been detected by this burst data arrival detection section 1, the cut through path establishment and release section 10 is arranged to establish a cut through path from the transmission side edge node S or the relay node Li (where i is any one of 1 through 4) to a next stage node.

Furthermore, a burst data completion detection section 2 is provided which detects the arrival of final packets of burst data at the transmission side edge node S, the relay nodes L1 through L4, and the reception side edge node R, and, when the arrival of a final packet of burst data at the transmission side edge node S or a relay node L1 through L4 or the reception side edge node R has been detected by this burst data completion detection section 2, the cut through path establishment and release section 10 is arranged to release the cut through path which is established at the transmission side edge node S or the relay node Li (where i is any one of 1 through 4) or the reception side edge node R, after the passage of the final packet.

The burst data detection section 3 shown in FIG. 2 may also be provided to the transmission side edge node S and the various relay nodes L1 through L4; or one or a plurality of them could be provided to the optical communication network externally to its nodes, as an integrated monitoring device which would monitor the arrival of the leading packets to the transmission side edge node S and the relay nodes L1 through L4 all together.

Furthermore, the cut through path establishment and release section 10 in the structure of FIG. 2 could also be provided between the transmission side edge node S and the various relay nodes L1 through L4 and the reception side edge node R; or one or a plurality of them could be provided to the optical communication network externally to its nodes, as an integrated control device which would establish and release all the cut through paths in the optical communication network all together.

As shown in FIG. 3, as the header information of the leading packet, apart from the IP address (IPA) and the packet number (I), information giving the amount of the subsequent burst data is also written, and the burst data arrival detection section 1 detects the leading packet of burst data by referring to this subsequent burst data amount information. This burst data amount is packet number information or packet length information L for the packets subsequent to the leading packet.

A threshold value is set for the packet number information n or the packet length information L, and, as shown in FIG. 4, the burst data arrival detection section 1 compares together the packet number information n or the packet length information L and the threshold value, and, if the packet number information n or the packet length information L is greater than the threshold value, this packet is detected as being the leading packet of burst data.

Processing load information for the transmission side edge node S and the various relay nodes L1 through L4 and the reception side edge node R is collected together, and a threshold value setting section 6 shown in FIG. 4 sets the threshold value adaptively according to a relationship between this processing load information which has been collected together and a target value for processing load which has been determined in advance.

It should be understood that, as a technique for collecting together the processing load information, it would be acceptable for each node periodically to transfer its own processing load information which it has individually collected together to one or a plurality of collection devices for processing load information upon the optical communication network, or to perform this collection by the processing load information collection device or devices requesting processing load information periodically from each node.

The embodiment for the procedure for setting the threshold value adaptively will now be explained with reference to FIGS. 5 and 6. In the example in FIG. 5: a target upper limit value P_upper and a target lower limit value P_lower are set, and periodically the processing load information P is collected (step S0); a decision is made as to whether or not the value of the processing load information P which has been collected is between the target upper limit value P_upper and the target lower limit value P_lower for the processing load (step S1); and, if the value of the processing load information P which has been collected is not between the target upper limit value P_upper and the target lower limit value P_lower, and moreover the value of the processing load information P is smaller than the target lower limit value P_lower (step S2), then the packet number n is increased by $\Delta n$ as the threshold value, or the packet length L is increased by $\Delta L$ as the threshold value (step S3). Furthermore, if the value of the processing load information P is greater than the target lower limit value P_lower (step S2), then the packet number n is decreased by $\Delta n$ as the threshold value, or the packet length L is decreased by $\Delta L$ as the threshold value (step S4).

On the other hand, in the example in FIG. 6, a processing load target value P_target is set, and periodically the processing load information P is collected (step S10); the processing load target value P_target and the value of the collected processing load information P are compared together, and if the value of the processing load information P which has been collected is less than the processing load target value P_target (step S11), then the packet number n is increased by $\Delta n$ as the threshold value, or the packet length L is increased by $\Delta L$ as the threshold value (step S12). Furthermore, if the value of the processing load information P which has been collected is greater than the processing load target value P_target (step S11), then the packet number n is decreased by $\Delta n$ as the threshold value, or the packet length L is decreased by $\Delta L$ as the threshold value (step S13).

By varying the threshold value adaptively according to the processing load in this manner, it is possible effectively to make the most of the bandwidth resources and the processing power at each node.

In the header of the final packet, information which indicates that this packet is the final packet of the burst data is written as final packet header information, and the burst data completion detection section 2 refers to this information which indicates that this is the final packet, and thereby detects the final packet of burst data.

As shown in FIG. 7, a data base 7 is provided in which the state of affairs regarding use of each of the various optical wavelengths is recorded, and, when a cut through path is to be established from the transmission side edge node S or a relay node L1 through L4 to a next stage node, the cut through path establishment and release section 10 refers to this data base 7 and, along with establishing the cut through path using an optical wavelength which is not being used, also updates the state of affairs in the data base 7 for that optical wavelength which has been used for establishing the cut through path as being 'in use'; and, when releasing the cut through path after its final packet has passed, updates the state of affairs in the data base 7 for that optical wavelength which has been released as being 'vacant', after the cut through path has been released.

Furthermore, the data base 7 could also be provided to the transmission side edge node S and the various relay nodes L1 through L4, or one or a plurality of them could be provided to the optical communication network externally to its nodes.

Embodiment 2

Figure 8:
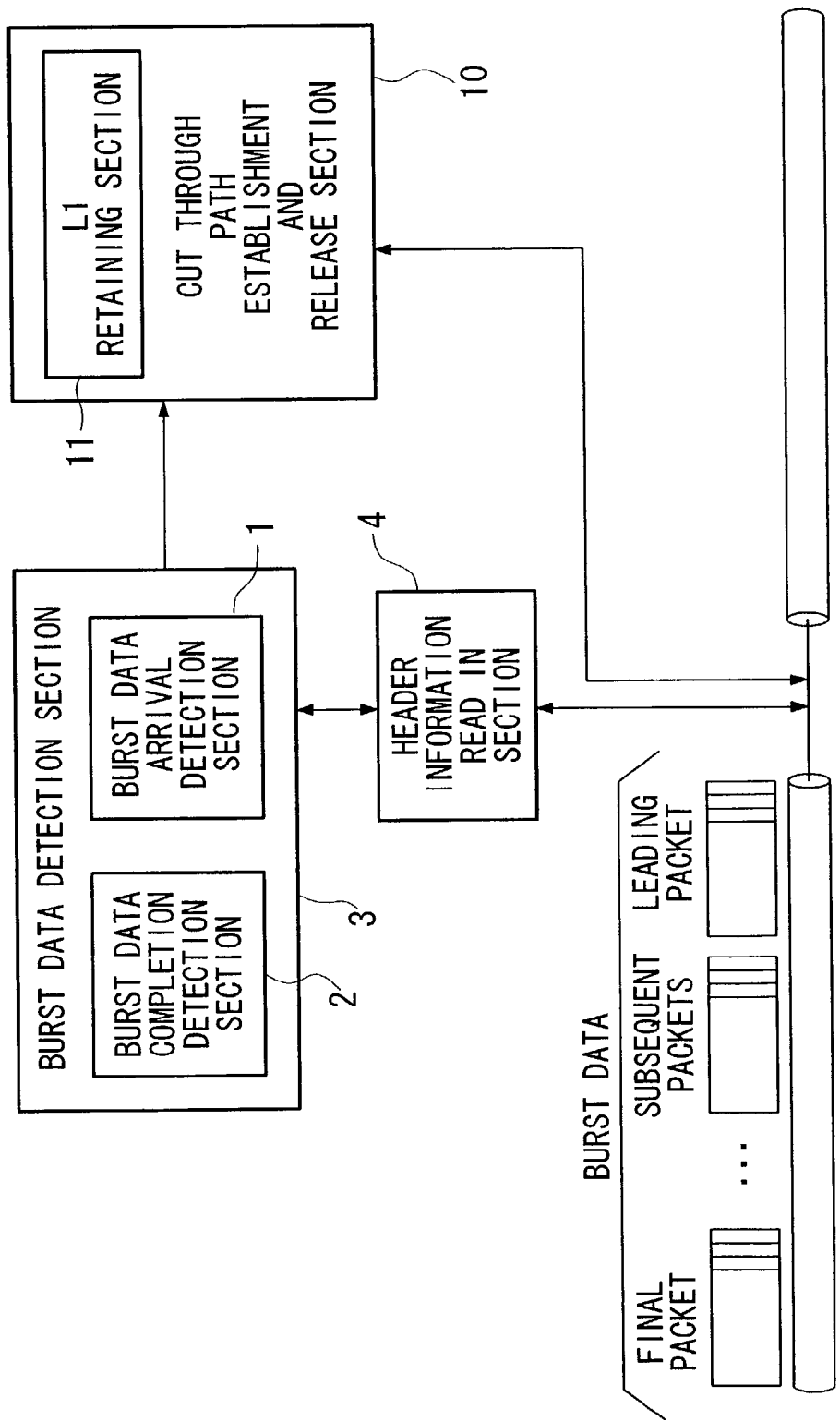
FIG. 8 is a block diagram for a burst data detection section and a cut through path establishment and release section of the second embodiment of the present invention.

The second embodiment of the present invention will now be explained with reference to FIGS. 8 and 9. FIG. 8 is a block diagram for a burst data detection section and a cut through path establishment and release section of the second embodiment of the present invention. And FIG. 9 is a flow chart showing the operation of the cut through path establishment and release section of this second embodiment of the present invention.

In this second embodiment, as shown in FIG. 8, the cut through path establishment and release section 10 comprises an L1 retaining section 11 which retains burst lengths L1 which represent burst data amount information relating to the burst data which is being transferred by the cut through paths which are already established; and, as shown in FIG. 9, when there are no wavelength resources for newly establishing a cut through path to transfer newly arrived burst data, the burst lengths L1 of the burst data which is being transferred by the already established cut through paths which have been kept in the L1 retaining section 11 are referred to.

The burst lengths L1 which have been kept in the L1 retaining section 11 and the burst length L2 of the burst data which has newly arrived (which serves as burst data amount information) are compared together, and if L1<L2 for any L1, then the one of the cut through paths via which burst data of this burst length L1 is already being transferred is released, and a cut through path which transfers the burst data which has newly arrived is established.

On the other hand, if L1≧L2 for all the stored L1, then no cut through path for transferring the newly arrived burst data is established, but instead the newly arrived burst data is transferred by IP transfer.

It should be noted that although, in this second embodiment, the burst length is used as information representing the burst data amount, it would also be possible to utilize the number of packets as such information representing the burst data amount.

According to this second embodiment, if no wavelength resources are available for newly establishing a cut through path, then, if new burst data arrives, the circumstances of use of the already established cut through paths are re-scrutinized, and a decision is made as to whether or not establishing a cut through path afresh for transferring the burst data at greater efficiency for the optical communication network as a whole, and if it is decided to do so, then change of establishment of the cut through paths in this manner is performed.

Embodiment 3

The third embodiment of the present invention will now be explained with reference to FIGS. 10 and 11. FIG. 10 is a block diagram for a burst data detection section and a cut through path establishment and release section of the third embodiment of the present invention. And FIG. 11 is a flow chart showing the operation of the cut through path establishment and release section of this third embodiment of the present invention.

In this third embodiment, the cut through path establishment and release section 10 comprises an Lreg detection section 12 which, when there are no wavelength resources for newly establishing a cut through path to transfer newly arrived burst data, detects not yet transferred burst lengths Lreg which represent the not yet transferred burst data amounts of the burst data which is being transferred by the cut through paths which are already established, and, if according to the results of detection by the Lreg detection section 12 the not yet transferred burst length Lreg is smaller than the burst length L2 which has been obtained by referring to the burst data amount information for the burst data which has newly arrived, releases one of the cut through paths via which burst data is already being transferred, and establishes a cut through path which transfers the burst data which has newly arrived. In other words, if Lreg<L2, one of the cut through paths for which the burst length of the not yet transferred burst data is Lreg is released, and a cut through path for transferring the burst data which has newly arrived is established.

On the other hand, if Lreg≧L2, then no cut through path for transferring the newly arrived burst data is established, but instead the newly arrived burst data is transferred by normal IP transfer.

It should be noted that although, in this third embodiment, the burst length is used as information representing the burst data amount, it would also be possible to utilize the number of packets as such information representing the burst data amount.

According to this third embodiment, if no wavelength resources are available for newly establishing a cut through path, then, if new burst data arrives, the circumstances of use of the already established cut through paths are re-scrutinized, and a decision is made as to whether or not establishing a cut through path afresh for transferring the burst data which has newly arrived would provide burst data transfer at greater efficiency for the optical communication network as a whole, and if it is decided to do so, then change of establishment of the cut through paths in this manner is performed.

Embodiment 4

The optical communication device of this fourth embodiment can be implemented using a computer device which serves as an information processing device by installing, upon the computer device, a program which can implement, as a function, in the optical communication network, of establishing and releasing a cut through path by way of a transmission side edge node S and relay nodes L1 through L4, a function of detecting the arrival of a leading packet of burst data at the transmission side edge node S or the relay nodes L1 through L4, a function of, when the arrival of the leading packet of burst data is detected by the leading packet arrival detection function, establishing a cut through path to the next stage node, a function of detecting the arrival of a final packet of burst data at the transmission side edge node S or the relay nodes L1 through L4 or a reception side edge node R, and a function of, when the arrival of a final packet of burst data has been detected by the function for detecting the arrival of a final packet, releasing a cut through path which is already established to the node at which the arrival of the final packet has been detected, after the passage of the final packet.

Furthermore, according to the program according to the present invention, subsequent burst data amount information is written into the computer device as header information of the leading packet, and, as a function for detecting the arrival of the leading packet, it is possible to implement the function of detecting the leading packet of burst data by referring to this subsequent burst data amount information.

Furthermore, the program according to the present invention may implement upon the computer device, wherein the burst data amount information is packet number information or packet length information for packets subsequent to the leading packet, the functions of: setting a threshold value for the packet number information or the packet length information; detecting the burst data of a leading packet; comparing the packet number information or the packet length information with the threshold value; and, if the packet number information or the packet length information is greater than the threshold value, detecting the packet as a leading packet of burst data.

Yet further, the program according to the present invention may implement upon the computer device, wherein the function is implemented of collecting together the processing load information when the transmission side edge node S, the relay nodes L1 through L4, and the reception side edge node R operate, the function of adaptively establishing the threshold value according to the processing load information which has thus been gathered together by this collecting together function, and according to a relationship between processing load and target value which is set in advance.

Yet further, the program according to the present invention may implement upon the computer device, as the function of adaptively setting the threshold value, the functions of: setting a target upper limit value and a target lower limit value for processing load, periodically collecting together processing load information, making a decision as to whether or not the value of the processing load information is between the target upper limit value and the target lower limit value, and: if the value of the processing load information which has been collected together is not between the target upper limit value and the target lower limit value and furthermore the value of the processing load information is smaller than the target lower limit value, increasing the packet number n as threshold value by $\Delta n$ or increasing the packet length L as threshold value by $\Delta L$, or, if the value of the processing load information is greater than the target lower limit value, reducing the packet number n as threshold value by $\Delta n$ or reducing the packet length L as threshold value by $\Delta L$.

Or, as the function of adaptively setting the threshold value, it may implement the functions of: setting a processing load target value, periodically collecting together processing load information, comparing together the processing load target value and the value of the processing load information, and: if the value of the processing load information is smaller than the processing load target value, increasing the packet number n as threshold value by $\Delta n$ or increasing the packet length L as threshold value by $\Delta L$, or, if the value of the processing load information is greater than the processing load target value, reducing the packet number n as threshold value by $\Delta n$ or reducing the packet length L as threshold value by $\Delta L$.

Yet further, the program according to the present invention may implement upon the computer device of writing information which indicates that the packet is the final packet of burst data as header information into the final packet, and, as the final packet arrival detection function, detecting the final packet of burst data by referring to this information which indicates that this is the final packet.

Yet further, as shown in FIG. 7, the program according to the present invention may implement upon the computer device, wherein a data base 7 in which the circumstances of use of optical wavelengths are recorded is provided, as the establishment function, the function of referring to the data base and establishing a cut through path via an optical wavelength which is not in use, and updating in the data base to 'in use' the circumstances of use of the optical wavelength which was used; and, as a function of releasing the cut through path after the passage of the final packet, the function of updating in the data base to 'vacant' the circumstances of use of the optical wavelength which has been released after the release of the cut through path.

Yet further, as shown in FIG. 8, the program according to the present invention may implement upon the computer device, as the establishment function, the functions of: retaining, as an L1 retaining section 11, the burst data amount information for burst data being transferred by cut through paths which are already established; if wavelength resources are not available for newly establishing a cut through path for transferring burst data which has newly arrived, referring to the burst data amount information for the burst data which is being transferred by cut through paths which are already established, which is being retained by the retaining function; and establishing a cut through path for transferring the newly arrived burst data by comparing together the result of referring to the referring function, and the burst data amount information for the burst data which has newly arrived, and releasing one or another of the cut through paths through which is being transferred burst data of a smaller burst data amount than the burst data amount of the burst data which has newly arrived.

Or, as this establishment function, as shown in FIG. 10, it may implement the function, as an Lreg detection section 12, of, if wavelength resources are not available for newly establishing a cut through path for transferring burst data which has newly arrived, detecting the not yet transferred burst data amount of burst data being transferred by cut through paths which are already established; and the function of establishing a cut through path for transferring the burst data which has newly arrived by releasing one or another of the cut through paths through which is being transferred burst data of which the not yet transferred burst data amount, according to the result of detection by the detection unit, is smaller than the burst data amount which is obtained by referring to the burst data amount information of the burst data which has newly arrived.

Figure 12A:
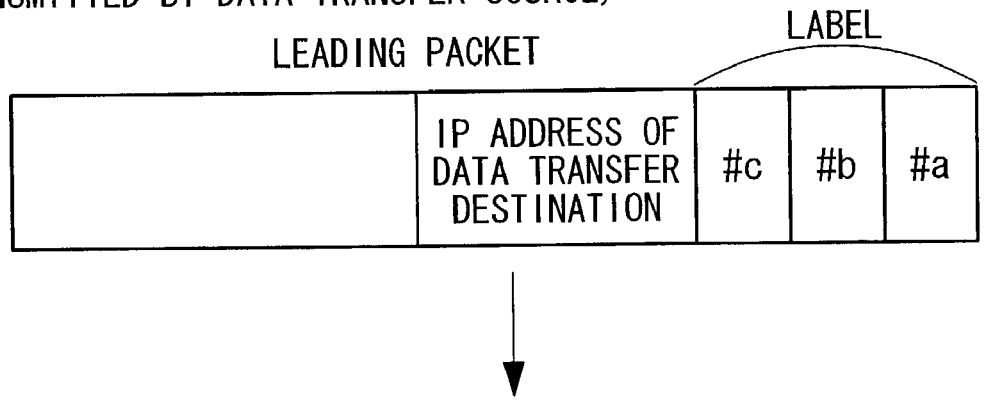
FIGS. 12A to 12C are diagrams for explaining the structure of a leading packet in which wavelength information has been written as path information.
Figure 12B:
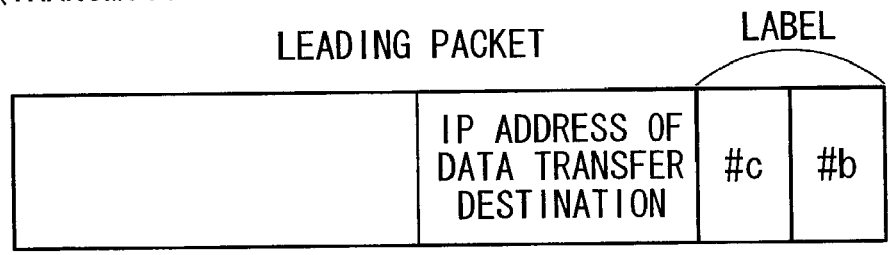
Figure 12C:
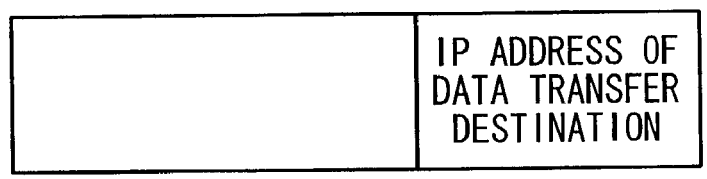
Figure 13:
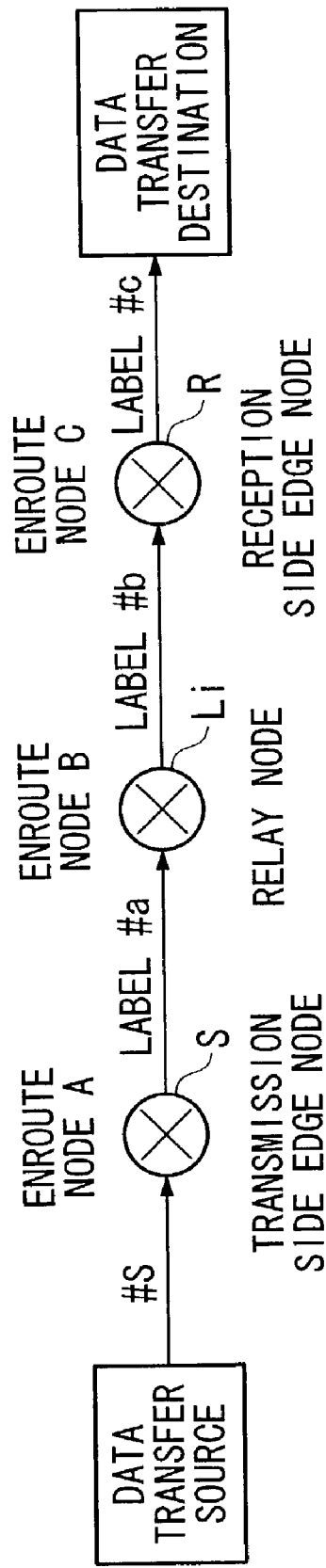
FIG. 13 is a diagram for explaining a routing which uses this leading packet in which wavelength information has been written as path information.
Figure 14A:
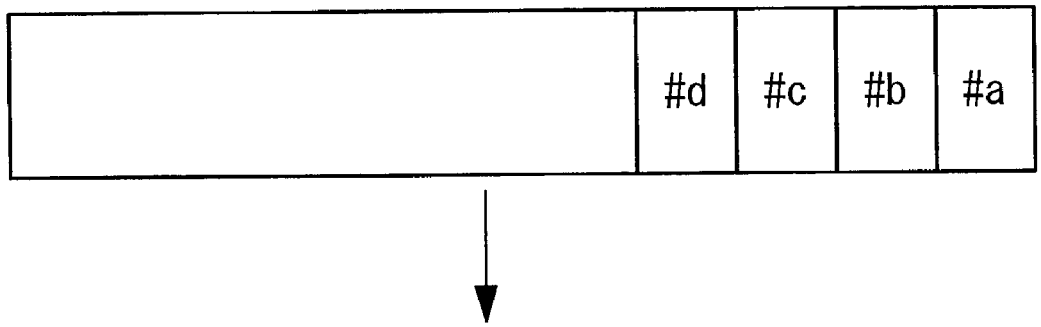
FIGS. 14A to 14C are diagrams for explaining the structure of a leading packet in which router address information has been written as path information.
Figure 14B:
Figure 14C:
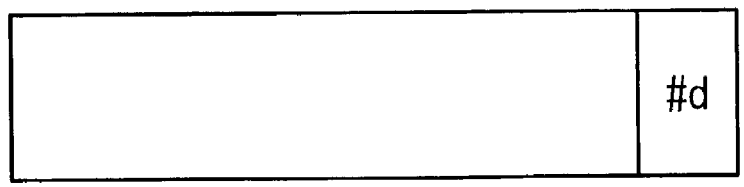
Figure 15:
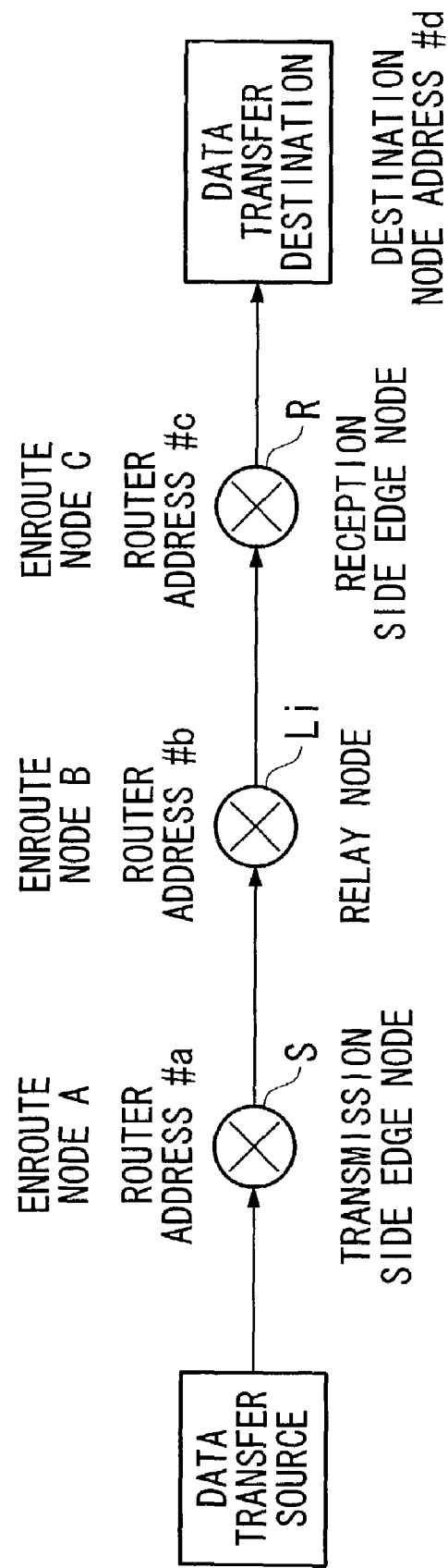
FIG. 15 is a diagram for explaining a routing which uses this leading packet in which router address information has been written as path information.
Figure 16:
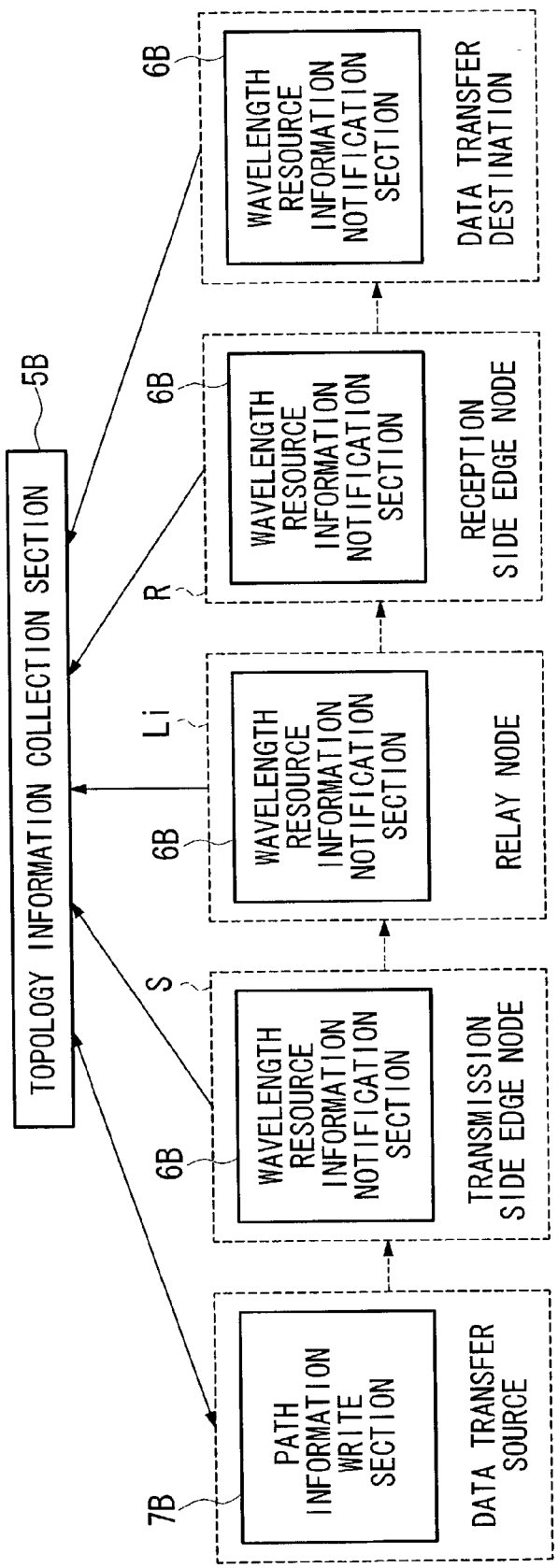
FIG. 16 is a schematic view showing the collection of supervisory topological information.
Figure 17:
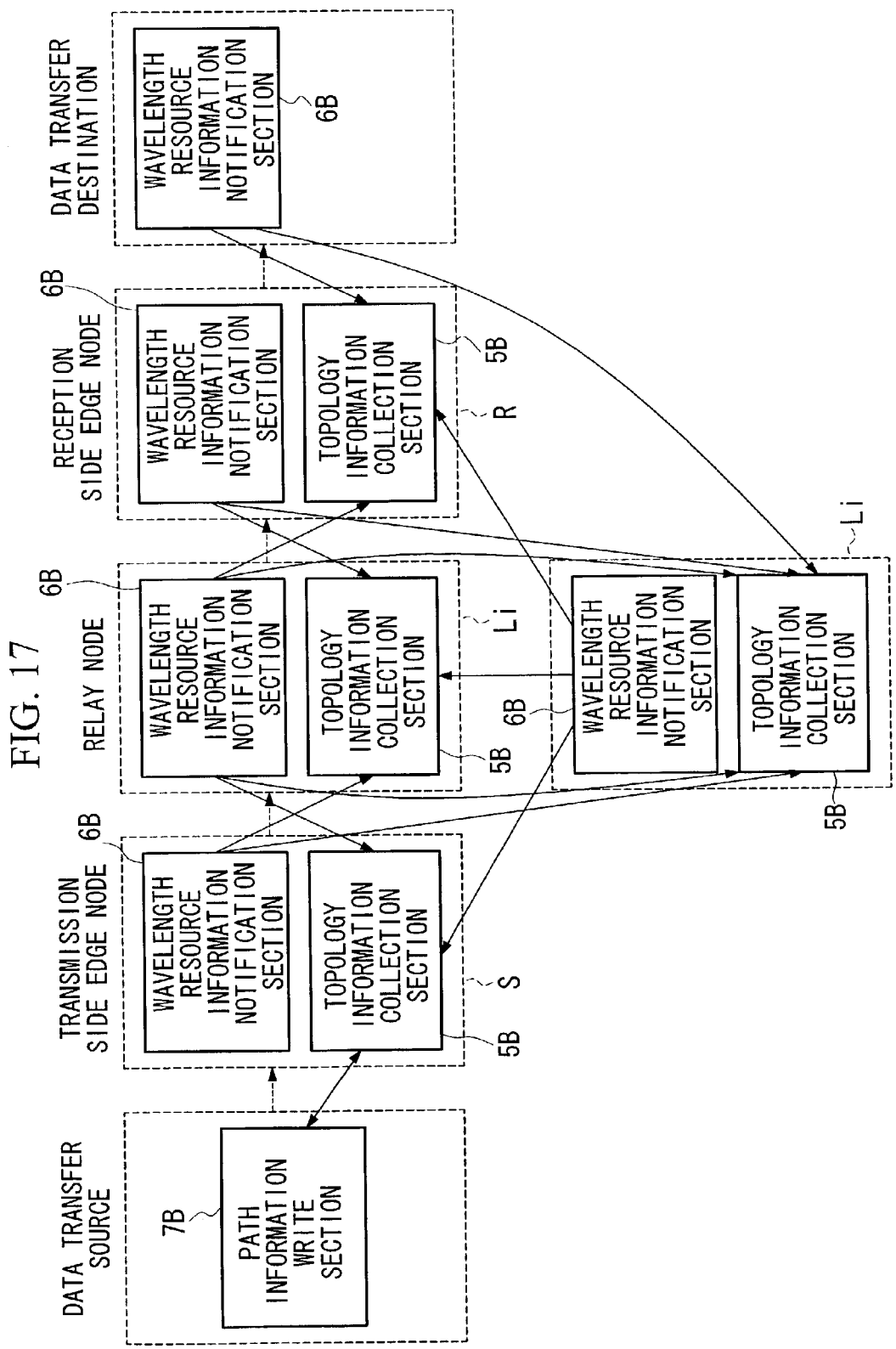
FIG. 17 is another schematic view showing the collection of supervisory topological information.

Next, the fifth through the ninth embodiments of the optical communication network of the present invention will now be explained with reference to FIGS. 1 and 2, and FIGS. 12A through 17. FIG. 1 is a schematic view showing the fifth through the ninth embodiments of the optical communication network of the present invention. FIG. 2 is a diagram for explanation of a burst data detection section 3 and a cut through path establishment and release section 10 of these embodiments of the present invention. FIGS. 12A to 12C are diagrams for explaining the structure of a leading packet in which wavelength information has been written as path information. FIG. 13 is a diagram for explaining a routing which uses this leading packet in which wavelength information has been written as path information. FIGS. 14A to 14C are diagrams for explaining the structure of a leading packet in which router address information has been written as path information. FIG. 15 is a diagram for explaining a routing which uses this leading packet in which router address information has been written as path information. FIG. 16 is a schematic view showing the collection of supervisory topological information. And FIG. 17 is another schematic view showing the collection of autonomous distributed topological information.

The present invention is structured as shown in FIG. 1, and, in these fifth through ninth embodiments, the function of establishing and releasing a cut through path, equivalently to the cut through path establishment and release section 10, may be provided to the transmission side edge node S, the relay nodes L1 through L4, and the reception side edge node R individually, or one or a plurality thereof may be arranged as dispersed upon the optical communication network external to the nodes thereof, as devices which perform overall cut through path management. Furthermore, since this function is a well-known technique, further explanation thereof will be curtailed.

Here, the special feature of the present invention is that the burst data arrival detection section 1 which detects the arrival of the leading packet of burst data is provided to the transmission side edge node S and the relay nodes L1 through L4, and, as shown in FIGS. 12A and 14A, path information is written into this leading packet in advance for establishing a cut through path from the transmission side edge node S to the reception side edge node R; and, when the arrival of a leading packet of burst data to the transmission side edge node S and the relay nodes L1 through L4 has been detected by the burst data arrival detection section 1, the cut through path establishment and release section 10 refers to the path information and establishes a cut through path from the transmission side edge node S or the relay node L1 through L4 to the next stage node, and, as shown in FIGS. 12B and 14B, the portion of the path information which has been used in establishing the cut through path from the transmission side edge node S or the relay node L1 through L4 is deleted in sequence.

Embodiment 5

The fifth embodiment of the present invention will now be explained with reference to FIGS. 12A to 12C and 13. In the fifth embodiment shown in FIGS. 12A to 12C and 13, the path information is wavelength information, and, for each enroute node, the transfer wavelength desired by the data transfer source is written in as a label.

The data transfer source refers to the topology information for the optical communication network and selects the transfer route which it itself desires. Here, as shown in FIG. 13, the desired transfer route is by way of node A as the transmission side edge node S-> by way of node B as the relay node Li-> by way of node C as the reception side edge node R-> the data transfer destination. Furthermore, the transfer route from the data transfer source to the transmission side edge node S will be supposed to be wavelength #s.

The data transfer source refers to the topology information for the optical communication network and retrieves the wavelength information which is necessary for transferring the burst data along the transfer route which it itself desires. As a result, as shown in FIG. 12A, "#a->#b->#c" is appended as a label to the leading packet of the burst data. The IP address of the data transfer destination is written in after this label. It should be understood that only the IP address of the data transfer destination is written into the subsequent packets.

The data transfer source transmits the burst data which contains the leading packet as shown in FIG. 12A using the wavelength #s. An optical path upon the wavelength #s is extended between the data transfer source and the transmission side edge node S, so that this burst data arrives at the transmission side edge node S.

In the transmission side edge node S, the header information of the leading packet is read in by the header information read in section 4. This header information is analyzed by the burst data arrival detection section 1. This burst data arrival detection section 1, as shown in FIGS. 12A to 12C, analyzes whether this is a packet to which a label is affixed, in other words whether it is a leading packet, and notifies the cut through path establishment and release section 10 as to the results of its analysis.

When, having received this notification, the cut through path establishment and release section 10 recognizes the fact that the leading label designates wavelength #a, along with transmitting this leading packet to the optical path upon the wavelength #a which has been established with the relay node Li which is an enroute node, it establishes a cut through path upon the optical path upon this wavelength #a. At this time, the cut through path establishment and release section 10 deletes the designation of the wavelength #a in the leading label. By doing this, in the label of the leading packet which has been transmitted from the transmission side edge node S which is the enroute node A, the leading portion of the label becomes the wavelength #b, as shown in FIG. 12B.

At the relay node Li, the header information of the leading packet is read in by the header information read in section 4. This header information is analyzed by the burst data arrival detection section 1. The burst data arrival section 1, as shown in FIGS. 12A to 12C, derives as a result of its analysis the fact that this is a packet to which a label is affixed, in other words the fact that it is a leading packet, and it notifies the cut through path establishment and release section 10 of the results of its analysis.

When, having received this notification, the cut through path establishment and release section 10 recognizes the fact that the leading label designates wavelength #b, along with transmitting this leading packet to the optical path upon the wavelength #b which has been established with the reception side edge node R which is the next stage enroute node, it establishes a cut through path upon the optical path upon this wavelength #b. At this time, the cut through path establishment and release section 10 deletes the designation of the wavelength #b in the leading label. By doing this, in the label of the leading packet which has been transmitted from the relay node Li which is the enroute node B, the leading portion of the label becomes the wavelength #c.

At the reception side edge node R, the header information of the leading packet is read in by the header information read in section 4. This header information is analyzed by the burst data arrival detection section 1. The burst data arrival section 1, as shown in FIGS. 12A to 12C, derives as a result of its analysis the fact that this is a packet to which a label is affixed, in other words the fact that it is a leading packet, and it notifies the cut through path establishment and release section 10 of the results of its analysis.

When, having received this notification, the cut through path establishment and release section 10 recognizes the fact that the leading label designates wavelength #c, it transmits this leading packet to the optical path upon the wavelength #c which has been established with the data transfer destination which is the next stage node. At this time, the cut through path establishment and release section 10 deletes the designation of the wavelength #c in the leading label. By doing this, the label is deleted from the leading packet which has been transmitted from the reception side edge node R which is the enroute node B, so that, as shown in FIG. 12C, it becomes just the IP address of the data transfer destination.

By the above procedure, a cut through path is established upon an optical path on the wavelengths #a and #b between the transmission side edge node S and the reception side edge node R, and the burst data subsequent to the leading packet is transferred through this cut through path.

When the burst data completion detection section 2 detects that the data transfer has remained blank for more than a predetermined time period, it determines that the burst data has been terminated, and it notifies the cut through path establishment and release section 10 to that effect. The cut through path establishment and release section 10 receives this notification and releases the cut through path.

Embodiment 6

The sixth embodiment of the present invention will now be explained with reference to FIGS. 14A to 14C and 15. In the sixth embodiment shown in FIGS. 14A to 14C and 15, the path information is router address information, and the address of the enroute node desired by the data transfer source is written in as a label.

The data transfer source refers to the topology information for the optical communication network and selects the transfer route which it itself desires. Here, as shown in FIG. 15, the desired transfer route is by way of node A as the transmission side edge node S-> by way of node B as the relay node Li-> by way of node C as the reception side edge node R-> the data transfer destination.

The data transfer source refers to the topology information for the optical communication network and retrieves the router address information which is necessary for transferring the burst data along the transfer route which it itself desires. As a result, as shown in FIG. 14A, "#a->#b->#c->#d" is appended as a list of router addresses to the leading packet of the burst data. It should be understood that "#d" is the IP address of the data transfer destination. Furthermore, only the IP address "#d" of the data transfer destination is written into the subsequent packets.

The data transfer source transmits the burst data which contains a leading packet as shown in FIG. 14A. This leading packet arrives at the transmission side edge node S, which is router address #a.

In the transmission side edge node S, the header information of the leading packet is read in by the header information read in section 4. This header information is analyzed by the burst data arrival detection section 1. As shown in FIGS. 14A to 14C, this burst data arrival detection section 1 analyzes whether this is a packet to which a plurality of router address information is affixed, in other words whether it is a leading packet, and notifies the cut through path establishment and release section 10 as to the results of its analysis.

When, having received this notification, the cut through path establishment and release section 10 recognizes the fact that the router address information designates a transfer from the transmission side edge node S which is the router address #a to the relay node Li which is the router address #b, along with transmitting this leading packet to the optical path which has been established with the relay node Li which is an enroute node, it establishes a cut through path upon this optical path. At this time, the cut through path establishment and release section 10 deletes the designation of the router address #a in the leading router address information. By doing this, in the label of the leading packet which has been transmitted from the transmission side edge node S which is the enroute node A, the leading portion of the label becomes the router address #b, as shown in FIG. 14B.

At the relay node Li, the header information of the leading packet is read in by the header information read in section 4. This header information is analyzed by the burst data arrival detection section 1. The burst data arrival section 1, as shown in FIGS. 14A to 14C, derives as a result of its analysis the fact that this is a packet to which a plurality of router information is affixed, in other words the fact that it is a leading packet, and it notifies the cut through path establishment and release section 10 of the results of its analysis.

When, having received this notification, the cut through path establishment and release section 10 recognizes the fact that the router address information designates a transfer from the relay node Li which is the router address #b to the reception side edge node R which is the router address #c, along with transmitting this leading packet to the optical path which has been established with the reception side edge node R which is the next stage enroute node, it establishes a cut through path upon this optical path. At this time, the cut through path establishment and release section 10 deletes the designation of the router address #b in the leading router address information. By doing this, in the label of the leading packet which has been transmitted from the relay node Li which is the enroute node B, the leading router address information becomes the router address #c.

At the reception side edge node R, the header information of the leading packet is read in by the header information read in section 4. This header information is analyzed by the burst data arrival detection section 1. The burst data arrival section 1, as shown in FIGS. 14A to 14C, derives as a result of its analysis the fact that this is a packet to which a plurality of router information is affixed, in other words the fact that it is a leading packet, and it notifies the cut through path establishment and release section 10 of the results of its analysis.

When, having received this notification, the cut through path establishment and release section 10 recognizes the fact that the router address information designates a transfer from the reception side edge node R which is the router address #c to the data transfer destination which is the router address #d, it transmits this leading packet to the optical path which has been established with the data transfer destination which is the next stage node. At this time, the cut through path establishment and release section 10 deletes the designation of the router address #c in the leading router address information. By doing this, the router address information is deleted from the leading packet which has been transmitted from the reception side edge node R which is the enroute node B, and, as shown in FIG. 14C, it becomes only the IP address #d of the data transfer destination.

By the above procedure, a cut through path between the transmission side edge node S and the reception side edge node R is established upon the optical path between the enroute nodes A, B, and C which have the router addresses #a, #b, and #c, and the burst data subsequent to the leading packet is transferred through this cut through path.

When the burst data completion detection section 2 detects that the data transfer has remained blank for more than a predetermined time period, it determines that the burst data has been terminated, and it notifies the cut through path establishment and release section 10 to that effect. The cut through path establishment and release section 10 receives this notification and releases the cut through path.

Embodiment 7

The seventh embodiment of the present invention will now be explained with reference to FIG. 16. In the fifth and the sixth embodiments, the data transfer source selected a desired transfer route itself by referring to the topology information for the optical communication network. In the second embodiment the topology information was not changed provided that no addition or subtraction of an intermediate node was performed, since topology information based upon router address information was used, and this was acceptable provided that at periodic intervals the router address table was updated and transferred to the data transfer source; but, in the first embodiment, change of the topology information including vacant wavelength information was frequent, since topology information based upon wavelength information was used. The seventh embodiment is an embodiment which relates to the arrangements for collecting together the topology information which is used at this time.

In this seventh embodiment, as shown in FIG. 16, a topology information collection together section 5B is provided for collecting together the topology information for the optical communication network; the transmission side edge node S, the relay nodes Li, and the reception side edge node R are each provided with a wavelength resource information notification section 6B which notifies wavelength resource information to this topology information collection together section 5B; a path information writing section 7B which writes the path information into the leading packet is provided to the data transfer source; and this path information writing section 7B generates the path information by referring to wavelength resource information for each node which has been collected together by the topology information collection together section 5B.

Embodiment 8

The eighth embodiment of the present invention will now be explained with reference to FIG. 17. This eighth embodiment, like the seventh embodiment, is an embodiment related to the arrangements for the collection together of the topology information which is used by the fifth embodiment.

As shown in FIG. 17, the transmission side edge node S, the relay nodes Li and Lj, and the reception side edge node R are each provided with a wavelength resource information notification section 6B all of which mutually notify one another of wavelength resource information which they themselves retain; the data transfer source is provided with a path information writing section 7B which writes the path information into the leading packet; and this path information writing section 7B generates the path information by referring to wavelength resource information for each node which is being retained in the topology information collection together section 5B of the transmission side edge node S.

Embodiment 9

It is possible to implement the optical communication network of the present invention by the use of a computer device. That is to say, it is possible to implement the optical communication network of the present invention using a computer device, by installing upon this computer device a program which is characterized by implementing: as a function which corresponds to the cut through path establishment and release section 10 which establishes and releases a cut through path by way of the transmission side edge node S, the relay nodes L1 through L4, and the reception side edge node R in the optical communication network, a function which corresponds to the burst data arrival detection section 1 which detects the arrival of a leading packet of burst data at the transmission side edge node S and the relay nodes L1 through L4; and a function of, when the arrival of this leading packet of burst data at the transmission side edge node S and the relay node L1 through L4 has been detected by this function for detecting the arrival of a leading packet, establishing a cut through path from the transmission side edge node S or the relay node L1 through L4 to the next stage node by referring to path information for establishing a cut through path from the transmission side edge node S to the reception side edge node R written in advance into this leading packet; and furthermore by implementing, as the establishing function, a function of sequentially deleting the portion of the path information which was used for the transmission side edge node S or the relay node L1 through L4 to establish a cut through path to the next stage node.

Furthermore, it is possible to implement the optical communication network according to the present invention using a computer device, by installing upon that computer device a program which is distinguished by: as a function of the optical communication network, implementing a function which corresponds to the topology information collection together section 5B by collecting together network topology information; as a function of the transmission side edge node S, the relay nodes L1 through L4, and the reception side edge node R which are included in the optical communication network, implementing a function of corresponding to the wavelength resource information notification section 6B by notifying to the collecting together function wavelength resource information which it retains itself; as a function of the data transfer source which is connected to the optical communication network, implementing a function of corresponding to the path information writing section 7B by writing path information into the leading packet; and as this writing in function, implementing a function of generating the path information by referring to the wavelength resource information for each node which has been collected together by the collection together function.

Or, it is possible to implement the optical communication network according to the present invention using a computer device, by installing upon that computer device a program which is distinguished by: as the function of the transmission side edge node S, the relay nodes L1 through L4, and the reception side edge node R which are included in the optical communication network, implementing a function of corresponding to the wavelength resource information notification section 6B by mutually notifying one another of the collecting together function wavelength resource information which they retain themselves; as a function of the data transfer source which is connected to the optical communication network, implementing a function of corresponding to the path information writing section 7B by writing path information into the leading packet; and as this writing in function, implementing a function of generating the path information by referring to the wavelength resource information for each node which the transmission side edge node S retains in its topology information collection together section 5B.

By recording the program according to the present invention upon a recording medium according to the present invention, it is possible to install the program according to the present invention upon the computer device, using this recording medium. Alternatively, it is also possible to install the program according to the present invention upon the computer device directly via a network from a server upon which the program according to the present invention is kept.

By doing this, it is possible to implement the optical communication network with a computer device without it being necessary to establish a cut through path in advance, and accordingly it is possible to perform transfer of the burst data at high efficiency.

Figure 18:
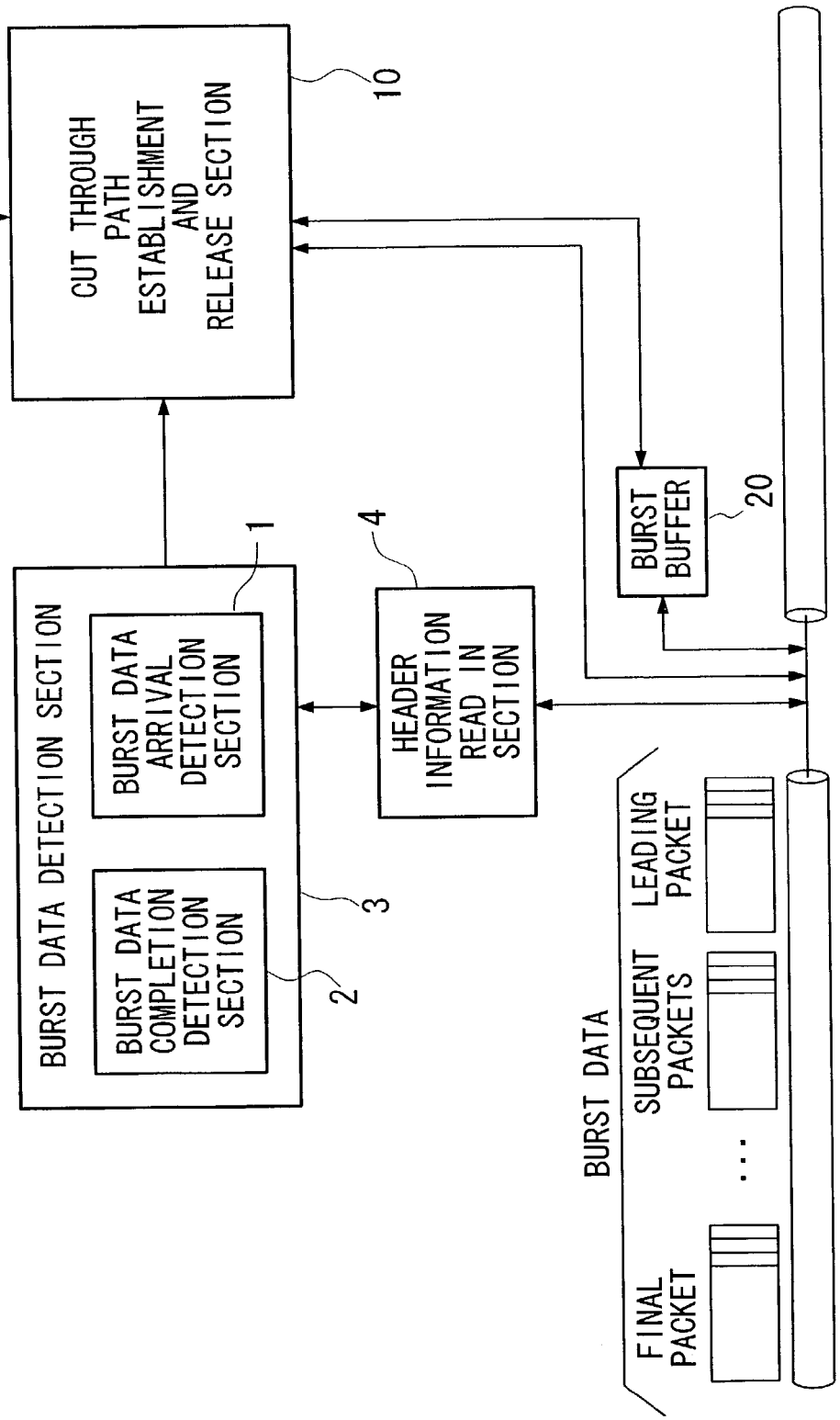
FIG. 18 is a diagram for explanation of a block diagram for a burst data detection section and a cut through path establishment and release section of an embodiment of the present invention.
Figure 19:
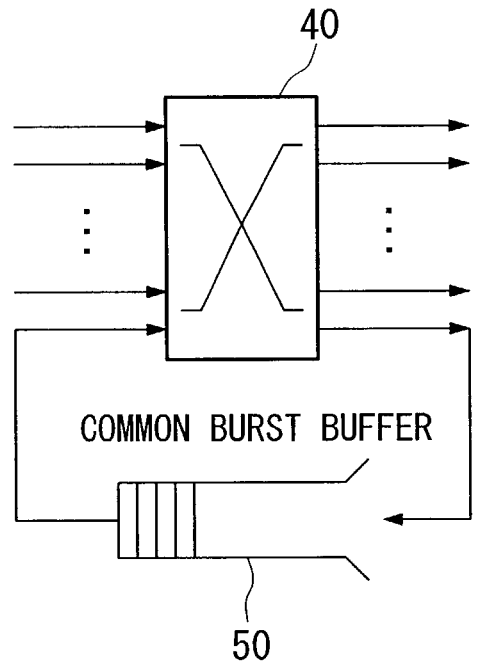
FIG. 19 is a diagram for explanation of a common burst buffer of the tenth embodiment of the present invention.
Figure 20:
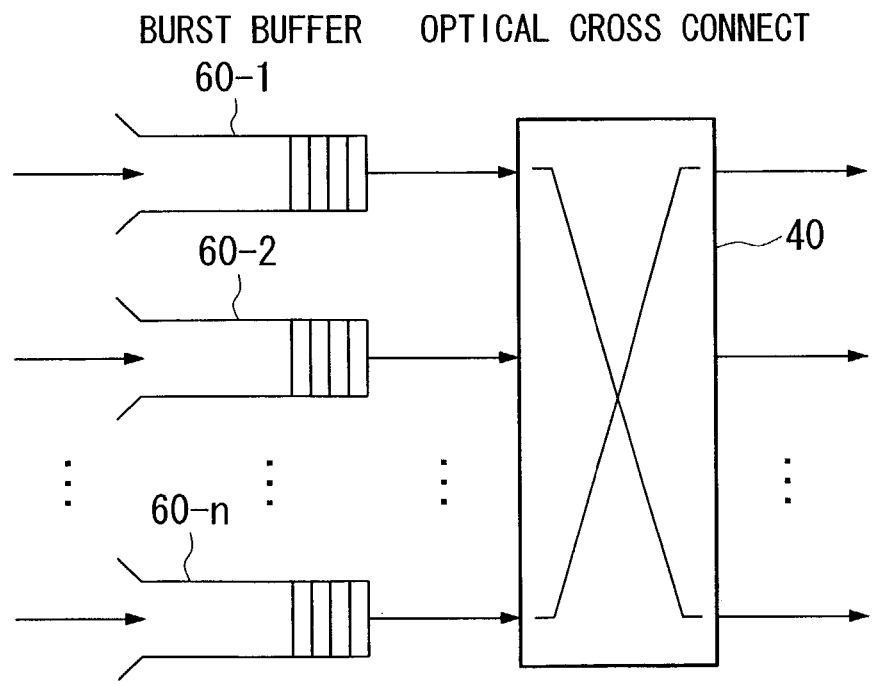
FIG. 20 is a diagram for explanation of a burst buffer which is provided to each input port of the eleventh embodiment of the present invention.
Figure 21:
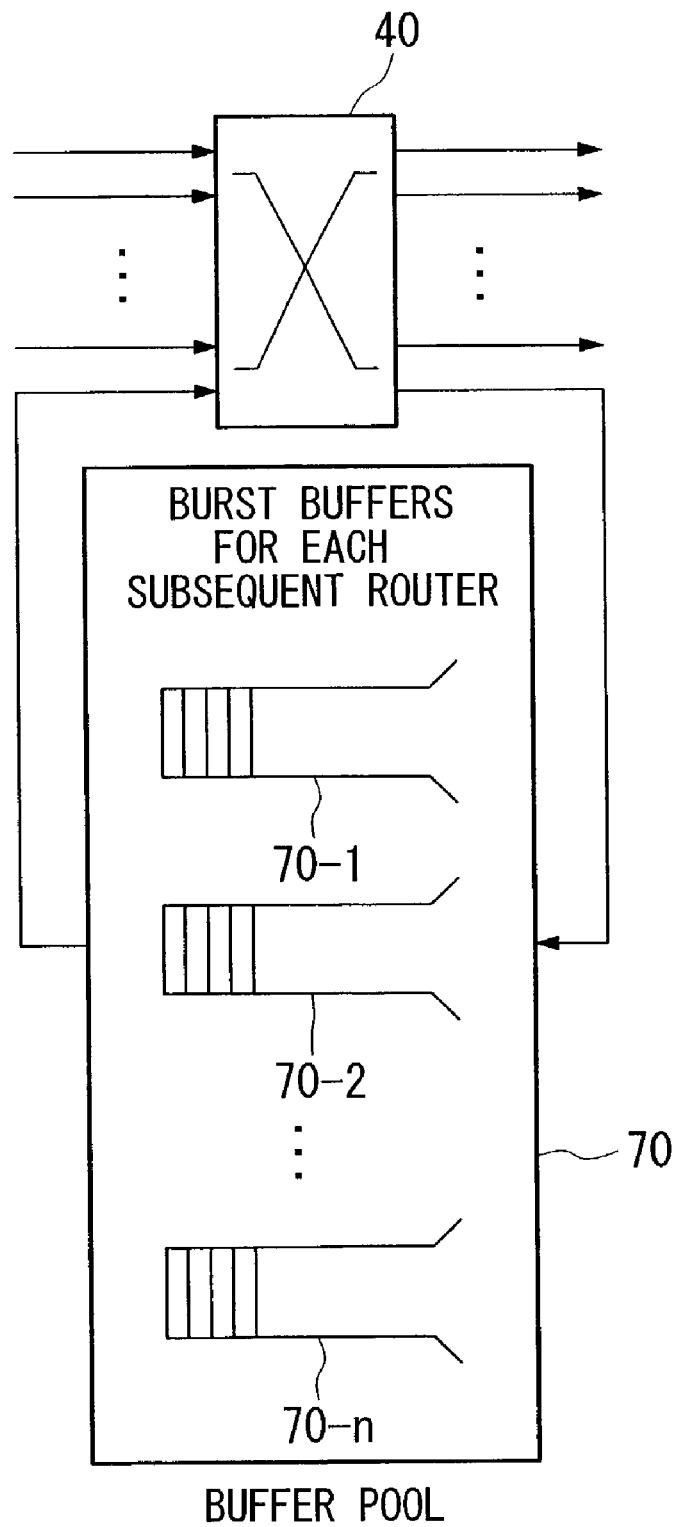
FIG. 21 is a diagram for explanation of a burst buffer which is provided to each subsequent router.

The tenth through the twelfth embodiments of the optical communication network according to the present invention will now be explained with reference to FIG. 1 and FIGS. 18 through 21. FIG. 1 is a schematic diagram showing the optical communication network according to these embodiments of the present invention. FIG. 18 is a diagram for explanation of a burst data detection section and a cut through path establishment and release section of an embodiment of the present invention. FIG. 19 is a diagram for explanation of a common burst buffer of the tenth embodiment of the present invention. FIG. 20 is a diagram for explanation of a burst buffer which is provided to each input port of the eleventh embodiment of the present invention. FIG. 21 is a diagram for explanation of a burst buffer which is provided to each subsequent router.

According to the present invention, in this embodiment, the cut through path establishment and release function is equivalent to the cut through path establishment and release section 10 shown in FIG. 18, and it may be provided individually to each of the transmission side edge node S, the relay nodes L1 through L4, and the reception side edge node R, or alternatively, it may be arranged as one or a plurality of devices which perform overall cut through path management, arranged as dispersed upon the optical communication network outside the nodes thereof.

Here, as shown in FIG. 18, a distinguishing feature of the present invention is that the burst data arrival detection section 1 which detects the arrival of a leading packet of burst data at the transmission side edge node S is provided, and that the cut through path establishment and release section 10 establishes a cut through path from the transmission side edge node S to the reception side edge node R when the arrival of a leading packet of burst data at the transmission side edge node S has been detected by the burst data arrival detection section 1, and comprises a burst buffer 20 which temporarily accumulates the burst data which arrives at the transmission side edge node S until the establishment of the cut through path has been completed; and, when the establishment of the cut through path has been completed, the burst data which has been accumulated in the burst buffer 20 is transferred to the reception side edge node R using the cut through path.

If the transfer speed between the data transfer source and the transmission side edge node S is termed v1, the transfer speed between the data transfer destination and the reception side edge node R is termed v2, and the transfer speed between the transmission side edge node S and the reception side edge node R is termed v3: the burst buffer 20 is included in the transmission side edge node of the communication path which is made up from the transmission side edge node S and the reception side edge node R which accomodate the data transfer source and the data transfer destination, for which $v1 \leq v3$ and also $v2 \leq v3$.

Furthermore, it is possible to implement the optical communication network according to the present invention using a computer device, by installing upon that computer device a program which is distinguished by implementing: as a function which establishes and releases a cut through path by way of the transmission side edge node S, the relay nodes L1 through L4, and the reception side edge node R in the optical communication network, a function which corresponds to the burst data arrival detection section 1 which detects the arrival of a leading packet of burst data at the transmission side edge node S; a function which corresponds to the cut through path establishment and release section 10 which establishes a cut through path from the signal transmission s, when the arrival of this leading packet of burst data at the transmission side edge node S has been detected by this function for detecting the arrival of a leading packet; a function which corresponds to the burst buffer 20 of temporarily accumulating the burst data which arrives at the transmission side edge node S until the establishment of the cut through path by this establishment function is completed; and a function of transferring the burst data which has been accumulated in the burst data temporary accumulation function to the reception side edge node R using the cut through path, when the establishment of the cut through path has been completed by the establishment function.

Next, the operation of the transmission side edge node in the tenth through the twelfth embodiments of the optical communication network of the present invention will be explained with reference to FIG. 16. When the burst data arrives, the header information in its leading packet is read in by the header information read in section 4, and is analyzed by the burst data arrival detection section of the burst data detection section 3. A decision is made as to whether or not this is data which should be transmitted via a cut through path, and if the result of this decision is that the data which has arrived is not burst data but is sporadic data, then IP transfer is performed. On the other hand, if the result of this decision is that the data which has arrived is burst data, then, in concrete terms, information is written into the header information which indicates that this packet is a leading packet of burst data. As this information which indicates that this packet is a leading packet of burst data, information related to the number of subsequent packets or information related to the length of subsequent packets may be used.

Here, the cut through path establishment and release section 10 receives the result of detection from the burst data arrival detection section 1 and performs establishment of a cut through path from the transmission side edge node S to the reception side edge node R. No particular explanation will be provided in relation to this establishment procedure, since it is per se the same as already explained. The burst data which arrives during this interval is accumulated in the burst buffer 20.

The cut through path establishment and release section 10 transfers the burst data which has been accumulated in the burst buffer 20 using the cut through path, when it receives a notification from the reception side edge node R that the establishment has been completed.

In the previous discussion the tenth through the twelfth embodiments of the present invention have been explained in overall terms. In the following, these tenth through twelfth embodiments will be explained with reference to FIGS. 19 through 21, with particular emphasis being put upon the structure of the burst buffer.

Embodiment 10

The tenth embodiment of the present invention will now be explained with reference to FIG. 19. In this tenth embodiment, a single common burst buffer 50 is provided for an optical cross connect 40 which accommodates a plurality of input lines. A plurality of streams of burst data arrive from a plurality of input lines, and are accumulated in this single common burst buffer 50. It is possible to discriminate between this plurality of streams of burst data on the basis of the header information in their leading packets, and reading out of these streams of burst data is performed using this header information. By doing this it is possible to increase the simplicity of the structure, along with being able to make the scale of the burst buffer comparatively small.

Embodiment 11

The eleventh embodiment of the present invention will now be explained with reference to FIG. 20. With this eleventh embodiment, an individual burst buffer 60-1 through 60-n is provided to each of the plurality of input lines. According to this eleventh embodiment it is possible to simplify the control procedure, since it will be acceptable simply to wait for an output line to be vacant.

Embodiment 12

The twelfth embodiment of the present invention will now be explained with reference to FIG. 21. The construction in this twelfth embodiment is that individual burst buffers 70-1 through 70-n are provided within a buffer pool 70 for each subsequent router. According to this twelfth embodiment, it is possible to simplify the control procedure further over the eleventh embodiment, since each wavelength path to the subsequent router is met with.

Figure 22:
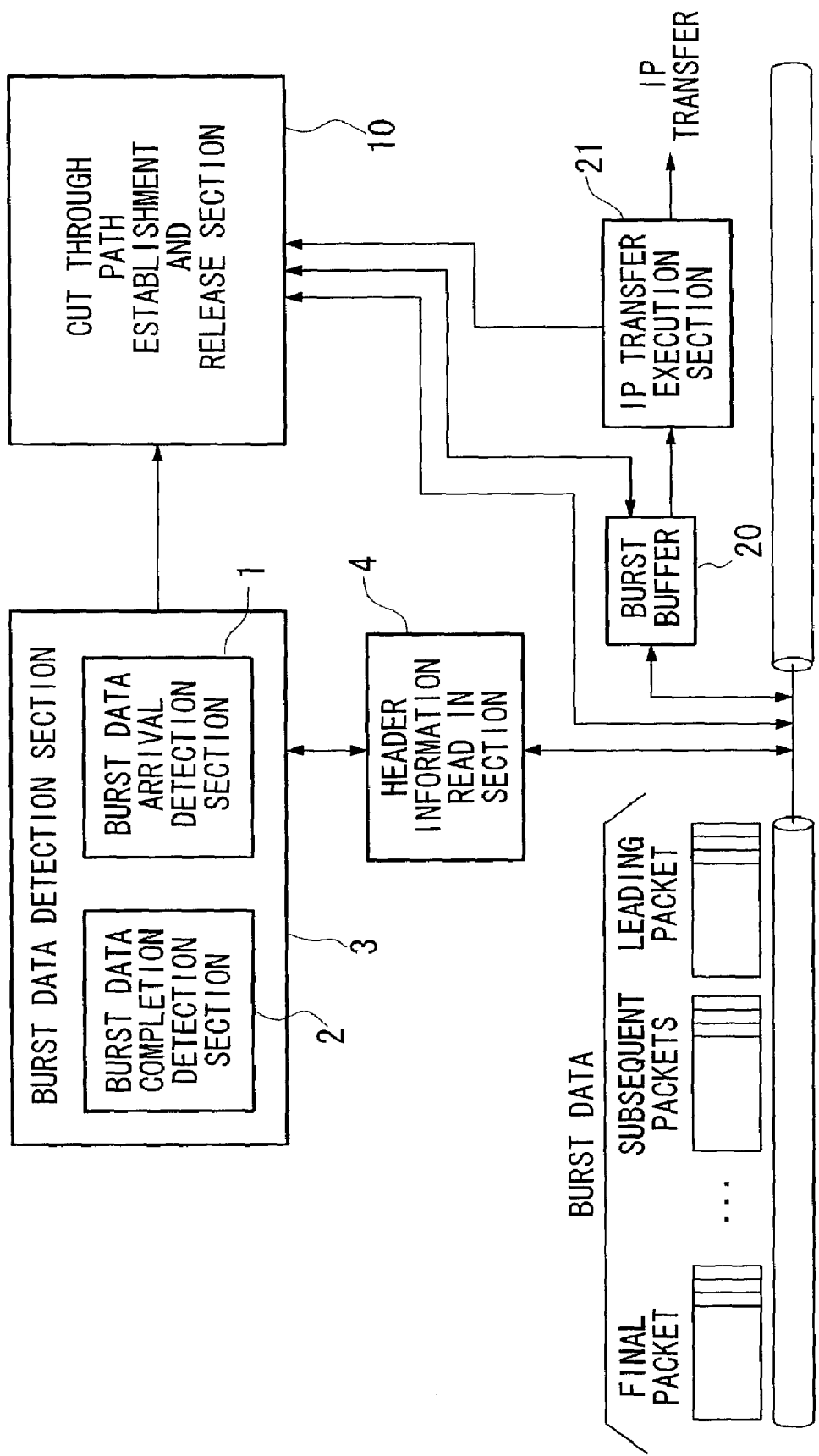
FIG. 22 is a diagram for explanation of a burst data detection section and a cut through path establishment and release section of an embodiment of the present invention.
Figure 23:
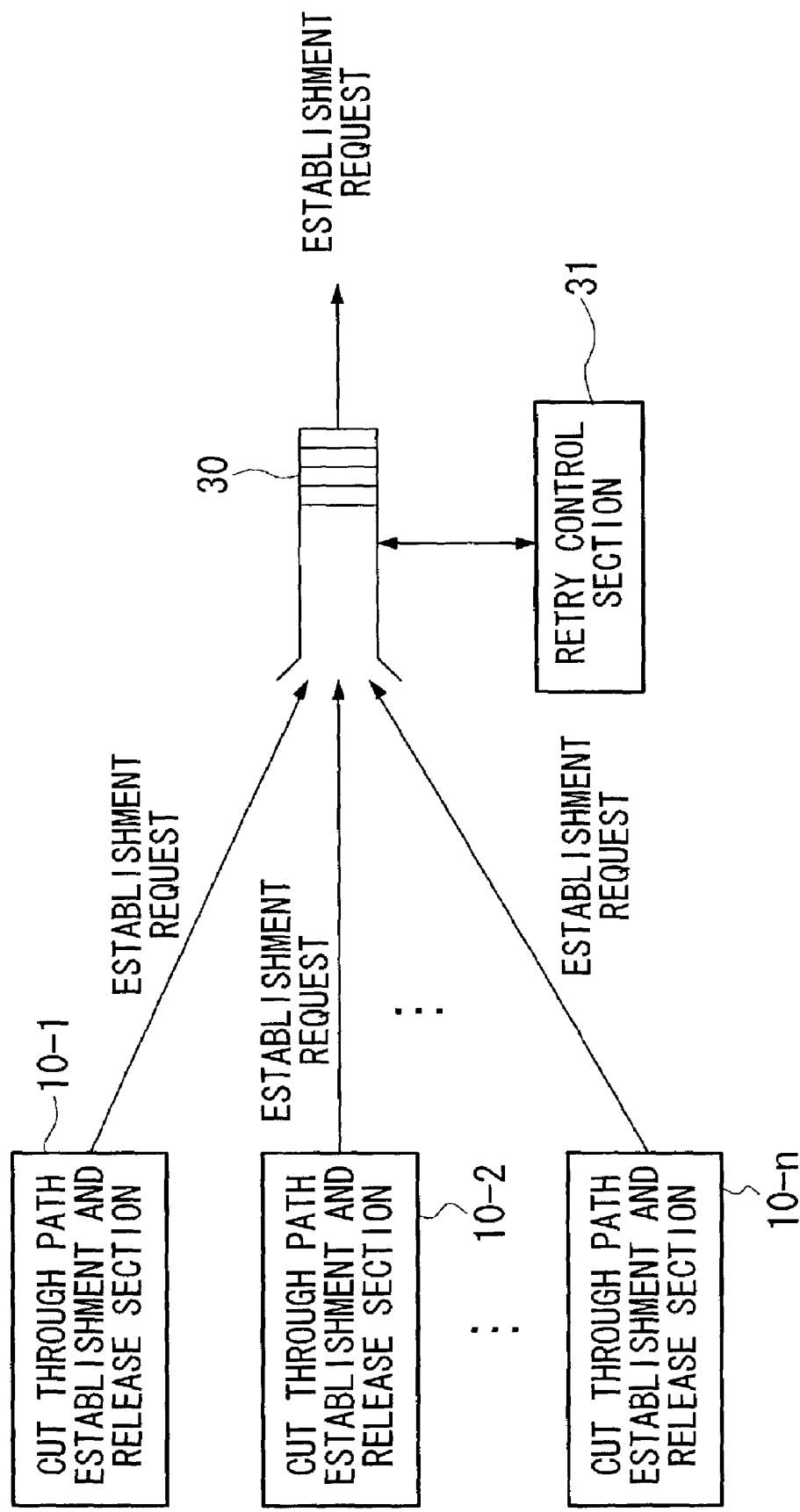
FIG. 23 is a diagram for explanation of an establishment request waiting information queue utilized in an embodiment of the present invention.
Figure 24:
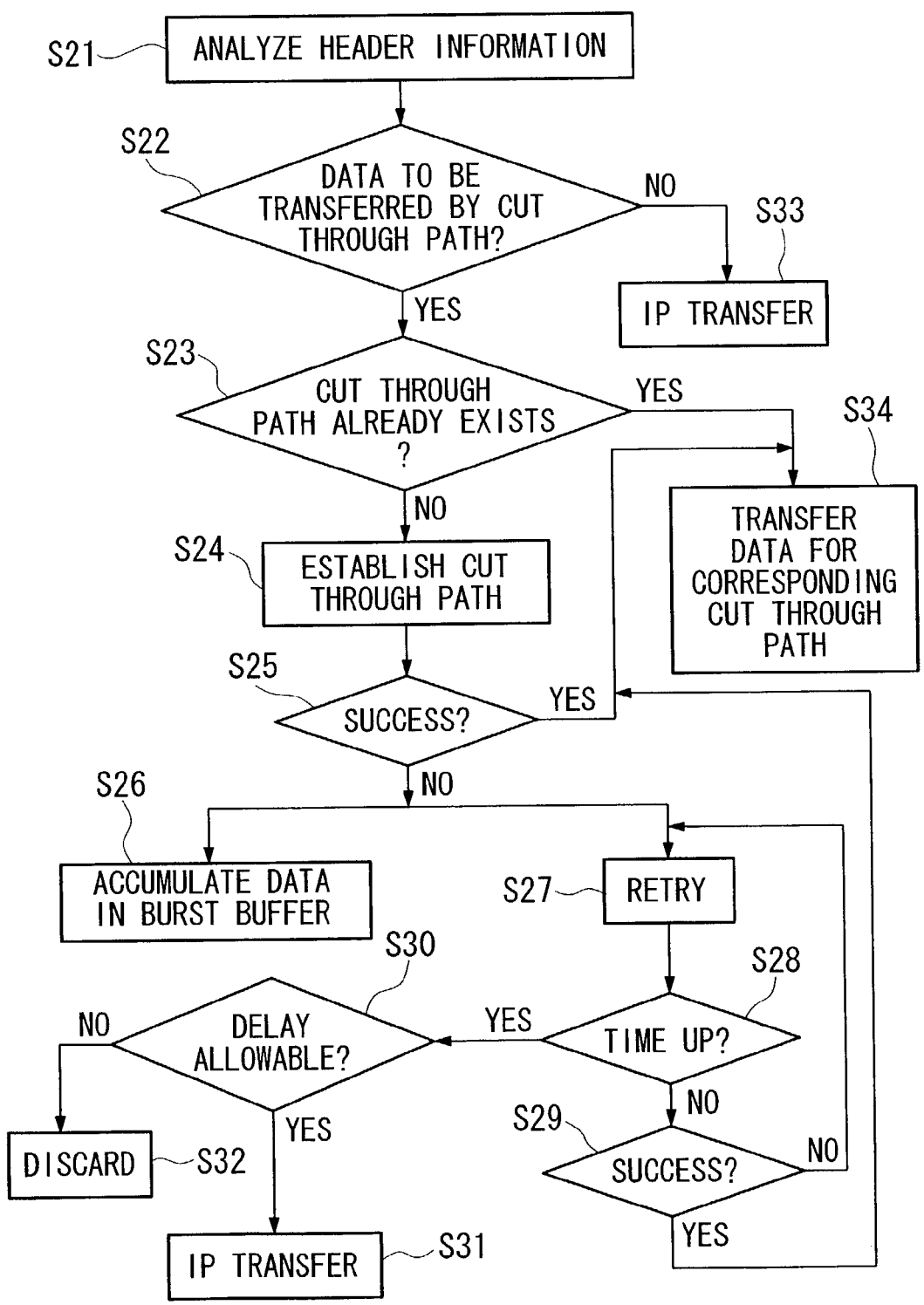
FIG. 24 is a flow chart showing the control flow of a burst data transfer operation in an embodiment of the present invention.

The thirteenth through the fifteenth embodiments of the present invention will now be explained with reference to FIGS. 1 and 19 through 24. FIG. 1 is a schematic view of the optical communication network according to the embodiments of the present invention. FIG. 22 is a diagram for explanation of a burst data detection section and a cut through path establishment and release section of an embodiment of the present invention. FIG. 23 is a diagram for explanation of an establishment request waiting information queue utilized in an embodiment of the present invention. FIG. 24 is a flow chart showing the control flow of a burst data transfer operation in the thirteenth through the fifteenth embodiments of the present invention. FIG. 19 is a diagram for explanation of a common burst buffer of the thirteenth embodiment of the present invention. FIG. 20 is a diagram for explanation of a burst buffer which is provided to each input port of the fourteenth embodiment of the present invention. And FIG. 21 is a diagram for explanation of a burst buffer which is provided to each subsequent router.

According to the present invention, in this embodiment, the cut through path establishment and release function is equivalent to the cut through path establishment and release section 10 shown in FIG. 22, and it may be provided individually to each of the transmission side edge node S, the relay nodes L1 through L4, and the reception side edge node R, or alternatively, it may be arranged as one or a plurality of devices which perform overall cut through path management, arranged as dispersed upon the optical communication network outside the nodes thereof.

Here, the point of distinction of the present invention, as shown in FIG. 22, is that the burst data arrival detection section 1 which detects the arrival of a leading packet of burst data at the transmission side edge node S and the relay nodes L1 through L4 is provided, and that the cut through path establishment and release section 10 establishes a cut through path from the transmission side edge node S or the relay node L1 through L4 to the next stage node when the arrival of a leading packet of burst data at the transmission side edge node S or the relay node L1 through L4 has been detected by the burst data arrival detection section 1, and comprises a burst buffer 20 which, when the establishment of a cut through path by the cut through path establishment and release section 10 is impossible, accumulates for a fixed time period the burst data which arrives at the node at which this establishment has been impossible; and, when the cut through path establishment and release section 10 has succeeded in establishing a cut through path within the predetermined time period, the burst data which has been accumulated in the burst buffer 20 is transferred to the next stage node using the cut through path.

On the other hand, when a cut through path cannot be established, the cut through path establishment and release section 10 retries the establishment of the cut through path for a predetermined number of times. Furthermore, as shown in FIG. 23, there are comprised an establishment request waiting information queue 30 which temporarily accumulates the cut through path establishment requests when establishment of a cut through path by the cut through path establishment and release sections 10-1 through 10-n is impossible, and a retry control section 31; and this retry control section 31 requests establishment of a cut through path from each of the cut through path establishment and release sections 10, from the leading establishment request in this queue in sequence, a predetermined number of times.

Furthermore, there is comprised an IP transfer execution section 21 which, when the cut through path establishment and release section 10 has not succeeded in establishing a cut through path within the predetermined time period, transfers the packets which make up the burst data which has been accumulated in the burst buffer 20 not by using the cut through path, but according to their IP addresses. Or alternatively, when the cut through path establishment and release section 10 has not succeeded in establishing a cut through path within the predetermined time period, the burst data which has been accumulated in the burst buffer 20 may be discarded. It should be understood that this discarding of the burst data which has been accumulated in the burst buffer 20 is performed if the delay permissible value of this burst data is within the predetermined time period, while on the other hand IP transfer is performed if the delay permissible value of this burst data is greater than the predetermined time period.

FIG. 24 is a flow chart showing the flow of burst data transfer operation in the thirteenth through the fifteenth embodiments of the present invention. The header information in the data which arrives is read in by the header information read in section 4, and is analyzed (in the step S21) by the burst data arrival detection section 1 of the burst data detection section 3. A decision is made (in the step S22) as to whether or not this data is data which should be transferred by a cut through path, and if the result of this decision is that this data which has arrived is not burst data but is sporadic data, it is transferred by IP transfer (in the step S33). In concrete terms, information which shows that this packet is a leading packet of burst data is written into the header information. Such information which shows that this packet is a leading packet may be subsequent packet number information or subsequent packet length information. Furthermore, if the data which has arrived is burst data, then the burst data arrival detection section 1 decides (in the step S22) that this data is indeed data which should be transferred by a cut through path. If at this time a cut through path is already established (the step S23), then data transfer is performed using that cut through path (in the step S34). However, if no cut through path is yet established (the step S23), then establishment of a cut through path is performed by the cut through path establishment and release section 10 (in the step S24). If this establishment is successful (the step S25), data transfer is performed by using this cut through path (in the step S34). If this establishment is a failure (the step S25), then the data is put into the burst buffer 20 (in the step S26) and the establishment of the cut through path is retried (in the step S27). If, by repeating the retrying for a predetermined number of times within the predetermined time period, the establishment of a cut through path proves to be successful (the steps S28 and S29), then data transfer is performed using that cut through path (in the step S34). On the other hand, if despite repeating the retrying for the predetermined number of times within the predetermined time period, failure still proves to occur in the establishment of the cut through path (the steps S28 and S29), then, if the data which is accumulated in the burst buffer 20 is within the delay permissible range (the step S30), this data is transferred by IP transfer (in the step S31). On the other hand, if the data which is accumulated in the burst buffer 20 is outside the delay permissible range (the step S30), then this data is discarded (in the step S32).

Furthermore, it is possible to implement the optical communication network according to the thirteenth through the fifteenth embodiments of the present invention using a computer device, by installing upon that computer device a program which is distinguished by implementing, as a function, in the optical communication network, of establishing and releasing a cut through path by way of a transmission side edge node S and relay nodes L1 through L4: a function of detecting the arrival of a leading packet of burst data at the transmission side edge node S or the relay nodes L1 through L4; a function of, when the arrival of the leading packet of burst data is detected by the leading packet arrival detection function, establishing a cut through path from the node at which the arrival of the leading packet has been detected to the next stage node; a function of, if the establishment of a cut through path by this establishment function has proved to be impossible, accumulating the burst data which arrives at the node at which the establishment has become impossible for a predetermined time period; and a function of transferring the burst data which has been accumulated in the burst data predetermined time period accumulation function to the next stage node using the cut through path, when the establishment of the cut through path within the predetermined time period by the establishment function has proved to be successful.

As this establishment function, it is desirable to implement the function of, when it is impossible to establish the cut through path, retrying to establish the cut through path a predetermined number of times.

Furthermore, it is also possible to implement a function which corresponds to the establishment request waiting information queue which temporarily accumulates the cut through path establishment requests when the establishment of a cut through path by the establishment function proves to be impossible, and, as the establishment function, to implement a function of retrying the establishment of a cut through path a predetermined number of times from the leading establishment request in this queue in sequence.

Yet further it is possible to implement a function of, if the establishment of a cut through path by the establishment function has not been successful within the predetermined time period, transferring by IP transfer according to their IP addresses without using any cut through path the packets which make up the burst data which has accumulated for the predetermined time period in the function for accumulating the burst data, or a function of, if the establishment of a cut through path by the establishment function has not been successful within the predetermined time period, discarding the burst data which has accumulated for the predetermined time period in the function for accumulating the burst data.

In the previous discussion the thirteenth through the fifteenth embodiments of the present invention have been explained in overall terms. In the following, these thirteenth through fifteenth embodiments will be explained with reference to FIGS. 19 through 21, with particular emphasis being put upon the structure of the burst buffer.

Embodiment 13

The thirteenth embodiment of the present invention will now be explained with reference to FIG. 19. In this thirteenth embodiment, a single common burst buffer 50 is provided for an optical cross connect 40 which accommodates a plurality of input lines. A plurality of streams of burst data arrive from a plurality of input lines, and are accumulated in this single common burst buffer 50. It is possible to discriminate between this plurality of streams of burst data on the basis of the header information in their leading packets, and reading out of these streams of burst data is performed using this header information. By doing this it is possible to increase the simplicity of the structure, along with being able to make the scale of the burst buffer comparatively small.

Embodiment 14

The fourteenth embodiment of the present invention will now be explained with reference to FIG. 20. With this fourteenth embodiment, an individual burst buffer 60-1 through 60-n is provided to each of the plurality of input lines. According to this fourteenth embodiment it is possible to simplify the control procedure, since it will be acceptable simply to wait for an output line to be vacant.

Embodiment 15

The fifteenth embodiment of the present invention will now be explained with reference to FIG. 21. The construction in this fifteenth embodiment is that individual burst buffers 70-1 through 70-n are provided within a buffer pool 70 for each subsequent router. According to this fifteenth embodiment, it is possible to simplify the control procedure further over the fourteenth embodiment, since each wavelength path to the subsequent router is met with.

Next, the sixteenth through the eighteenth embodiments of the present invention will be explained with reference to FIGS. 1, 18, and 25 through 27.

Embodiment 16

Figure 25:
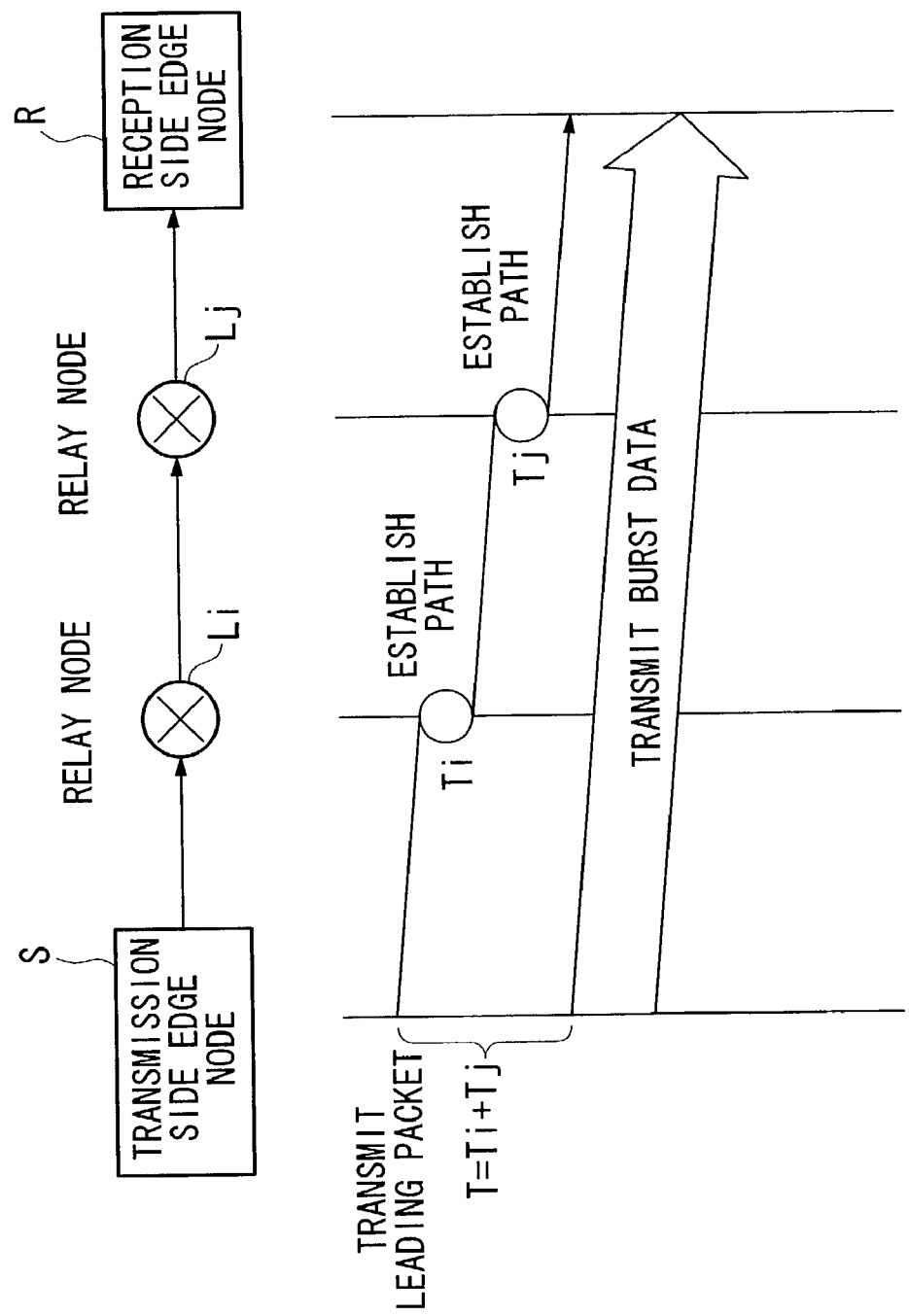
FIG. 25 is a diagram showing a delay time period, at a transmission side edge node, from the transmission of a leading packet until burst data transmission, in an embodiment of the present invention.
Figure 26:
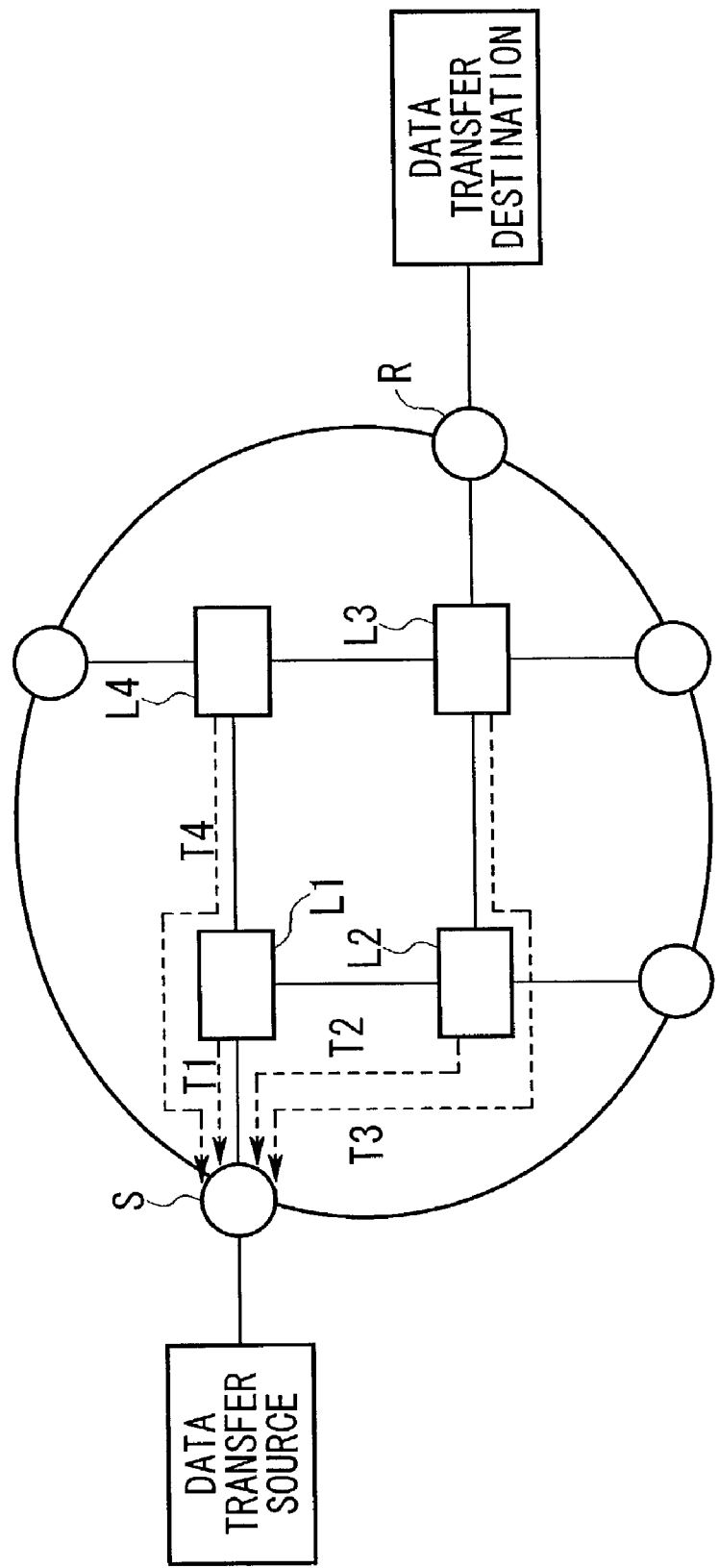
FIG. 26 is a diagram showing a statistical information notification of a cut through path establishment processing time period from a relay node to a transmission side edge node, in a sixteenth embodiment of the present invention.

The sixteenth embodiment of the optical communication network according to the present invention will now be explained with reference to FIGS. 1, 18, 25, and 26. FIG. 18 is a block diagram for a burst data detection section and a cut through path establishment and release section of the sixteenth through the eighteenth embodiments of the present invention. FIG. 25 is a diagram showing a delay time period, at a transmission side edge node, from the transmission of a leading packet until burst data transmission, in the sixteenth through the eighteenth embodiments of the present invention. FIG. 26 is a diagram showing a statistical information notification of a cut through path establishment processing time period from a relay node to a transmission side edge node, in the sixteenth embodiment of the present invention.

It should be noted that although, in the sixteenth through the eighteenth embodiments of the present invention, for the sake of making the explanation clearer, the transmission side edge node S and the reception side edge node R have been described as being separate, in actual fact, it is possible to provide an edge node with both the transmission side function and also the reception side function, so that it can perform communication in both directions.

According to the present invention, in FIG. 1, in these embodiments, the cut through path establishment and release function is equivalent to the cut through path establishment and release section 10 shown in FIG. 18, and it may be provided individually to each of the transmission side edge node S, the relay nodes L1 through L4, and the reception side edge node R, or alternatively, it may be arranged as one or a plurality of devices which perform overall cut through path management, arranged as dispersed upon the optical communication network outside the nodes thereof. Furthermore, the explanation of the details of this function will be curtailed, since it is a well-known technique.

Here, the point of distinction of the present invention, as shown in FIG. 18, is that the burst data arrival detection section 1 which detects the arrival of a leading packet of burst data at the transmission side edge node S and the relay nodes L1 through L4 is provided, and that the cut through path establishment and release section 10 establishes a cut through path from the transmission side edge node S or the relay node L1 through L4 to the next stage node when the arrival of a leading packet of burst data at the transmission side edge node S or the relay node L1 through L4 has been detected by the burst data arrival detection section 1; and the transmission side edge node S, as shown in FIG. 25, comprises a burst buffer 20 for delaying the transmission of the burst data subsequent to the leading packet for a time equal to the sum of the cut through path establishment processing time periods of the relay nodes Li, Lj (where i and j can be any of 1 through 4) through which it is predicted, by a leading packet which it has transmitted itself, that the cut through path will be established.

The cut through path establishment and release section 10 predicts the relay nodes Li, Lj through which it is predicted by a leading packet which the transmission side edge node S has itself transmitted, based upon the topology information for the optical communication network, that the cut through path which it establishes will pass, and calculates the sum of the cut through path establishment processing time periods for these various relay nodes Li, Lj.

The relay nodes L1 through L4, as shown in FIG. 26, individually notify to the cut through path establishment and release section 10 statistical information T1 through T4 relating to cut through path establishment processing time periods for past leading packet arrival times, and the cut through path establishment and release section 10 calculates the sum of the cut through path establishment processing time periods according to this statistical information T1 through T4.

In other words, in the cut through path establishment and release section 10 of the transmission side edge node S, at the time point when it itself detects a leading packet of burst data and establishes a cut through path to the next stage node, although it is not possible yet to determine positively via which relay nodes the cut through path will go after the next stage node, it is possible almost to establish a predicted path from the topology information relating to the optical communication network. The sum of the individual cut through path establishment processing time periods for the plurality of relay nodes through which the cut through path is predicted to pass is calculated, and a delay given by this time period is imparted to the start of the transfer of the burst data subsequent to the leading packet thereof. Even if, hypothetically, the actually established path for the cut through path turns out to differ more or less from the path which it was predicted would be established, it is possible to provide the most suitable time difference between the time instant at which the leading packet is transmitted and the time instant at which the burst data is transmitted, since it is likely that its hop number will hardly differ, and since furthermore, as well, there will be hardly any difference with regard to the cut through path establishment processing time period at each relay node, because it is averaged according to the statistical information.

Embodiment 17

Figure 27:
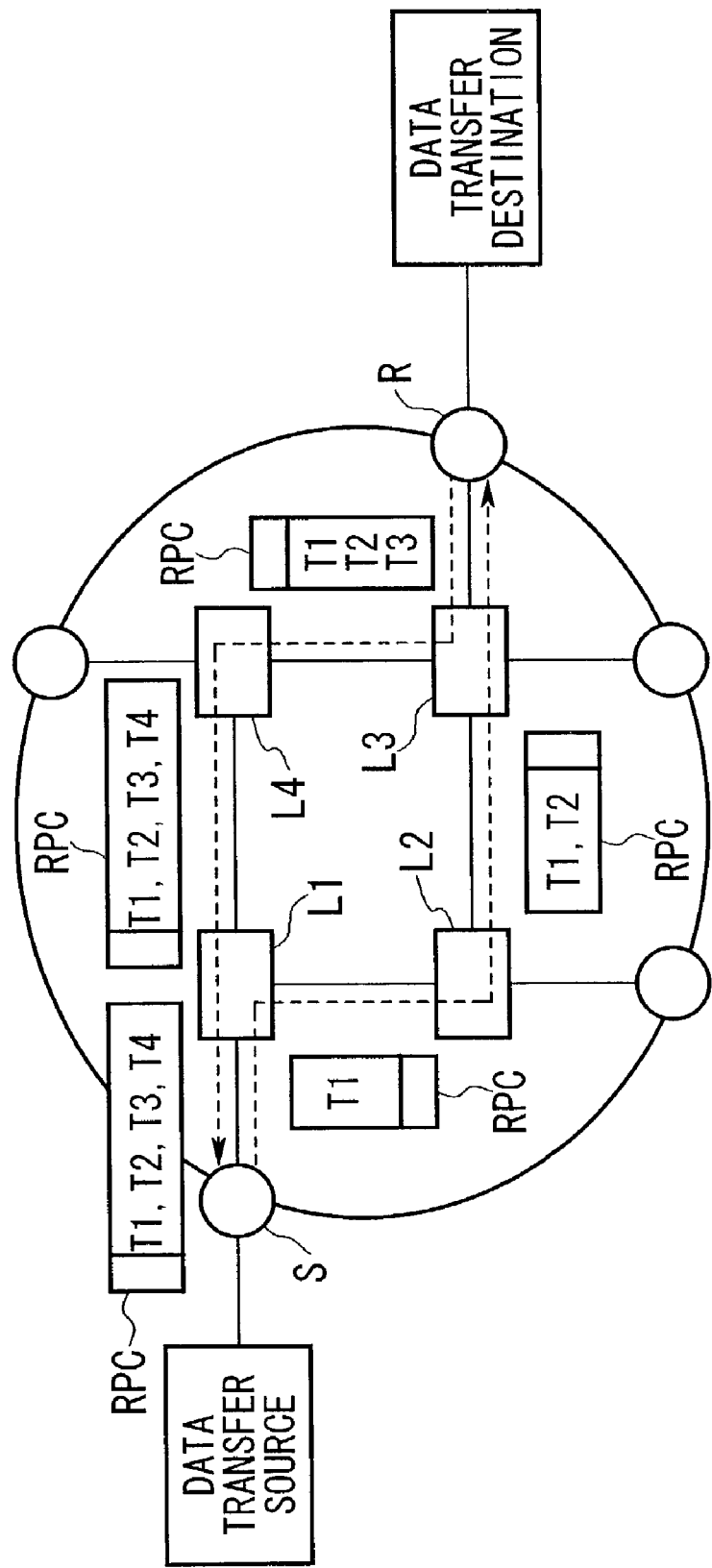
FIG. 27 is a diagram showing a statistical information notification of a cut through path establishment processing time period from a relay node to a transmission side edge node, in a seventeenth embodiment of the present invention.

The seventeenth embodiment of the optical communication network according to the present invention will now be explained with reference to FIG. 27. FIG. 27 is a diagram showing a statistical information notification of a cut through path establishment processing time period from a relay node to a transmission side edge node, in this seventeenth embodiment of the present invention. With this seventeenth embodiment, as shown in FIG. 27, the cut through path establishment and release section 10 of the transmission side edge node S periodically transmits a route performance check packet RPC addressed to the reception side edge node R; when the reception side edge node R receives this route performance check packet RPC, it returns another route performance check packet RPC addressed to the transmission side edge node S which is its origin; the relay nodes L1 through L4, when the route performance check packet RPC arrives, record the cut through path establishment processing time periods for leading packets which arrived in the past in this route performance check packet RPC as statistical information; and the cut through path establishment and release section 10 of the transmission side edge node S calculates the sum of the cut through path establishment processing time periods according to the statistical information which is recorded in the route performance check packet RPC.

Embodiment 18

Furthermore, it is possible to implement the optical communication network according to the present invention using a computer device; in detail, by installing upon that computer device a program which is distinguished by implementing the function of, as a function which corresponds to the cut through path establishment and release section 10 which establishes and releases a cut through path by way of the transmission side edge node S, the relay nodes L1 through L4, and the reception side edge node R in the optical communication network, a function which corresponds to the burst data arrival detection section 1 which detects the arrival of a leading packet of burst data at the transmission side edge node S and the relay nodes L1 through L4; a function of, when the arrival of the leading packet of burst data at the transmission side edge node S or the relay node L1 through L4 has been detected by the function for detecting the arrival of the leading packet, establishing a cut through path from the transmission side edge node S or the relay node L1 through L4 to the next stage node; and, as a function of the transmission side edge node S, the function of delaying the transmission of the burst data subsequent to the leading packet by the sum of the cut through path establishment processing time periods at the relay nodes Li, Lj predicted to be upon the cut through path as established by the leading packet that it itself transmitted.

As this delay function, there may be implemented a function of predicting the relay nodes Li, Lj which it is predicted the cut through path which is established by the leading packet which the transmission side edge node S itself transmits will pass through, based upon the topology information for the optical communication network, and a function of calculating the sum of the cut through path establishment processing time periods for each of the individual relay nodes Li, Lj.

Furthermore, as a function of each of the relay nodes L1 through L4, there may be implemented a function of notifying to the calculation function statistical information relating to cut through path establishment processing time periods for leading packet arrival time in the past; and the calculation function may implement a function of calculating the sum of the cut through path establishment processing time periods according to the statistical information which has been notified by this notification function.

Or, as a function of the transmission side edge node S, there may be implemented a function of periodically transmitting a route performance check packet RPC addressed to the reception side edge node R; as a function of the reception side edge node R, there may be implemented a function of, when the route performance check packet RPC is received, returning this route performance check packet RPC addressed to the transmission side edge node S which is the signal source; as a function of each of the relay nodes L1 through L4, there may be implemented, when the route performance check packet RPC has arrived, a function of recording in this route performance check packet RPC statistical information relating to cut through path establishment processing time periods for leading packet arrival time in the past; and as the calculation function, there may be implemented a function of calculating the sum of the cut through path establishment processing time periods according to the statistical information which is recorded in the route performance check packet RPC.

Next, the nineteenth through the twenty-sixth embodiments of the present invention will be explained with reference to FIGS. 28 through 39.

Figure 28:
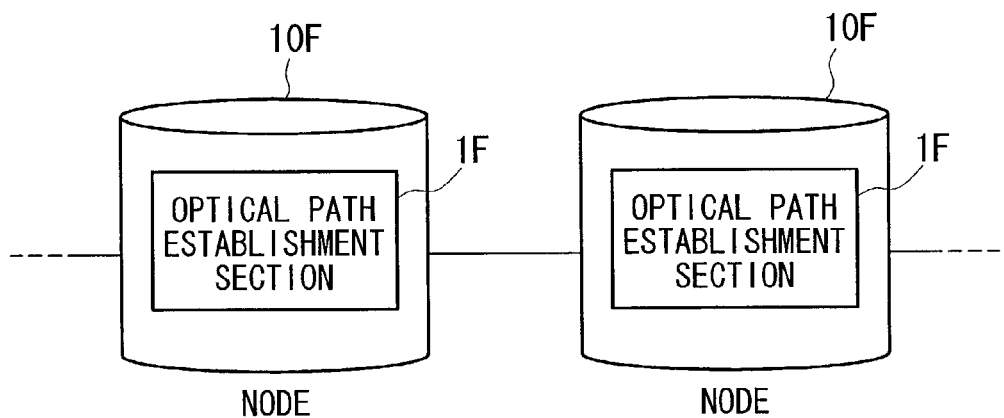
FIG. 28 is a diagram showing a node which is provided to an optical path establishment section of this embodiment.
Figure 31:
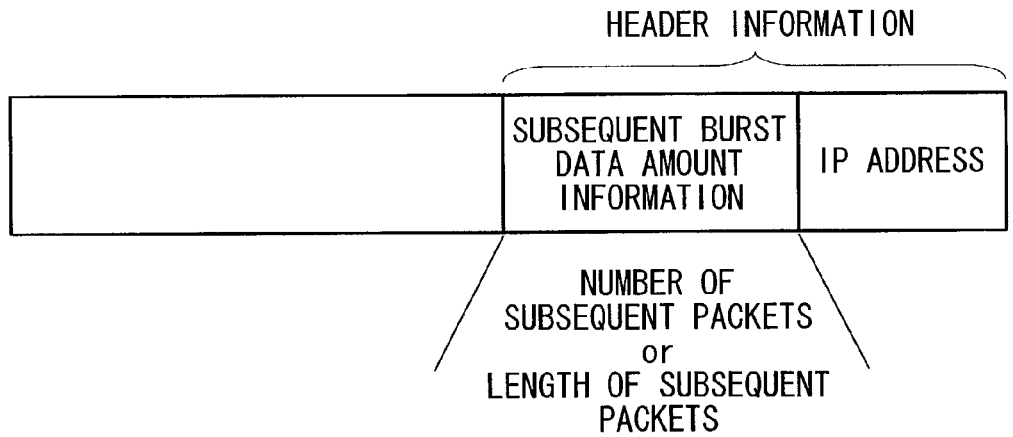
FIG. 31 is a diagram showing the structure of a burst data leading packet of this embodiment.
Figure 32:
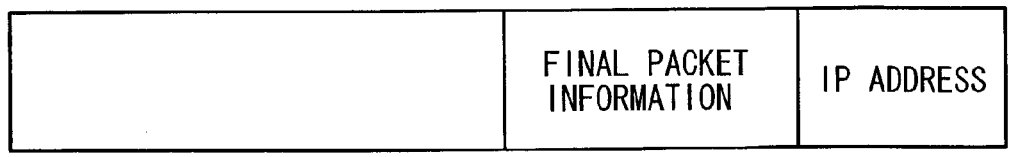
FIG. 32 is a diagram showing the structure of a burst data final packet of this embodiment.
Figure 29:
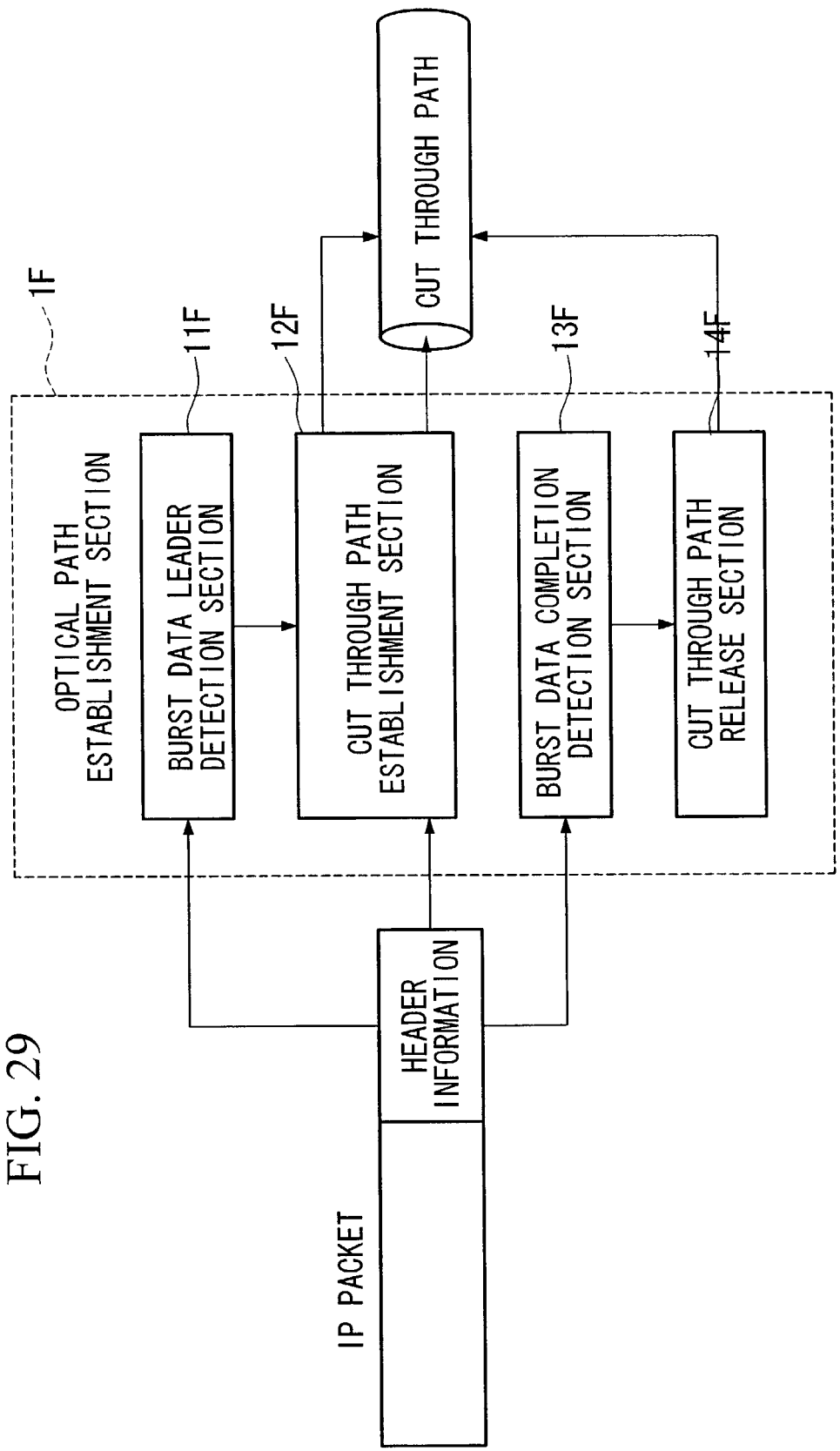
FIG. 29 is a block diagram of this optical path establishment section of this embodiment.
Figure 30:
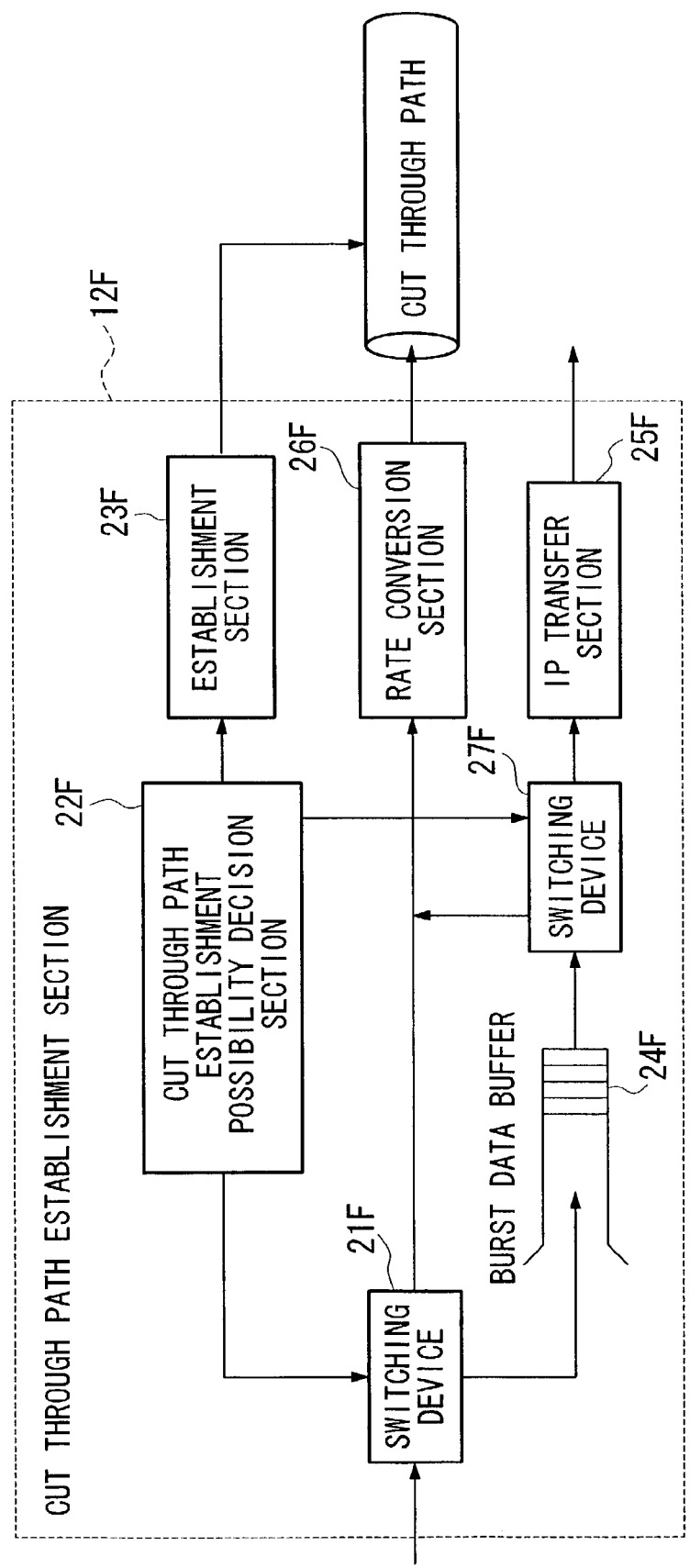
FIG. 30 is a block diagram of a cut through path establishment section of this embodiment.

Next, the nineteenth through the twenty-sixth embodiments of the present invention will be explained with reference to FIGS. 28 through 39. FIG. 28 is a diagram showing a node which is provided to an optical path establishment section of the nineteenth through the twenty-sixth embodiments of the present invention. FIG. 29 is a block diagram of this optical path establishment section of the nineteenth through the twenty-sixth embodiments of the present invention. FIG. 30 is a block diagram of a cut through path establishment section of the nineteenth through the twenty-sixth embodiments of the present invention. FIG. 31 is a diagram showing the structure of a burst data leading packet of the nineteenth through the twenty-sixth embodiments of the present invention. FIG. 32 is a diagram showing the structure of a burst data final packet of the nineteenth through the twenty-sixth embodiments of the present invention.

A node 10F is present in these nineteenth through twenty-sixth embodiments of the present invention, and a distinguishing feature of these nineteenth through twenty-sixth embodiments is that, as shown in FIG. 27, an optical path establishment section 1F which establishes an optical path according to the IP addresses of the IP packets which arrive is provided, and this optical path establishment section 1F comprises, as shown in FIG. 29: a burst data leading packet arrival detection section 11F which detects the arrival of a leading packet of burst data; a cut through path establishment section 12F which, when the arrival of a leading packet of burst data has been detected by this burst data leading packet arrival detection section 11F, establishes a cut through path to the next stage node; a burst data completion detection section 13F which detects the arrival of the final packet of burst data; and a cut through path release section 14F which, when the arrival of the final packet of burst data is detected by this burst data completion detection section 13F, releases the cut through path which is already established, after the passage of the final packet; and the cut through path establishment section 12F comprises, as shown in FIG. 30: a cut through path establishment possibility decision section 22F which decides whether or not it is possible to establish a cut through path to the next stage node; a burst data buffer 24F which, if the result of the decision by this cut through path establishment possibility decision section 22F is that cut through path establishment is impossible, temporarily accumulates the burst data which arrives; and an IP transfer section 25F which transfers the individual packets which make up this burst data which are accumulated in this burst data buffer 24F individually according to their IP addresses. The burst data which arrives is changed over to the side of the cut through path or to the side of the burst data buffer 24F by a switching device 21 which is controlled by the cut through path establishment possibility decision section 22F.

As shown in FIG. 31, subsequent burst data amount information is written into the leading packet as header information, and the burst data leading packet arrival detection section 11F refers to this subsequent burst data amount information when detecting the leading packet of burst data. This burst data amount information in the leading packet may be subsequent packet number information, or may be packet length information.

As shown in FIG. 32, information which indicates that this packet is the final packet of burst data is written into the final packet as header information, and the burst data completion detection section 13F refers to this information which indicates that this packet is the final packet of burst data when detecting the final packet of burst data.

The cut through path establishment possibility decision section 22F determines whether or not there is a vacant wavelength for establishing a cut through path to the next stage node, the difference between the permissible transfer speed up to this node itself and the permissible transfer speed to the next stage node, and the signal quality of the burst data.

Embodiment 19

The nineteenth embodiment of the present invention will now be explained with reference to FIG. 30. In this nineteenth embodiment, when it is determined by the cut through path establishment possibility decision section 22F that it is impossible to establish a cut through path because the permissible transfer speed to the next stage node is less than the permissible transfer speed to this node itself, and the burst data is accumulated in the burst data buffer 24F, then the establishment section 23F of the cut through path establishment section 12F establishes a cut through path to the next stage node at the permissible transfer speed for doing so; and there is provided a rate conversion section 26F for transferring the burst data which has been accumulated in the burst data buffer 24 to the next stage node using a cut through path, by converting the burst data F to a speed equivalent to the permissible transfer speed to the next stage node. The burst data which has been accumulated in the burst data buffer 24F is switched over by the switching device 27F which is controlled by the cut through path establishment possibility decision section 22F, either to the cut through path side or to the side of the IP transfer section 25F.

By doing this, it is possible to perform transfer of burst data at high efficiency by changing over between cut through paths of different transfer speeds.

Embodiment 20

Figure 33:
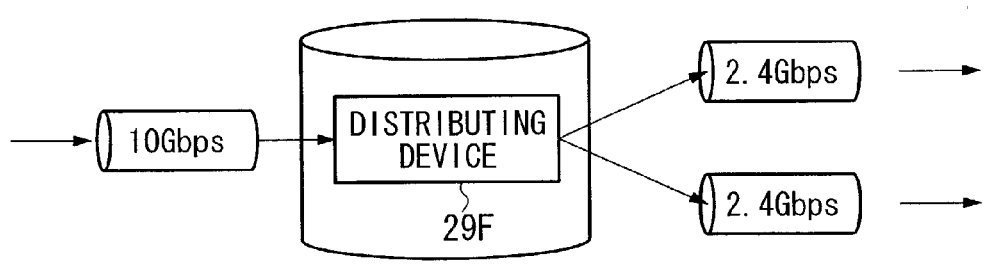
FIG. 33 is a diagram for explanation of a cut through path establishment procedure of the twentieth embodiment of the present invention.

The twentieth embodiment of the present invention will now be explained with reference to FIG. 33. FIG. 33 is a diagram for explanation of a cut through path establishment procedure of the twentieth embodiment of the present invention. In this twentieth embodiment, as shown in FIG. 33, an establishment section 23F establishes a plurality of cut through paths to the next stage node, and the burst data which has been accumulated in the burst data buffer 24F is transferred to the next stage node along this plurality of cut through paths while being dispersed almost uniformly by a distributing device 29F. It should be understood that the distributing device 29F is provided to the output side of the rate conversion section 26F, although it is not shown in the block diagram of FIG. 30.

By doing this, when changing over from a cut through path for which the transfer speed is high to a cut through path for which the transfer speed is low, it is possible to compensate for the proportion of deterioration in the transfer speed by using a plurality of such cut through paths for which the transfer speed is low in parallel.

In the example shown in FIG. 33, burst data which was being transmitted via a single cut through path of speed 10 Gbps is then transmitted through two cut through paths of speed 2.4 Gbps. These two cut through paths of speed 2.4 Gbps are equivalent to one cut through path of speed 4.8 Gbps, so that it has been possible to compensate for the loss of transfer speed to a certain extent.

Embodiment 21

Figure 34:
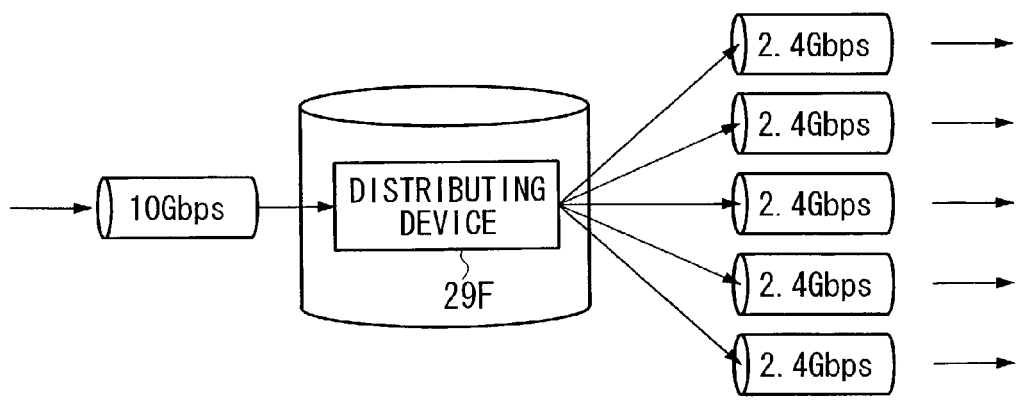
FIG. 34 is a diagram for explanation of a cut through path establishment procedure of the twenty-first embodiment of the present invention.

The twenty-first embodiment of the present invention will now be explained with reference to FIG. 34. FIG. 34 is a diagram for explanation of a cut through path establishment procedure of the twenty-first embodiment of the present invention. In this twenty-first embodiment, as shown in FIG. 34, the establishment section 23F shown in FIG. 30 divides the permissible transfer speed to this node itself by the permissible transfer speed to the next stage node, and establishes a number of transfer paths to the next stage node equal to the result of this division, rounded up to the nearest integer.

In this twenty-first embodiment, just as in the twentieth embodiment, when changing over from a cut through path for which the transfer speed is high to a cut through path for which the transfer speed is low, it is possible to compensate for the proportion of deterioration in the transfer speed by using a plurality of such cut through paths for which the transfer speed is low in parallel; and, moreover, this twenty-first embodiment is distinguished by the feature that it is ensured that the transfer speed after the change over is equal to the transfer speed before the change over or greater.

In the example shown in FIG. 34, burst data which was being transmitted via a single cut through path of speed 10 Gbps is then transmitted through five cut through paths of speed 2.4 Gbps. These five cut through paths of speed 2.4 Gbps are equivalent to one cut through path of speed 12 Gbps, so that it has been possible completely to compensate for the loss of transfer speed.

Embodiment 22

Figure 35:
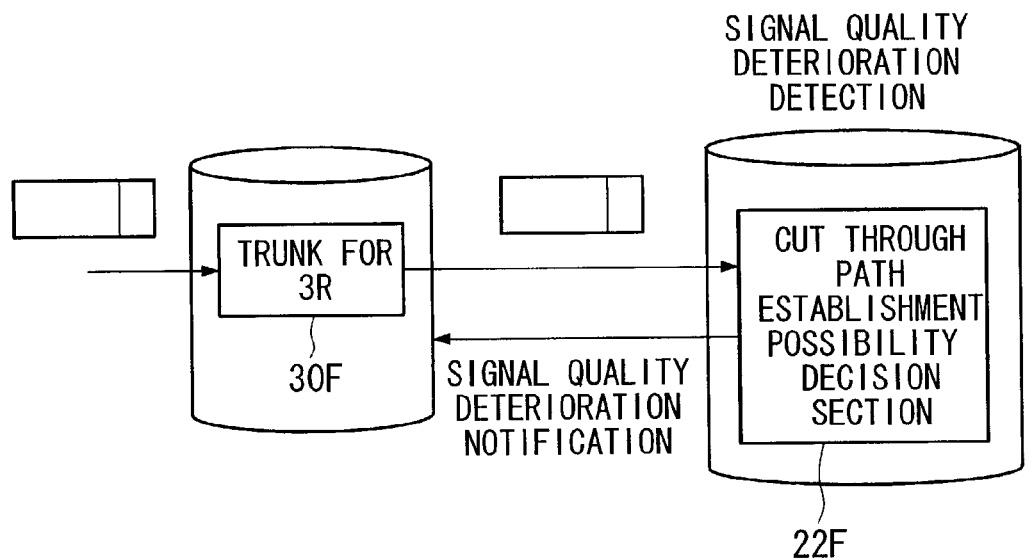
FIG. 35 is a diagram for explanation of a cut through path establishment procedure of the twenty-second embodiment of the present invention.
Figure 36:
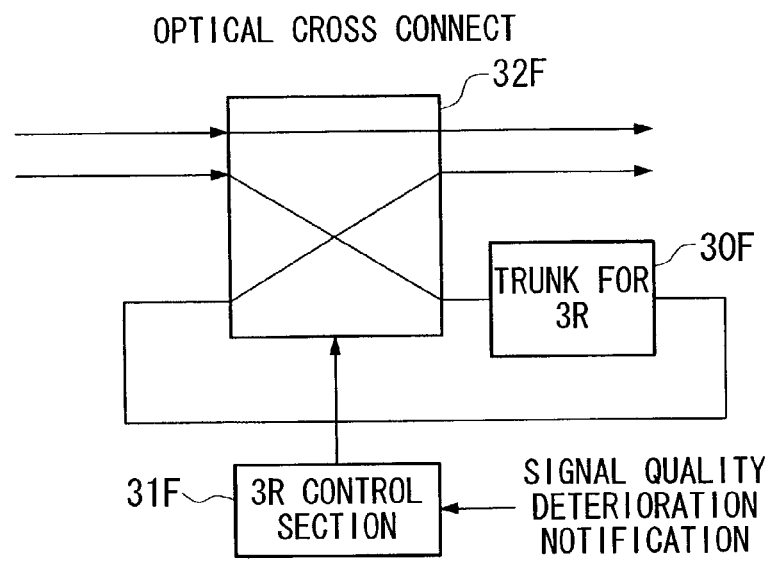
FIG. 36 is a diagram showing an example of 3R trunk insertion in the twenty-third embodiment of the present invention.

The twenty-second embodiment of the present invention will now be explained with reference to FIGS. 35 and 36. FIG. 35 is a diagram for explanation of a cut through path establishment procedure of the twenty-second embodiment of the present invention. FIG. 36 is a diagram showing an example of 3R trunk insertion in the twenty-third embodiment of the present invention. When the cut through path establishment possibility decision section 22F shown in FIG. 30 has decided that it is impossible to establish a cut through path because of deterioration in the signal quality of the leading packet of burst data which arrives, it notifies the preceding stage node to that effect. As shown in FIG. 35, that preceding stage node is provided with a trunk 30F for performing 3R processing of the burst data which arrives, according to this notification.

In the example of insertion of the trunk 30F for 3R processing shown in FIG. 36, this trunk 30F for 3R processing is provided to the output port of an optical cross connect 32F, and a cut through path for which 3R processing is required to be performed is connected by the optical cross connect 32F to the output port to which this trunk 30F for 3R processing is connected. The cut through path for which 3R processing is required to be performed by this trunk 30F for 3R processing is again connected to an input port of the optical cross connect 32F, and is outputted from the desired output port. And, when a 3R control section 31F receives a notification of deterioration of signal quality, it issues an order to the optical cross connect 32F to connect the cut through path to the trunk 30F for 3R processing.

By doing this, it is not necessary to calculate the points at which to perform 3R processing in advance, and, since it will be acceptable to perform 3R processing at the time point that deterioration of signal quality has occurred, accordingly it is possible to reduce the labor and the time period which are required for establishing the cut through path.

Embodiment 23

Figure 37:
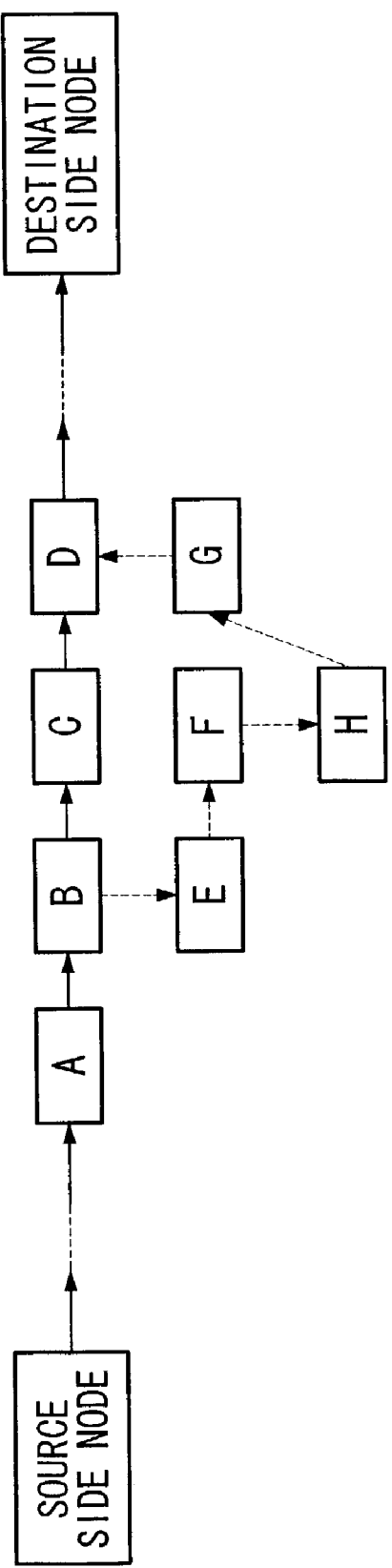
FIG. 37 is a diagram for explanation of a cut through path establishment procedure of the twenty-fourth embodiment of the present invention.

The twenty-third embodiment of the present invention will now be explained with reference to FIG. 37. FIG. 37 is a diagram for explanation of a cut through path establishment procedure of the twenty-fourth embodiment of the present invention. In this twenty-third embodiment, when the next stage node is a node which is included in the most suitable route for the burst data transfer, and a decision has been made by the cut through path establishment possibility decision section 22F that it is impossible to establish a cut through path since no vacant wavelength is available for establishing a cut through path to this next stage node, then the establishment section 23F establishes a cut through path to a neighboring node which has a vacant wavelength for establishing a cut through path, as a substitute node for the next stage node, irrespective of whether or not it is included in the most suitable route.

In the example shown in FIG. 37, the most suitable path is shown by the solid lines from the node upon the transmission side -> . . . ->A->B->C->D-> . . . -> the node upon the reception side, but, since in this case at the node B there is no vacant wavelength for establishing a cut through path to the node C, the cut through path establishment possibility decision section 22F decides that it is impossible to establish a cut through path. Next, upon the result of making a decision as to whether or not it is possible to establish a cut through path to another neighboring node E being that there is a vacant wavelength, this cut through path establishment decision possibility section 22F decides that it is possible to establish such a cut through path.

In this twenty-third embodiment, in this type of case, the establishment section 23F establishes a cut through path with the neighboring node for which a vacant wavelength is available, irrespective of whether or not it is upon the most suitable route. In the example shown in FIG. 37, a cut through path is established as shown by the broken lines from the node upon the transmission side -> . . . ->A->B->E->F->H->G->D-> . . . -> the node upon the reception side. Although this path is somewhat circuitous as compared with the most suitable route, since the cut through path is interrupted at the node B, nevertheless, when it is compared with the alternative case of performing the data transfer by IP transfer, it is sufficiently outstanding from the point of view of being able to transfer the burst data quickly using a cut through path.

Embodiment 24

Figure 38:
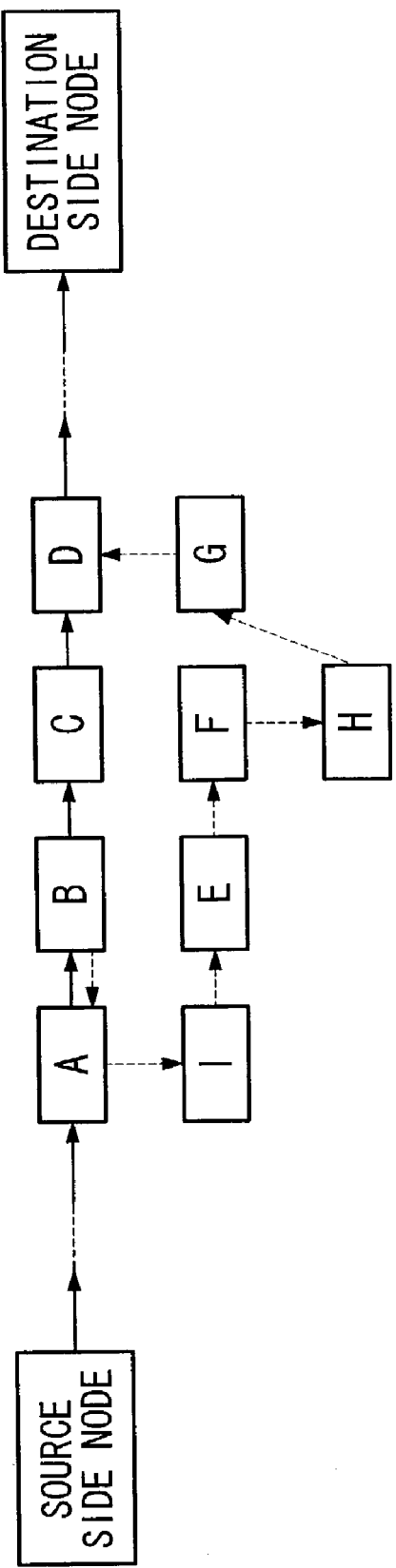
FIG. 38 is a diagram for explanation of a cut through path establishment procedure of the twenty-fifth embodiment of the present invention.

The twenty-fourth embodiment of the present invention will now be explained with reference to FIG. 38. FIG. 38 is a diagram for explanation of a cut through path establishment procedure of the twenty-fifth embodiment of the present invention. In this twenty-fourth embodiment, when the next stage node is a node which is included in the most suitable route for the burst data transfer, and a decision has been made by the cut through path establishment possibility decision section 22F that it is impossible to establish a cut through path since no vacant wavelength is available for establishing a cut through path to this next stage node, then it notifies the preceding stage node to this effect, and the cut through path establishment section 12F of the preceding stage node which has received this notification establishes a cut through path to a neighboring node which has a vacant wavelength for establishing a cut through path, as a substitute node, irrespective of whether or not it is included upon the most suitable route.

In the example shown in FIG. 38, the most suitable path is shown by the solid lines from the node upon the transmission side -> . . . ->A->B->C->D-> . . . -> the node upon the reception side, but, since in this case at the node B there is no vacant wavelength for establishing a cut through path to the node C, the cut through path establishment possibility decision section 22F decides that it is impossible to establish a cut through path.

In this twenty-fourth embodiment, in this type of case, the cut through path establishment possibility decision section 22F issues a notification to the node A that it is impossible to establish a cut through path. When it receives this notification, the cut through path establishment decision possibility section 22F of the node A decides that it is possible to establish a cut through path, since the result of performing the cut through path establishment possibility decision for another neighboring node I is that a vacant wavelength is available.

In the establishment section 23F of the node A, a cut through path is established with the neighboring node for which a vacant wavelength is available, irrespective of whether or not it is upon the most suitable route. In the example shown in FIG. 38, a cut through path is established as shown by the broken lines from the node upon the transmission side -> . . . ->A->I->E->F->H->G->D-> . . . -> the node upon the reception side. Although this path is somewhat circuitous as compared with the most suitable route, since the cut through path is interrupted at the node B, nevertheless, when it is compared with the alternative case of performing the data transfer by IP transfer, it is sufficiently outstanding from the point of view of being able to transfer the burst data quickly using a cut through path.

The distinguishing feature of this twenty-fourth embodiment is the procedure by which a node for which it has become impossible to establish a cut through path notifies this fact to its preceding stage node, and this preceding stage node which has received this notification establishes a cut through path to a neighboring node. In other words, since the possibility of congestion occurring is high at the node for which it has become impossible to establish a cut through path, and since also it is considered that, at this type of node, the success ratio when trying to establish a cut through path to a neighboring node is low, accordingly the process returns to the preceding stage node at which the possibility of congestion occurring is low, and attempts to establish a cut through path from that node to a neighboring node.

Embodiment 25

Figure 39:
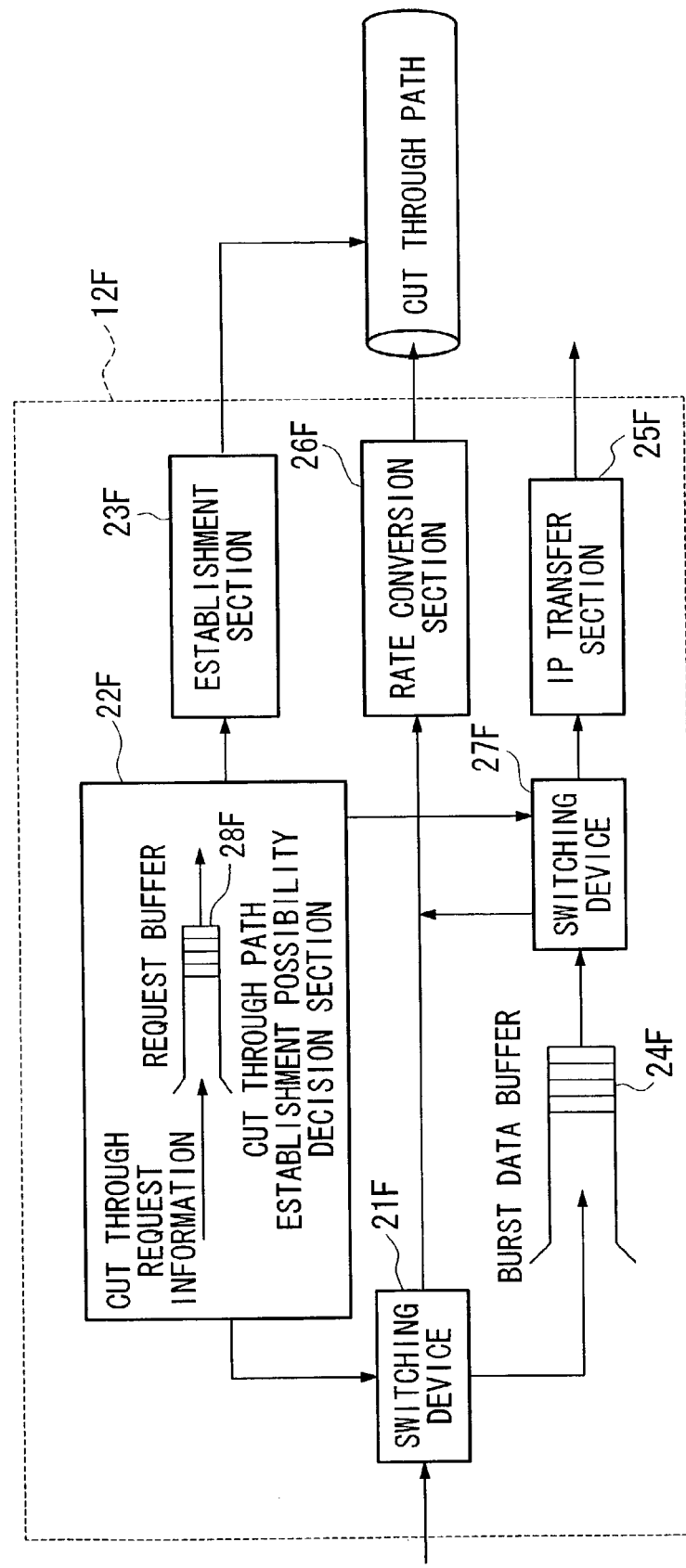
FIG. 39 is a block diagram of a cut through path establishment section of the twenty-sixth embodiment of the present invention.

The twenty-fifth embodiment of the present invention will now be explained with reference to FIG. 39. FIG. 39 is a block diagram of a cut through path establishment section of the twenty-fifth embodiment of the present invention. In this twenty-fifth embodiment, a request buffer 28 is provided for, when no vacant wavelength is available for establishing a cut through path to the next stage node, so that the decision by the cut through path establishment possibility decision section 22F is that it is impossible to establish a cut through path, and accordingly the individual packets which make up the burst data are transferred by the IP transfer section 25F according to their individual IP addresses, storing cut through request information which indicates that it is really wished to transfer these packets making up the burst data which are being transferred individually according to their IP addresses, by a cut through path; and, when a vacant wavelength becomes available for establishing a cut through path to the next stage node, and the decision result of the cut through path establishment possibility decision section 22F transits from the decision that establishment is impossible to the decision that establishment is possible, the establishment section 23F establishes a cut through path for cut through transfer from partway through the transfer of the burst data in individual packets according to their IP addresses, according to the cut through request information which is stored in the request buffer 28F.

In other words, as shown in FIG. 39, the cut through path establishment possibility decision section 22F comprises the request buffer 28F, and stores therein cut through path request information for the burst data which is being currently transferred by IP transfer, for which it is currently impossible to establish a cut through path to the next stage node. It is possible to store such cut through path request information for a plurality of different streams of burst data at the same time in the request buffer 28F. If, during this process, it has become possible to establish a cut through path to the next stage node, the cut through path establishment possibility decision section 22F extracts the leading cut through path request information from the request buffer 28F, and, if the referenced stream of burst data is still being transferred by IP transfer, issues a cut through path establishment order to the establishment section 23F, and, after this cut through path has been established, by operating the switching device 27F, switches over the output of the burst data buffer 24F from the side of the IP transfer section 25F to the side of the cut through path.

By doing this, it is possible to transfer burst data which was unavoidably being transferred by IP transfer, even while wishing that it was being transferred by a cut through path, when a cut through path becomes available, by using that cut through path.

Embodiment 26

Furthermore, it is possible to implement the node according to the present invention using a computer device, which constitutes an information processing device. In detail, this can be done by installing upon that computer device a program which is distinguished by causing that computer device to implement: a function, corresponding to the optical path establishment section 1F, of establishing an optical path according to the IP addresses of the IP packets which arrive; a function, as a function corresponding to this optical path establishment section 1F, a function corresponding to the burst data leading packet arrival detection section 11F of detecting the arrival of a leading packet of burst data; a function, corresponding to the cut through path establishment section 12F of, when the arrival of a leading packet of burst data has been detected by this burst data leading packet arrival detection section 11F, establishing a cut through path to the next stage node; a function corresponding to the burst data completion detection section 13F of detecting the arrival of a final packet of burst data; a function, corresponding to the cut through path release section 14F, of, when the arrival of a final packet of burst data has been detected by this burst data completion detection section 13F, releasing the cut through path which is already established after passage of the final packet; as a function corresponding to the cut through path establishment section 12F, a function, corresponding to the cut through path establishment possibility decision 22F, of deciding whether or not it is possible to establish a cut through path to the next stage node; a function, corresponding to the burst data buffer 24F, of temporarily accumulating burst data which arrives, when the result of the decision by this cut through path establishment possibility decision section 22F is that it is impossible to establish a cut through path; and a function, corresponding to the IP transfer section 25F, of transferring the individual packets which make up the burst data which has accumulated in this burst data buffer 24F individually according to their IP addresses.

As header information of the leading packet, information giving the amount of the subsequent burst data is written, and the program of this embodiment implements upon the computer device, as a function corresponding to the burst data leading packet arrival detection section 11F, a function of detecting the leading packet of burst data by referring to this subsequent burst data amount information. This burst data amount is packet number information or packet length information for the packets subsequent to the leading packet.

Furthermore, as header information of the final packet, information which indicates that this packet is the final packet of burst data is written in, and the program of this embodiment implements upon the computer device, as a function corresponding to the burst data leading completion detection section 13F, a function of referring to this information which indicates that this packet is the final packet of burst data and detecting the final packet of burst data.

Furthermore, the program of this embodiment implements upon the computer device, as a function corresponding to the cut through path establishment possibility decision section 22F, a function of, when no vacant wavelength is available for establishing a cut through path to the next stage node, determining the difference between the permissible transfer speed up to this node itself, and the permissible transfer speed up to the next stage node, and the signal quality of the burst data.

Furthermore, when it has been determined by the cut through path establishment possibility decision section 22F that it is impossible to establish a cut through path because the permissible transfer speed to the next stage node is smaller than the permissible transfer speed to this node itself, and the burst data has been accumulated in the burst data buffer 24F, the program of this embodiment implements upon the computer device, as a function corresponding to the cut through path establishment section 12F, a function corresponding to the establishment section 23F of establishing a cut through path at the permissible transfer speed to the next stage node, and a function corresponding to the transfer rate conversion section 26F of performing rate conversion upon the burst data which has accumulated in the burst data buffer 24F to a speed equivalent to the permissible transfer speed to the next stage node, and using the cut through path to transfer the burst data to the next stage node.

Furthermore, the program of this embodiment implements upon the computer device, as a function corresponding to the establishment section 23F, a function of establishing a plurality of cut through paths to the next stage node, and a function of transferring the burst data which has accumulated in the burst data buffer 24F to the next stage node while transmitting it almost uniformly between the plurality of cut through paths.

Furthermore, the program of this embodiment implements upon the computer device, as a function corresponding to the establishment section 23F, a calculation function of dividing the permissible transfer speed to this node itself by the permissible transfer speed to the next stage node, and a function of establishing a number of cut through paths to the next stage node, greater than or equal to the value of the result of this division by the calculation function.

Furthermore, the program of this embodiment implements upon the computer device, as a function corresponding to the cut through path establishment possibility decision section 22F, a function of, when due to deterioration of the signal quality of the leading packet of burst data which has arrived it is decided that it is impossible to establish a cut through path, notifying this fact to the preceding stage node, and a function corresponding to the 3R control section 31F of performing 3R processing upon the burst data which arrives, according to notification by this notification function.

Furthermore, when the next stage node is a node which is included in the most suitable route for transferring the burst data, and, due to the fact that no vacant wavelength is available for establishing a cut through path to the next stage node, it has been decided by the cut through path establishment possibility decision section 22F that it is impossible to establish a cut through path, the program of this embodiment implements upon the computer device, as a function corresponding to the establishment section 23F, a function of establishing a cut through path to a neighboring node for which a vacant wavelength for establishing a cut through path is available, thus substituting it as a node for the next stage node, irrespective of whether or not it is included upon the most suitable route.

Furthermore, when the next stage node is a node which is included in the most suitable route for transferring the burst data, and, due to the fact that no vacant wavelength is available for establishing a cut through path to the next stage node, it has been decided by the cut through path establishment possibility decision section 22F that it is impossible to establish a cut through path, the program of this embodiment implements upon the computer device a function of notifying this fact to the preceding stage node, and, as a function corresponding to the establishment section 23F of the preceding stage node which has received this notification, a function of establishing a cut through path to a neighboring node for which a vacant wavelength for establishing a cut through path is available, thus substituting it as a node for the next stage node, irrespective of whether or not it is included upon the most suitable route.

Furthermore, when due to the fact that no vacant wavelength is available for establishing a cut through path to the next stage node, it has been decided by the cut through path establishment possibility decision section 22F that it is impossible to establish a cut through path, and the individual packets which make up the burst data are being transferred individually according to their IP addresses by the IP transfer section 25, the program of this embodiment implements upon the computer device a function, corresponding to the request buffer 28F, of storing cut through request information which indicates that it is really wished to transfer these packets making up the burst data which are being transferred individually according to their IP addresses, by a cut through path; and a function, as a function corresponding to the establishment section 23F, of, when a vacant wavelength becomes available for establishing a cut through path to the next stage node, and the decision result of the cut through path establishment possibility decision section 22F transits from the decision that establishment is impossible to the decision that establishment is possible, establishing a cut through path for cut through transfer from partway through the transfer of the burst data in individual packets according to their IP addresses, according to the cut through request information which is stored in the request buffer 28F.

Figure 40:
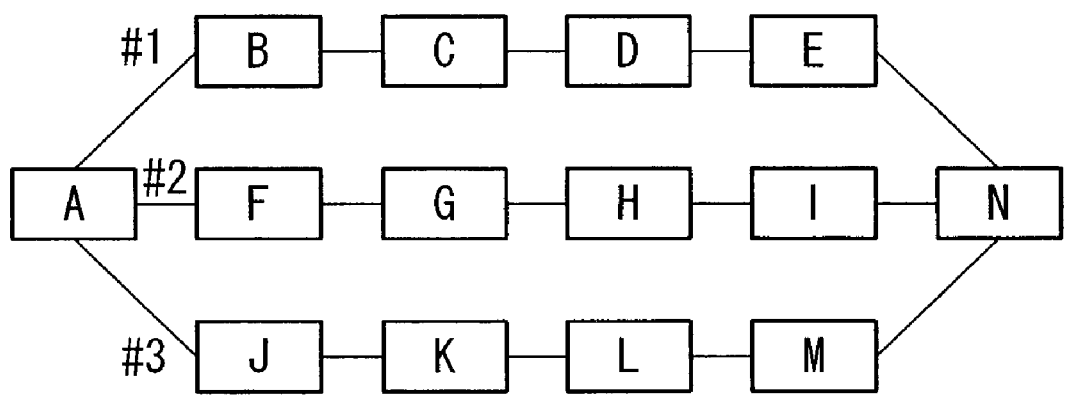
FIG. 40 is a schematic view of an optical path network of this embodiment.
Figure 42:
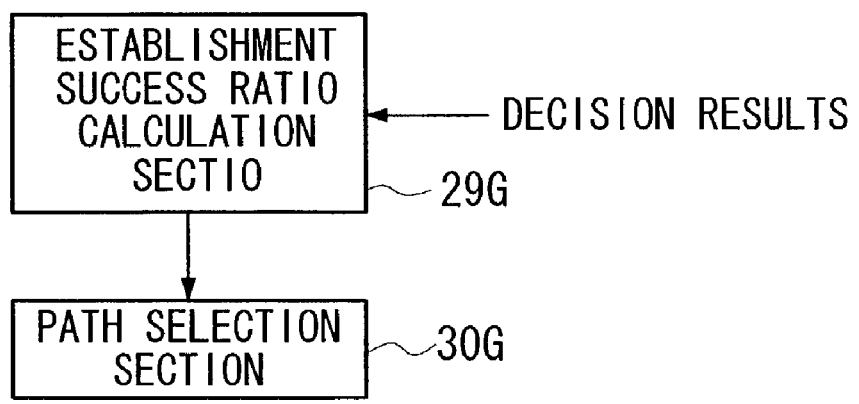
FIG. 42 is a block diagram of a node upon the transmission side of this embodiment.
Figure 41:
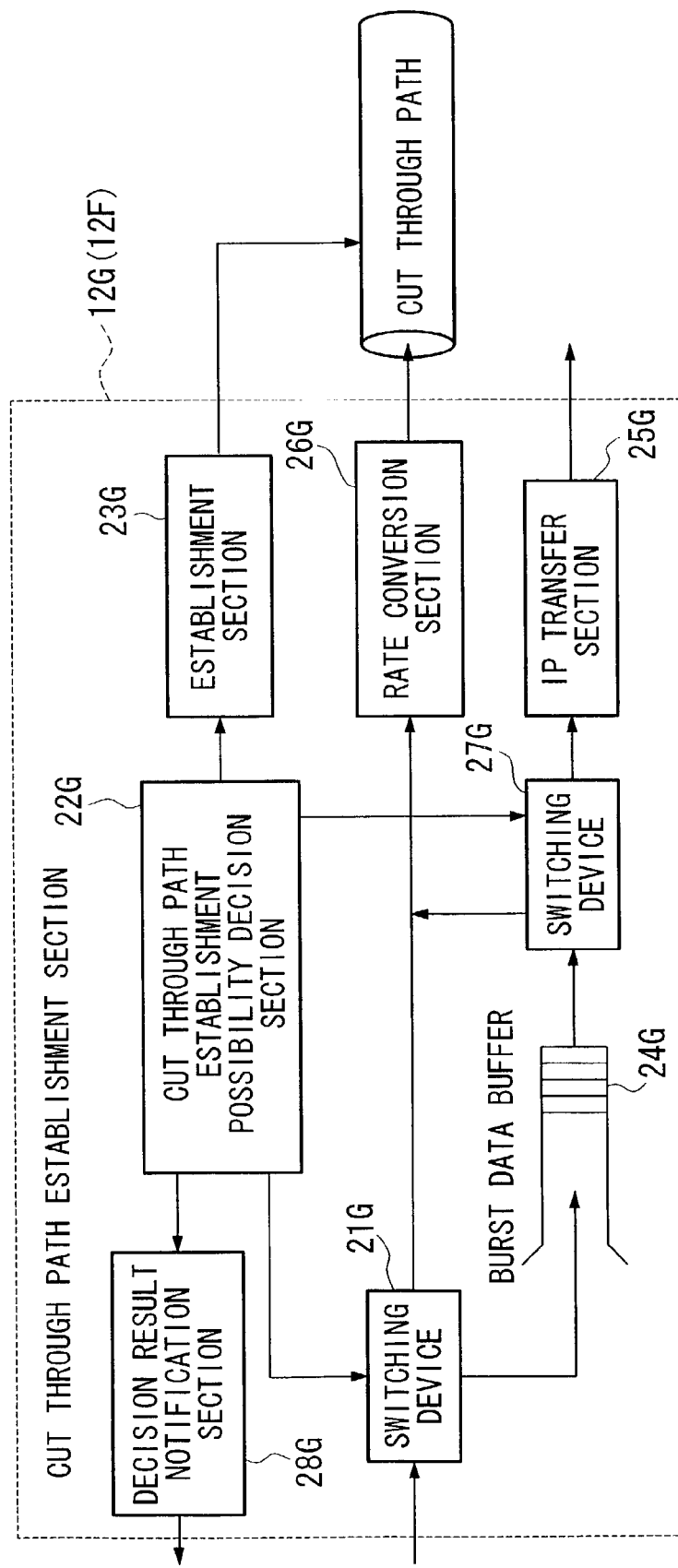
FIG. 41 is a block diagram of a cut through path establishment section of this embodiment of the present invention.
Figure 43:
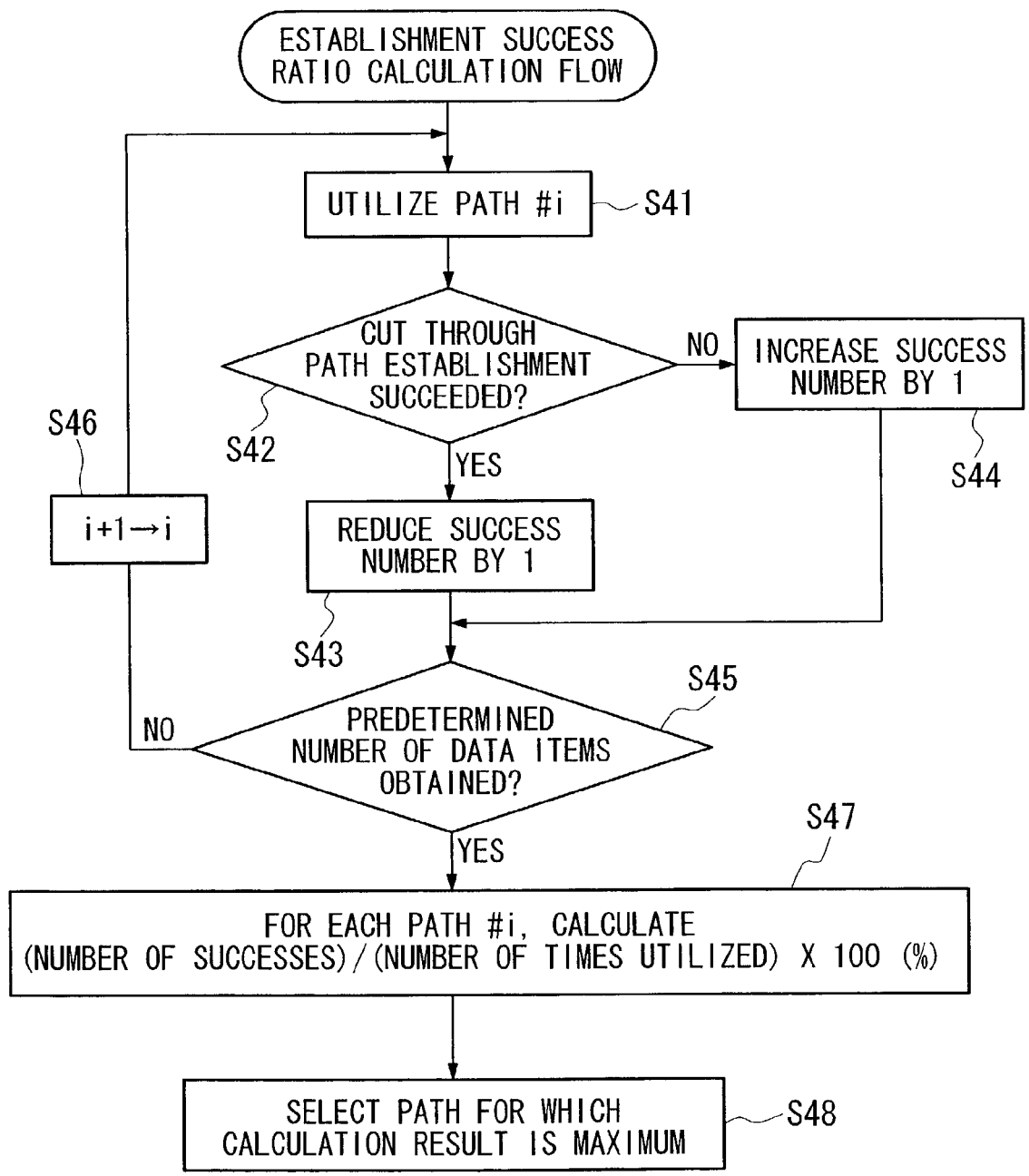
FIG. 43 is a flow chart showing the control flow of an establishment success ratio calculation, in the twenty-seventh embodiment of the present invention.
Figure 44:
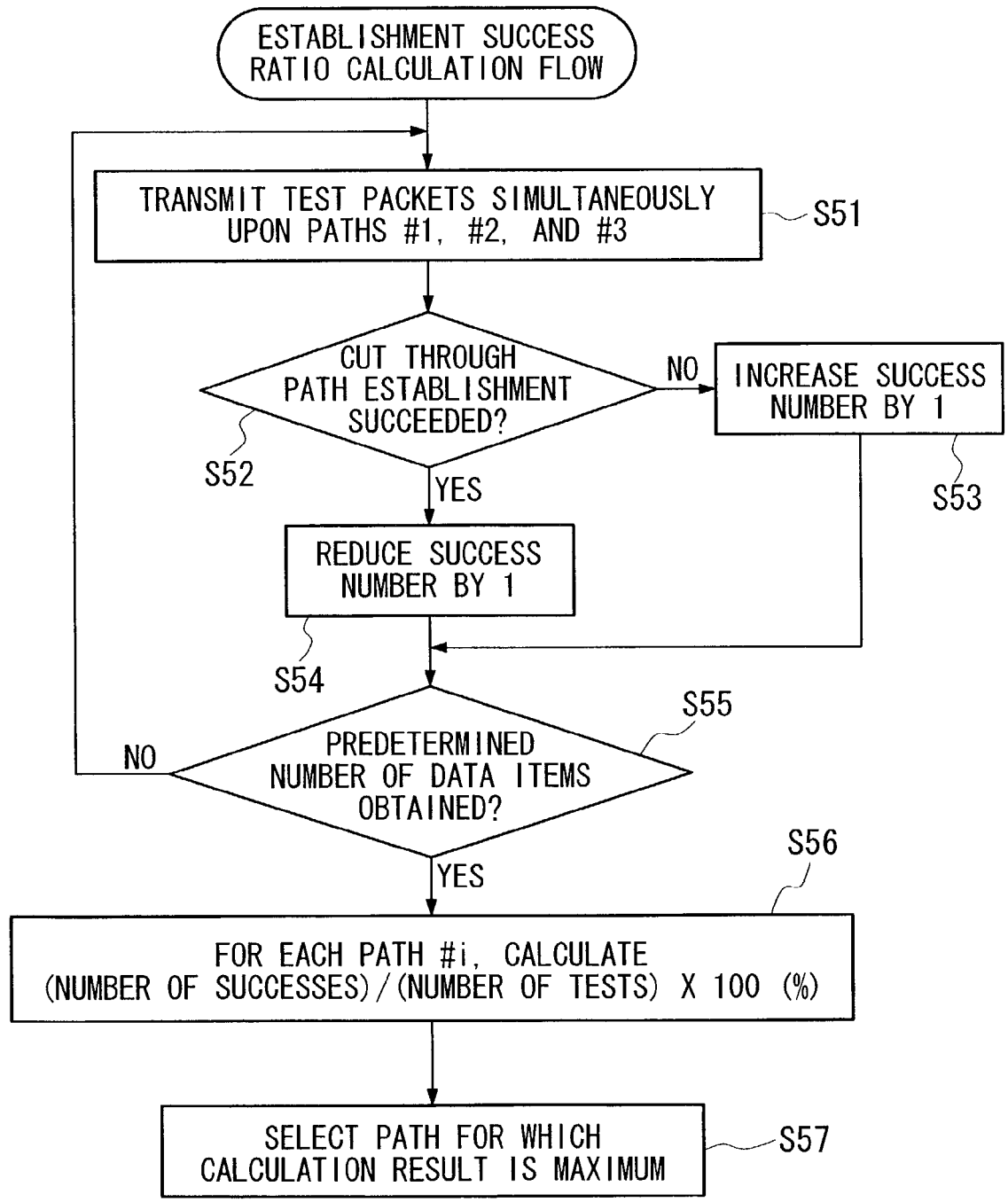
FIG. 44 is a flow chart showing the control flow of an establishment success ratio calculation, in the twenty-eighth embodiment of the present invention.

Next, the twenty-seventh through the twenty-ninth embodiments of the optical path network of the present invention will be explained with reference to FIGS. 29, 31, 32, 35, and 40 to 44 through FIG. 10. FIG. 40 is a schematic view of an optical path network according to the twenty-seventh through the twenty-ninth embodiments of the present invention. FIG. 29 is a block diagram of this optical path establishment section according to these twenty-seventh through the twenty-ninth embodiments of the present invention. FIG. 41 is a block diagram of a cut through path establishment section according to these twenty-seventh through twenty-ninth embodiments of the present invention. FIG. 42 is a block diagram of a node upon the transmission side of these twenty-seventh through twenty-ninth embodiments of the present invention. FIG. 43 is a flow chart showing the control flow of an establishment success ratio calculation, in the twenty-seventh embodiment of the present invention. FIG. 44 is a flow chart showing the control flow of an establishment success ratio calculation, in the twenty-eighth embodiment of the present invention. FIG. 31 is a diagram showing the structure of a burst data leading packet in the twenty-seventh through twenty-ninth embodiments of the present invention. FIG. 32 is a diagram showing the structure of a burst data final packet in the twenty-seventh through twenty-ninth embodiments of the present invention. FIG. 35 is a diagram for explanation of the structure of 3R processing in these twenty-seventh through twenty-ninth embodiments of the present invention. FIG. 36 is a diagram showing an example of 3R trunk arrangement in the twenty-seventh through twenty-ninth embodiments of the present invention.

These twenty-seventh through twenty-ninth embodiments, as shown in FIG. 40, are optical path networks, distinguished in that there are comprised a node upon the transmission side A, a node upon the reception side N, and relay nodes B through M which are positioned upon paths between the node upon the transmission side A and the node upon the reception side N; and these relay nodes B through M each comprise an optical path establishment section 1 which establishes an optical path according to the IP addresses of the IP packets which arrive; while: this optical path establishment section 1, as shown in FIG. 29, comprises a burst data leading packet arrival detection section 11F which detects the arrival of a leading packet of burst data, a cut through path establishment section 12F which, when the arrival of a leading packet of burst data has been detected by this burst data leading packet arrival detection section 11F, establishes a cut through path to the next stage relay node, a burst data completion detection section 13F which detects the arrival of a final packet of burst data, and a cut through path release section 14F which, when the arrival of a final packet of burst data has been detected by this burst data completion detection section 13F, releases a cut through path which is already established after the passage of the final packet; the cut through path establishment section 12F, as shown in FIG. 41, comprises a cut through path establishment possibility decision section 22G which determines whether or not it is possible to establish a cut through path to the next stage relay node, a decision result notification section 28G which notifies the result of the decision by this cut through path establishment possibility decision section 22G to the node upon the transmission side A, a burst data buffer 24G which, when the result of the decision by the cut through path establishment possibility decision section 22G is that it is impossible to establish a cut through path, temporarily accumulates burst data which arrives, and an IP transfer section 25G which transfers the individual packets which make up the burst data which has accumulated in this burst data buffer 24G individually according to their IP addresses; and, between the node upon the transmission side A and the node upon the reception side N, as shown in FIG. 40, a plurality of paths #1, #2, #3 are established in advance, and the node upon the transmission side A, as shown in FIG. 42, comprises an establishment success ratio calculation section 29G which calculates the success ratios of establishment of cut through paths by the cut through path establishment section 12F (12G) according to the decision results notified by the decision result notification section 28G relating to the paths #1, #2, #3, and a path selection section 30G which transmits burst data upon the path for which the cut through path establishment success ratio is highest, according to the result of calculation by this establishment success ratio calculation section 29G.

Embodiment 27

The twenty-seventh embodiment of the present invention will now be explained with reference to FIG. 43. The establishment success ratio calculation flow of this twenty-seventh embodiment is an embodiment in which, in normal burst data transfer processes, the cut through path establishment success ratio for each path #1 through #3 is statistically calculated. In this embodiment, each time burst data transfer takes place, the plurality of paths #1, #2, #3 shown in FIG. 40 are taken advantage of cyclically. That is to say, referring to FIG. 43, when burst data has taken place, for example, path #1 is taken advantage of (in a step S41). If the establishment of the cut through path in the burst data transfer process is successful (the step S42), the number of success times is increased by 1 (in the step S43). Furthermore, if the establishment of the cut through path fails, then the number of success times is diminished by 1 (in the step S44). However, if the result after subtraction is less than zero, it is reset to zero. The next time that burst data has taken place, path #2 is taken advantage of (in a step S46 and in the step S41). In the same way as with path #1, if the establishment of the cut through path in the burst data transfer process is successful (the step S42), the number of success times is increased by 1 (in the step S43). Furthermore, if the establishment of the cut through path fails, then the number of success times is diminished by 1 (in the step S44), and if the result after subtraction is less than zero, it is reset to zero. The next time that burst data has taken place, path #3 is taken advantage of (in the step S46 and in the step S41). In the same way as with paths #1 and #2, if the establishment of the cut through path in the burst data transfer process is successful (the step S42), the number of success times is increased by 1 (in the step S43). Furthermore, if the establishment of the cut through path fails, then the number of success times is diminished by 1 (in the step S44), and if the result after subtraction is less than zero, it is reset to zero. In this manner, after data has been obtained a predetermined number of times (the step S45), for each of the paths #1, #2, and #3, the value (number of success times/number of attempts×100%) is calculated (in the step S47), and the path for which the result of this calculation is the greatest is selected as that path for which the establishment success ratio is the greatest (in the step S48).

It is possible to take advantage of a cut through path for which the establishment success ratio is high by executing this type of establishment success ratio calculation flow periodically, and by transferring the burst data by taking advantage of the cut through path selected as a result thereof.

In this embodiment, when failure has occurred in the establishment of a cut through path, at this relay node, the burst data is accumulated in the burst data buffer 24G via the switching device 21G, and then is transferred by IP transfer by the IP transfer section 25G. Furthermore, if even during this IP transfer the establishment section 23G retries to establish the cut through path, and obtains success in establishing the cut through path, then the burst data which has been accumulated in the burst data buffer 24G is transmitted to the cut through path via the switching device 27G. Furthermore, at this time, if rate conversion is necessary, it is possible for rate conversion to be performed by the rate conversion section 27G.

Accordingly, although various conditions might be contemplated for describing in one word success in establishing a cut through path, such as the condition that between the node upon the transmission side and the node upon the reception side a cut through path has been established and has not been cut off even once, or the condition that, although the cut through path has been temporarily interrupted part way through transfer and the system has switched over to IP transfer, thereafter when another attempt was made to re-establish the cut through path it was successful and the system returned to IP transfer, or the like, however, in this embodiment, success in establishment of a cut through path unit the condition that the interval between the node upon the transmission side and the node upon the reception side has been connected by a cut through path, effectively entirely.

Embodiment 28

The flow of the establishment success ratio calculation in the twenty-eighth embodiment of the present invention will now be explained with reference to FIG. 44. The establishment success ratio calculation flow of this twenty-eighth embodiment is an embodiment in which test packets for calculation of cut through path establishment success ratio are transmitted at the same time upon each of the paths #1 through #3, and the cut through path establishment success ratios are statistically calculated. In comparison to the twenty-seventh embodiment, it is possible to perform the calculation in any desired time period, since test packets which bear no relationship to data transfer are utilized. In detail, as shown in FIG. 44, test packets are transmitted at the same time upon the paths #1, #2, and #3. If, in the transfer process for these test packets, success is obtained in establishing a cut through path (the step S52), the number of success times is increased by 1 (in the step S53). Furthermore, if the establishment of the cut through path fails, then the number of success times is diminished by 1 (in the step S54). However, if the result after subtraction is less than zero, it is reset to zero. In this manner, after data has been obtained a predetermined number of times (the step S55), for each of the paths #1, #2, and #3, the value (number of success times/number of attempts×100%) is calculated (in the step S56), and the path for which the result of this calculation is the greatest is selected as that path for which the establishment success ratio is the greatest (in the step S57).

It is possible to take advantage of a cut through path for which the establishment success ratio is high by executing this type of establishment success ratio calculation flow periodically, and by transferring the burst data by taking advantage of the path selected as a result thereof.

Embodiment 29

As the header information for the leading packet, as shown in FIG. 31, subsequent burst data amount information may be written in thereto, and the burst data leading packet arrival detection section 11F refers to this subsequent burst data amount information and detects the leading packet of burst data. This burst data amount information may be information relating to subsequent packet number, or packet length information.

As the header information for the final packet, as shown in FIG. 32, information which indicates that this is the final packet of burst data may be written in thereto, and the burst data completion detection section 13F refers to this information which indicates that this is the final packet of burst data, and detects the final packet of burst data.

The cut through path establishment possibility decision section 22G, if no vacant wavelength is available for establishing a cut through path to the next stage node, determines the difference between the permissible transfer speed to this node itself and the permissible transfer speed to the next stage node, and also the signal quality of the burst data.

When, as a result of signal quality deterioration in a leading packet of burst data which arrives, the cut through path establishment possibility decision section 22G decides that it is impossible to establish a cut through path, it notifies the preceding stage node of this fact. This preceding stage node, as shown in FIG. 35, comprises a trunk 31F for 3R processing which performs 3R processing upon the burst data which arrives, according to this notification.

By inserting the trunk 30F for 3R processing of FIG. 36, the trunk 30F for 3R processing is provided to the output port of the optical cross connect 32F, and the cut through path for which it is necessary to perform 3R processing is connected by the optical cross connect 32F to its output port to which this trunk 30F for 3R processing is connected. The cut through path for which 3R processing is performed by this trunk 30F for 3R processing is again connected to an input port of the optical cross connect 33, and is outputted from the desired output port thereof. When the 3R processing control section 31F receives notification of signal quality deterioration, it outputs an order to the optical cross connect 32F and connects the cut through path to the trunk 30F for 3R processing.

By doing this, it is not necessary to calculate in advance the points at which 3R processing is to be performed, and, since it will be sufficient to perform 3R processing at the time point that deterioration of the signal quality occurs, accordingly it is possible to reduce the labor and the time period which are required for establishing the cut through path.

Furthermore, it is possible to implement the node according to the present invention using a computer device, which constitutes an information processing device. In particular, the distinguishing feature of this embodiment is that, in the device which controls the node upon the transmission side, by installing upon that computer device a program which causes that computer device to implement, as a function which corresponds to the device which controls the node upon the transmission side which is provided to the optical path network of this embodiment, a function which corresponds to the establishment success ratio calculation section 29G of calculating establishment success ratios for the cut through paths according to the decision results notified by the relay nodes B through M relating to the plurality of paths #1, #2, and #3 to the node upon the reception side N, and a function, corresponding to the path selection section 30G, of transmitting burst data upon a path for which the cut through path establishment success ratio is high, according to the results of calculation by this establishment success ratio calculation section 29G, it is possible to make this computer device be a device which corresponds to the device which controls the node upon the transmission side of this embodiment. Furthermore, although it is possible to implement the devices which control the relay nodes B through M and the node upon the reception side N using computer devices, the explanation of this will be curtailed, since this is a technique which has already been described.

Figure 45:
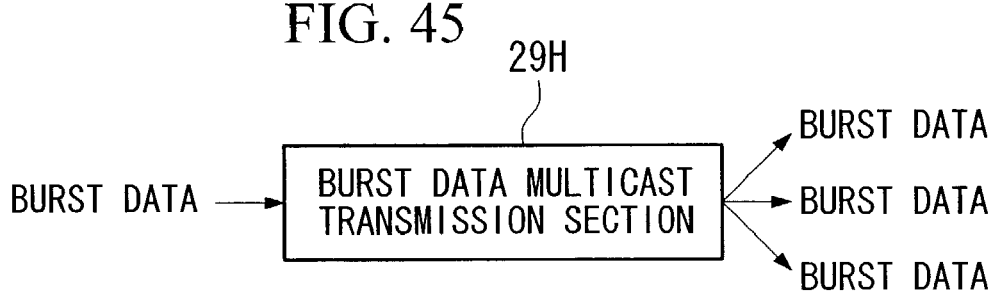
FIG. 45 is a block diagram of a node upon the transmission side of the thirtieth and the thirty-second embodiments of the present invention.
Figure 46:
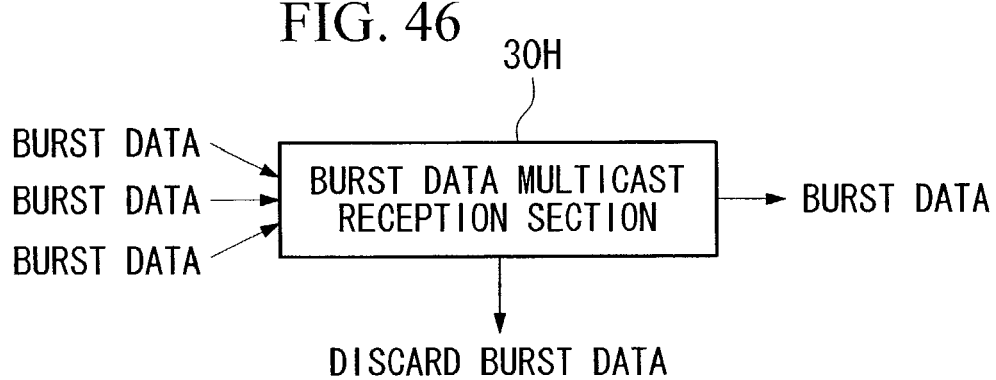
FIG. 46 is a block diagram of a node upon the reception side of the thirtieth and the thirty-first embodiments of the present invention.
Figure 48:
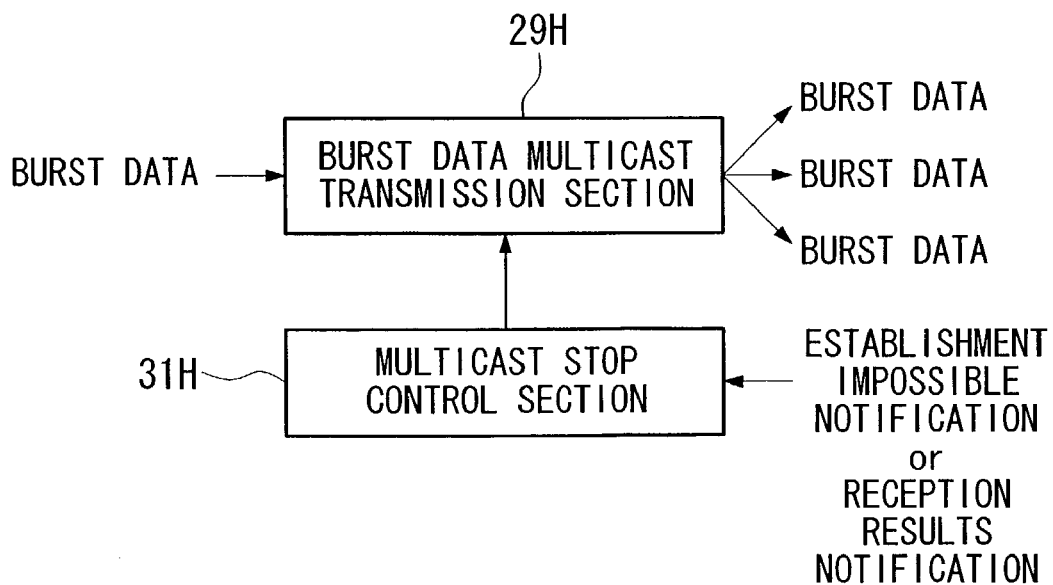
FIG. 48 is a block diagram of a node upon the transmission side of the thirty-first and the thirty-third embodiments of the present invention.
Figure 47:
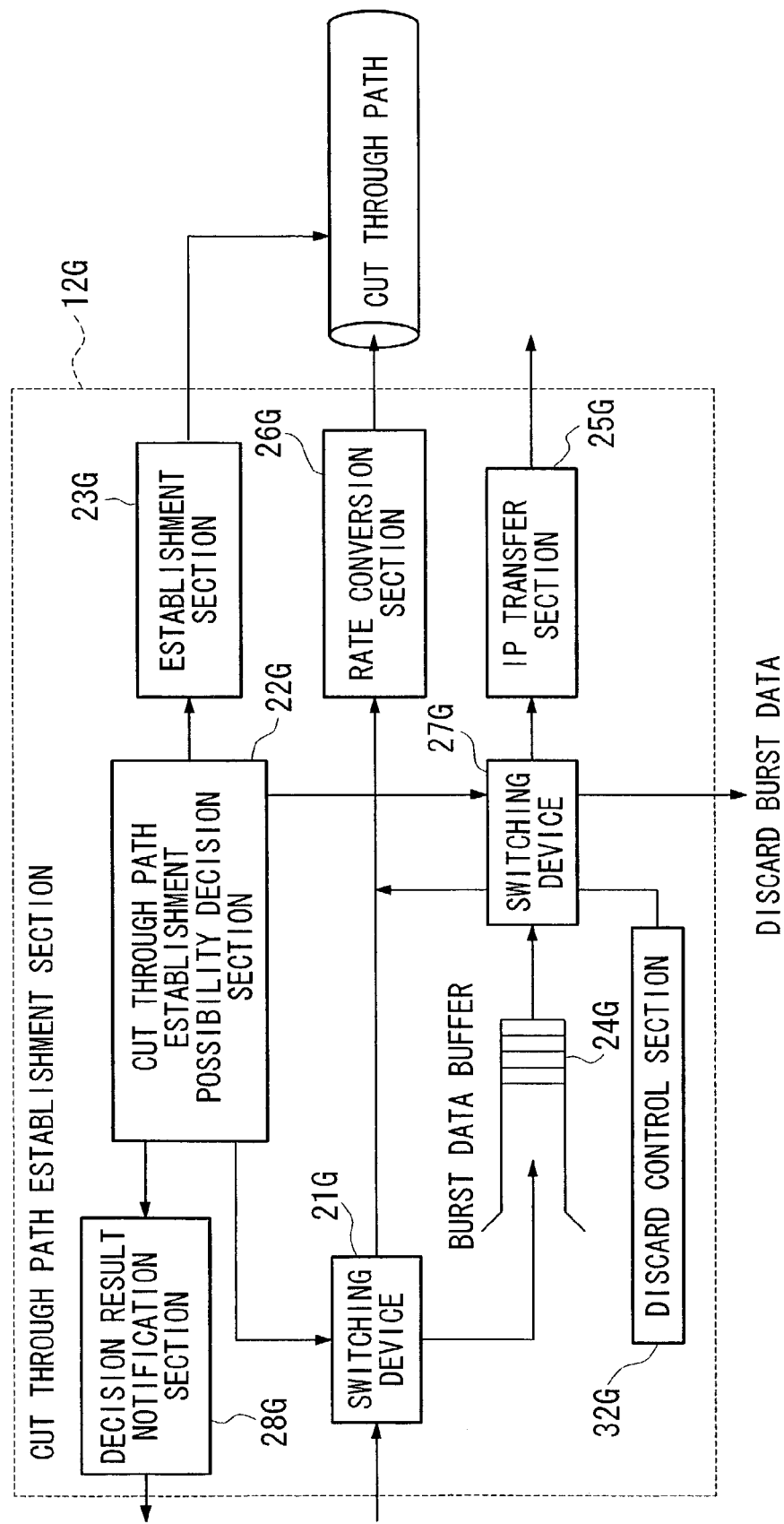
FIG. 47 is a block diagram of a cut through path establishment section of the thirty-first and the thirty-third embodiments of the present invention.
Figure 49:
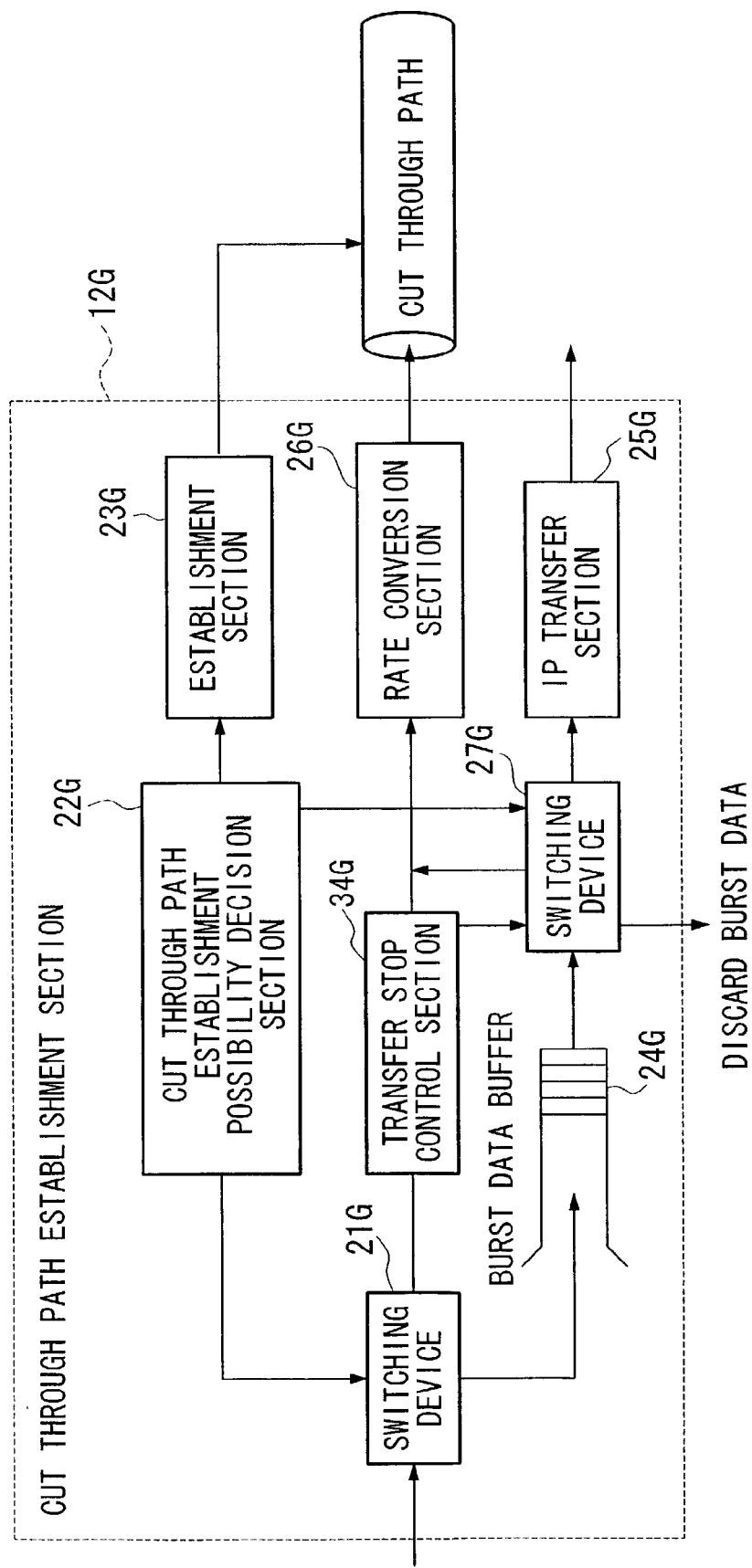
FIG. 49 is a block diagram of a cut through path establishment section of the thirty-second embodiment of the present invention.
Figure 50:
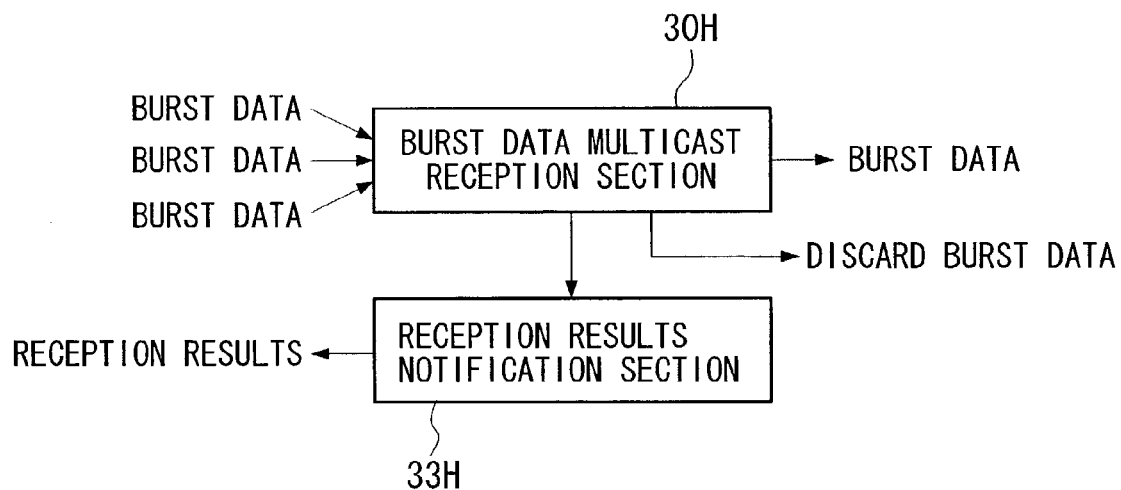
FIG. 50 is a block diagram of a node upon the reception side of the thirty-second and the thirty-third embodiments of the present invention.

Next, the thirtieth through the thirty-fifth embodiments of the optical path network of the present invention will be explained with reference to FIGS. 29, 31, 32, 35, 36, 40, 41, and 45 through 50. FIG. 40 is a schematic view of an optical path network according to the thirtieth through thirty-fifth embodiments of the present invention. FIG. 29 is a block diagram of this optical path establishment section of these thirtieth through thirty-fifth embodiments of the present invention. FIG. 41 is a block diagram of a cut through path establishment section of the thirtieth and the thirty-third embodiments of the present invention. FIG. 45 is a block diagram of a node upon the transmission side of the thirtieth and the thirty-second embodiments of the present invention. FIG. 46 is a block diagram of a node upon the reception side of the thirtieth and the thirty-first embodiments of the present invention. FIG. 47 is a block diagram of a cut through path establishment section of the thirty-first and the thirty-third embodiments of the present invention. FIG. 48 is a block diagram of a node upon the transmission side of the thirty-first and the thirty-third embodiments of the present invention. FIG. 49 is a block diagram of a cut through path establishment section of the thirty-second embodiment of the present invention. FIG. 50 is a block diagram of a node upon the reception side of the thirty-second and the thirty-third embodiments of the present invention. FIG. 31 is a diagram showing the structure of a burst data leading packet of the thirtieth through the thirty-fifth embodiments of the present invention. FIG. 32 is a diagram showing the structure of a burst data final packet of these thirtieth through thirty-fifth embodiments of the present invention. FIG. 35 is a diagram for explanation of 3R processing in these thirtieth through thirty-fifth embodiments of the present invention. FIG. 36 is a diagram showing an example of 3R trunk arrangement in these thirtieth through thirty-fifth embodiments of the present invention.

Embodiment 30

As shown in FIG. 40, the optical path network according to the thirtieth embodiment of the present invention is distinguished by comprising a node upon the transmission side A, a node upon the reception side N, and relay nodes B through M which are located between the node upon the transmission side A and the node upon the reception side N, with these relay nodes B through M, as shown in FIG. 29, comprising an optical path establishment section 1F which establishes an optical path according to the IP addresses of packets which arrive; and this optical path establishment section 1F comprises a burst data leading packet arrival detection section 11F which detects the arrival of a leading packet of burst data, a cut through path establishment section 12F which establishes a cut through path to the next stage relay node when the arrival of a leading packet of burst data has been detected by this burst data leading packet arrival detection section 11F, a burst data completion section 13F which detects the arrival of a final packet of burst data, and a cut through path release section 14 which, when the arrival of a final packet of burst data has been detected by this burst data completion detection section 13F, releases the cut through path which is already established after the passage of the final packet; with the cut through path establishment section 12F, as shown in FIG. 41, comprising a cut through path establishment possibility decision section 22G which decides whether or not it is possible to establish a cut through path to the next stage relay node, a burst data buffer 24G which temporarily accumulates the burst data which arrives if the result of the decision by this cut through pat establishment possibility decision section 22G is that it is impossible to establish a cut through path, and an IP transfer section 25G which transfers the individual packets which make up the burst data and which have been accumulated in this burst data buffer 24G by IP transfer according to their IP addresses; and, between the node upon the transmission side A and the node upon the reception side N, as shown in FIG. 40, a plurality of paths #1, #2, #3 are established in advance, with the node upon the transmission side A, as shown in FIG. 45, comprising a burst data multi-cast signal transmission section 29H which transmits the same burst data upon each of this plurality of paths #1, #2, #3; and with the node upon the reception side N, as shown in FIG. 46, comprising a burst data multi-cast signal reception section 30H which receives, among these same burst data which arrive upon each of the plurality of paths #1, #2, #3, the burst data which have arrived most quickly, while discarding the other burst data.

By doing this it is possible to transfer burst data reliably at high speed, even there are paths among the plurality of paths #1, #2, and #3 for which failure has occurred in establishment of a cut through path, since it will be acceptable to be able to transfer the burst data to the node upon the reception side N via any path for which establishment of a cut through path has been successful.

It should be understood that, in this embodiment, if a failure has occurred in the establishment of a cut through path, at this relay node, the burst data is accumulated in the burst data buffer 24 via the switching device 21G, and IP transfer is performed by the IP transfer section 25G. Furthermore, even during this IP transfer, establishment of the cut through path is retried by the establishment section 23G, and if establishment of the cut through path should prove successful, the burst data which has been accumulated in the burst data buffer 24G is transmitted upon the cut through path via the switching device 27G. Furthermore, if rate conversion is necessary at this time, it is possible to perform rate conversion by the rate conversion section 26G.

Accordingly, with this embodiment, even if failure has occurred in the establishment of a cut through path, provided than no malfunction has occurred partway along the transmission path, or provided that the transfer of the burst data has not stopped, the burst data which has been transmitted from the node upon the transmission side A arrives at the node upon the reception side N. At this time, to compare with the case that the cut through path has been established between the node upon the transmission side A and the node upon the reception side N without even one interruption, if the system has switched over to IP transfer partway when the cut through path was interrupted, or if, although the system switched over to IP transfer temporarily, thereafter the cut through path was again re-established and the system returned to transfer via the cut through path, a delay takes place in the arrival of the burst data at the node upon the reception side N. Due to this, the arrival time instants of the same burst data at the node upon the reception side N are different for the plurality of paths #1, #2, and #3. In this embodiment, the explanation has been made based upon this type of concept.

In this thirtieth embodiment, from among the same burst data of which the arrival instants differ in this manner, only the burst data is received which arrives most quickly.

Embodiment 31

As shown in FIG. 40, the optical path network according to the thirty-first embodiment of the present invention is distinguished by comprising a node upon the transmission side A, a node upon the reception side N, and relay nodes B through M which are located between the node upon the transmission side A and the node upon the reception side N, with these relay nodes B through M, as shown in FIG. 29, comprising an optical path establishment section 1F which establishes an optical path according to the IP addresses of packets which arrive; and this optical path establishment section 1F comprises a burst data leading packet arrival detection section 11F which detects the arrival of a leading packet of burst data, a cut through path establishment section 12F which establishes a cut through path to the next stage relay node when the arrival of a leading packet of burst data has been detected by this burst data leading packet arrival detection section 11F, a burst data completion section 13F which detects the arrival of a final packet of burst data, and a cut through path release section 14 which, when the arrival of a final packet of burst data has been detected by this burst data completion detection section 13F, releases the cut through path which is already established after the passage of the final packet; with the cut through path establishment section 12F, as shown in FIG. 47, comprising a cut through path establishment possibility decision section 22G which decides whether or not it is possible to establish a cut through path to the next stage relay node, a decision result notification section 28G which notifies the result of the decision by this cut through path establishment possibility decision section 22G to the node upon the transmission side A, a burst data buffer 24G which temporarily accumulates the burst data which arrives if the result of the decision by the cut through path establishment possibility decision section 22G is that it is impossible to establish a cut through path, and an IP transfer section 25G which transfers the individual packets which make up the burst data and which have been accumulated in this burst data buffer 24G by IP transfer according to their IP addresses; and, between the node upon the transmission side A and the node upon the reception side N, as shown in FIG. 40, a plurality of paths #1, #2, and #3 are established in advance, with the node upon the transmission side A, as shown in FIG. 48, comprising a burst data multi-cast signal transmission section 29H which transmits the same burst data upon each of this plurality of paths #1, #2, and #3, and a multi-cast stop control section 31H which stops the transmission of the same burst data upon those paths among the plurality of paths #1, #2, and #3 for which establishment of a cut through path has become impossible, according to notification by the decision result notification section 28; and with the relay nodes B through M, as shown in FIG. 47, comprising a discard control section 32G which accumulates the same burst data in its own burst data buffer 24G, and, if the arrival of the same burst data has been interrupted for a predetermined time period, discards this burst data; and with the node upon the reception side N, as shown in FIG. 46, comprising a burst data multi-cast signal reception section 30H which receives, among these same burst data which arrive upon each of the plurality of paths #1, #2, and #3, the burst data which have arrived most quickly, while discarding the other burst data.

By doing this, even if among the plurality of paths #1, #2, and #3 there are a plurality of paths for which establishment of a cut through path has failed, since it will be acceptable to transfer the burst data to the node upon the reception side N via any one of these paths for which the establishment of a cut through path has been successful, accordingly, in addition to it being possible to transfer the burst data reliably at high speed, it is also possible to avoid devoting resources to invalid network traffic along the paths for which establishment of a cut through path has failed, due to the node upon the transmission side A quickly stopping the transfer of burst data according to notification from the relay nodes B through M.

Embodiment 32

As shown in FIG. 40, the optical path network according to the thirty-second embodiment of the present invention is distinguished by comprising a node upon the transmission side A, a node upon the reception side N, and relay nodes B through M which are located between the node upon the transmission side A and the node upon the reception side N, with these relay nodes B through M, as shown in FIG. 29, comprising an optical path establishment section 1F which establishes an optical path according to the IP addresses of packets which arrive; and this optical path establishment section 1F comprises a burst data leading packet arrival detection section 11F which detects the arrival of a leading packet of burst data, a cut through path establishment section 12F which establishes a cut through path to the next stage relay node when the arrival of a leading packet of burst data has been detected by this burst data leading packet arrival detection section 11F, a burst data completion section 13F which detects the arrival of a final packet of burst data, and a cut through path release section 14F which, when the arrival of a final packet of burst data has been detected by this burst data completion detection section 13F, releases the cut through path which is already established after the passage of the final packet; with the cut through path establishment section 12F, as shown in FIG. 49, comprising a cut through path establishment possibility decision section 22G which decides whether or not it is possible to establish a cut through path to the next stage relay node, a burst data buffer 24G which temporarily accumulates the burst data which arrives if the result of the decision by the cut through path establishment possibility decision section 22G is that it is impossible to establish a cut through path, and an IP transfer section 25G which transfers the individual packets which make up the burst data and which have been accumulated in this burst data buffer 24G by IP transfer according to their IP addresses; and, between the node upon the transmission side A and the node upon the reception side N, a plurality of paths #1, #2, and #3 are established in advance, with the node upon the transmission side A, as shown in FIG. 45, comprising a burst data multi-cast signal transmission section 29H which transmits the same burst data upon each of this plurality of paths #1, #2, and #3; and with the node upon the reception side N, as shown in FIG. 50, comprising a signal reception result notification section 33H which when, among the same burst data which arrive along the plurality of paths #1, #2, and #3, the burst data which have arrived most quickly have been received, notifies the relay node to that effect, and a burst data multi-cast signal reception section 30H which discards the burst data other than the burst data which have arrived most quickly; with the relay nodes B through M, as shown in FIG. 49, each comprising a transfer stop control section 34G which, if it itself, according to notification by the signal reception result notification section 33H, is a relay node upon a path other than the path for which the node upon the reception side N has succeeded in signal reception, stops the transmission of the same burst data and, if the same burst data is accumulated in its own burst data buffer 24G, discards this burst data.

By doing this, even if among the plurality of paths #1, #2, and #3 there are a plurality of paths for which establishment of a cut through path has failed, since it will be acceptable to transfer the burst data to the node upon the reception side N via any one of these paths for which the establishment of a cut through path has been successful, accordingly, in addition to it being possible to transfer the burst data reliably at high speed, it is also possible to avoid devoting resources to invalid network traffic along the paths for which establishment of a cut through path has failed, due to the relay nodes B through M quickly stopping the transfer of burst data according to notification from the node upon the reception side N.

Embodiment 33

As shown in FIG. 40, the optical path network according to the thirty-third embodiment of the present invention is distinguished by comprising a node upon the transmission side A, a node upon the reception side N, and relay nodes B through M which are located between the node upon the transmission side A and the node upon the reception side N, with these relay nodes B through M, as shown in FIG. 29, comprising an optical path establishment section 1F which establishes an optical path according to the IP addresses of packets which arrive; and this optical path establishment section 1F comprises a burst data leading packet arrival detection section 11F which detects the arrival of a leading packet of burst data, a cut through path establishment section 12F which establishes a cut through path to the next stage relay node when the arrival of a leading packet of burst data has been detected by this burst data leading packet arrival detection section 11F, a burst data completion section 13F which detects the arrival of a final packet of burst data, and a cut through path release section 14 which, when the arrival of a final packet of burst data has been detected by this burst data completion detection section 13F, releases the cut through path which is already established after the passage of the final packet; with the cut through path establishment section 12F, as shown in FIG. 41, comprising a cut through path establishment possibility decision section 22G which decides whether or not it is possible to establish a cut through path to the next stage relay node, a burst data buffer 24G which temporarily accumulates the burst data which arrives if the result of the decision by the cut through path establishment possibility decision section 22G is that it is impossible to establish a cut through path, and an IP transfer section 25G which transfers the individual packets which make up the burst data and which have been accumulated in this burst data buffer 24G by IP transfer according to their IP addresses; and, between the node upon the transmission side A and the node upon the reception side N, as shown in FIG. 40, a plurality of paths #1, #2, and #3 are established in advance, with the node upon the transmission side A, as shown in FIG. 48, comprising a burst data multi-cast signal transmission section 29H which transmits the same burst data upon each of a plurality of paths #1, #2, and #3, and the node upon the reception side, as shown in FIG. 50, comprising a signal reception result notification section 33H which, when the burst data, among the same burst data which arrive upon each of the plurality of paths #1, #2, and #3, which arrive most quickly is received, notifies the node upon the transmission side A to that effect, and a burst data multi-cast signal reception section 30H which discards the burst data other than the burst data which have arrived most quickly; and with the node upon the transmission side A, as shown in FIG. 48, comprising a multi-cast stop control section 31H which stops the transmission of the same burst data upon those paths among the plurality of paths #1, #2, and #3 other than the one for which signal reception has been successful by the node upon the reception side N, according to notification by the signal reception result notification section 33; and with the relay nodes B through M, as shown in FIG. 47, each comprising a discard control section 32G which accumulates the same burst data in its own burst data buffer 24G, and, if the arrival of the same burst data has been interrupted for a predetermined time period, discards this burst data.

By doing this, even if among the plurality of paths #1, #2, and #3 there are a plurality of paths for which establishment of a cut through path has failed, since it will be acceptable to transfer the burst data to the node upon the reception side N via any one of these paths for which the establishment of a cut through path has been successful, accordingly, in addition to it being possible to transfer the burst data reliably at high speed, it is also possible to avoid devoting resources to invalid network traffic along the paths for which establishment of a cut through path has failed, due to the node upon the transmission side A quickly stopping the transfer of burst data according to notification from the node upon the reception side N.

Embodiment 34

Furthermore, it is possible to implement the node according to the thirtieth through the thirty-third embodiments of the present invention using a computer device, which constitutes an information processing device. In detail, it is possible to cause a computer to act as a device which controls the node upon the transmission side A of the thirty-second embodiment of the present invention, by installing upon the computer device a program which implements upon the computer device, as a function corresponding to a device which controls the node upon the transmission side A which is provided to the optical path network of this embodiment, a function corresponding to the burst data multi-cast signal transmission section 29H of transmitting the same burst data upon a plurality of paths, and a function, corresponding to the multi-cast stop control section 31H, of stopping the transmission of the same burst data upon those paths among the plurality of paths #1, #2, and #3 for which establishment of a cut through path has become impossible, according to notification by the decision result notification section 28G.

Or, it is possible to cause a computer to act as a device which controls the node upon the transmission side A of the thirty-third embodiment of the present invention, by installing upon the computer device a program which implements upon the computer device, as a function corresponding to a device which controls the node upon the transmission side A which is provided to the optical path network of this embodiment, a function corresponding to the burst data multi-cast signal transmission section 29 of transmitting the same burst data upon each of a plurality of paths #1, #2, and

3, and a function corresponding to the multi-cast stop control section 31H, of stopping the transmission of the same burst data upon those paths among the plurality of paths #1, #2, and #3 other than those for which signal reception by the node upon the reception side N has been successful, according to notification by the signal reception result notification section 33 of the node upon the reception side N.

Or, it is possible to cause a computer to act as a device which controls the relay nodes B through M which are provided to the thirty-first and the thirty-third embodiment of the present invention, by installing upon the computer device a program which implements upon the computer device, as a function which corresponds to a device which controls the relay nodes B through M which are applied in the optical path network of these embodiments, a function corresponding to the optical path establishment section 11F of establishing an optical path according to the IP addresses of IP packets which arrive; and, as a function corresponding to this optical path establishment section 1F: a function corresponding to the burst data leading packet arrival detection section 11F of detecting the arrival of a leading packet of burst data; a function corresponding to the cut through path establishment section 12F of, when the arrival of a leading packet of burst data has been detected by this burst data leading packet arrival detection section 11F, establishing a cut through path to the next stage node; a function corresponding to the burst data completion detection section 13F of detecting the arrival of the final packet of burst data; and a function corresponding to the cut through path release section 14F of, when the arrival of the final packet of burst data is detected by this burst data completion detection section 13F, releasing the cut through path which is already established, after the passage of the final packet; and, as a function corresponding to the cut through path establishment section 12F: a function corresponding to the cut through path establishment possibility decision section 22G of deciding whether or not it is possible to establish a cut through path to the next stage node; a function corresponding to the decision result notification section 28G of notifying the result of the decision by this cut through path establishment possibility decision section 22G to the node upon the transmission side A; a function corresponding to the burst data buffer 24G of, if the result of the decision by this cut through path establishment possibility decision section 22G is that cut through path establishment is impossible, temporarily accumulating the burst data which arrives; and a function corresponding to the IP transfer section 25G of transferring the individual packets which make up this burst data which are accumulated in this burst data buffer 24G individually according to their IP addresses; and a function corresponding to the discard control section 32G of accumulating the same burst data in its own burst data buffer 24G, and, if the arrival of the same burst data has been interrupted for a predetermined time period, discarding this burst data.

Or, it is possible to cause a computer to act as a device which controls the relay nodes B through M which are provided to the thirty-second embodiment of the present invention, by installing upon the computer device a program which implements upon the computer device, as a function which corresponds to a device which controls the relay nodes B through M which are provided to the optical path network of these embodiments, a function corresponding to the optical path establishment section 1F of establishing an optical path according to the IP addresses of IP packets which arrive; and, as a function corresponding to this optical path establishment section 1F: a function corresponding to the burst data leading packet arrival detection section 11F of detecting the arrival of a leading packet of burst data; a function corresponding to the cut through path establishment section 12F of, when the arrival of a leading packet of burst data has been detected by this burst data leading packet arrival detection section 11F, establishing a cut through path to the next stage relay node; a function corresponding to the burst data completion detection section 13F of detecting the arrival of the final packet of burst data; and a function corresponding to the cut through path release section 14F of, when the arrival of the final packet of burst data is detected by this burst data completion detection section 13F, releasing the cut through path which is already established, after the passage of the final packet; and, as a function corresponding to the cut through path establishment section 12F: a function corresponding to the cut through path establishment possibility decision section 22G of deciding whether or not it is possible to establish a cut through path to the next stage node; a function corresponding to the burst data buffer 24G of, if the result of the decision by this cut through path establishment possibility decision section 22G is that cut through path establishment is impossible, temporarily accumulating the burst data which arrives; and a function corresponding to the IP transfer section 25G of transferring the individual packets which make up this burst data which are accumulated in this burst data buffer 24G individually according to their IP addresses; and a function corresponding to the discard control section 32G of, if it itself is a relay node upon a path other than the path for which the node upon the reception side N has succeeded in signal reception, according to notification by the signal reception result notification section 33H of the node upon the reception side, stopping the transmission of the same burst data and, if the same burst data is accumulated in its own data buffer 24G, discarding the same burst data.

Or, it is possible to cause a computer to act as a device which controls the node upon the reception side N of the thirtieth or the thirty-first embodiment of the present invention, by installing upon the computer device a program which implements upon the computer device, as a function corresponding to a device which controls the node upon the reception side N which is provided to the optical path network of this embodiment, a function corresponding to the burst data multi-cast signal reception section 30H of discarding the burst data among a plurality of paths #1, #2, and #3 other than the burst data which have arrived most quickly.

Or, it is possible to cause a computer to act as a device which controls the node upon the reception side N of the thirty-second embodiment of the present invention, by installing upon the computer device a program which implements upon the computer device, as a function corresponding to a device which controls the node upon the reception side N which is provided to the optical path network of this embodiment, a function corresponding to the signal reception result notification section 33H of, when the burst data, among the same burst data which arrive upon each of the plurality of paths #1, #2, and #3, which arrives most quickly is received, notifying the relay nodes B through M to that effect, and a function corresponding to the burst data multi-cast signal reception section 30H of discarding the burst data other than the burst data which have arrived most quickly.

Or, it is possible to cause a computer to act as a device which controls the node upon the reception side N of the thirty-third embodiment of the present invention, by installing upon the computer device a program which implements upon the computer device, as a function corresponding to a device which controls the node upon the reception side N which is provided to the optical path network of this embodiment, a function corresponding to the signal reception result notification section 33H of, when the burst data, among the same burst data which arrive upon each of the plurality of paths #1, #2, and #3, which arrives most quickly is received, notifying the node upon the transmission side A to that effect, and a function corresponding to the burst data multi-cast signal reception section 30H of discarding the burst data other than the burst data which have arrived most quickly.

By recording the program according to the present invention upon a recording medium according to the present invention, it is possible to install the program according to the present invention upon the computer device, using this recording medium. Alternatively, it is also possible to install the program according to the present invention upon the computer device directly via a network from a server upon which the program according to the present invention is kept.

Furthermore, it is possible to implement the optical communication network according to the present invention using a computer device, and thereby it is possible to perform burst data transfer accurately at high speed, and furthermore it is possible to reduce the labor and the time period which are required for establishing the cut through path and also the number of invalid retentions.

Embodiment 35

It is possible for subsequent burst data amount information to be written in the leading packet as header information, and for the leading packet arrival section 11F to detect the leading packet of burst data by referring to this subsequent burst data amount information. The burst data amount information may, for example, be packet number information or packet length information for packets subsequent to the leading packet.

Furthermore, as shown in FIG. 32, information which indicates that the packet is the final packet of burst data may be written as header information into the final packet, and the burst data completion detection section unit 13F may detect the final packet of burst data by referring to this information which indicates that this is the final packet.

The cut through path establishment possibility decision section 22G may determine whether or not a vacant wavelength is available for establishing a cut through path to the next stage node, and the difference between the permissible transfer speed up to this node itself and the permissible transfer speed to the next stage node, and also the signal quality of the burst data.

When, due to deterioration of the signal quality of the leading packet of burst data which arrives, the cut through path establishment possibility decision section 22G has decided that it is impossible to establish a cut through path, it notifies this fact to the preceding stage node. This preceding stage node, as shown in FIG. 35, comprises a 3R trunk 30F which, according to this notification, performs 3R processing upon the burst data which arrives.

With the example shown in FIG. 36 of insertion of the trunk 30F for 3R processing, the trunk 30F for 3R processing is provided to an output port of an optical cross connect 32F, and the cut through path for which it is necessary to perform 3R processing is connected to the output port to which the trunk 30F for 3R processing by the optical cross connect 32F has been connected. And the cut through path for which 3R processing is to be performed is again connected by the trunk 30F for 3R processing to an input port of the optical cross connect 32F, so that it is outputted from the desired output port. When a notification of deterioration of signal quality is received, a control section 31F for 3R processing issues an order to the optical cross connect 32F to connect the cut through path to the trunk 30F for 3R processing.

Since by doing this it is not necessary to calculate the points at which to perform 3R processing in advance, and, since it will be acceptable to perform 3R processing at the time point that deterioration of signal quality has occurred, accordingly it is possible to reduce the labor and the time period which are required for establishing the cut through path.

Figure 53:
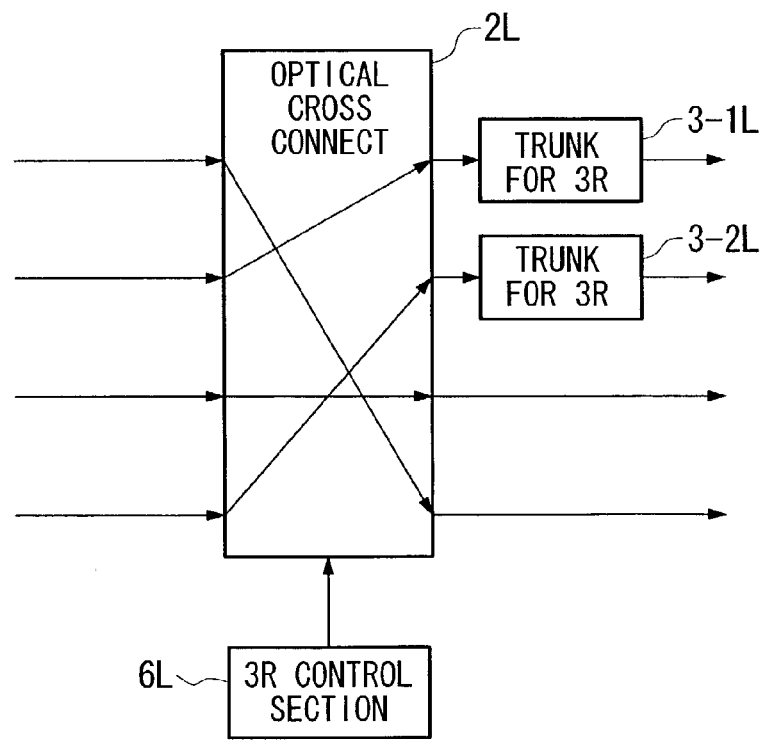
FIG. 53 is a diagram showing the 3R processing structure of the thirty-seventh embodiment of the present invention.

In the following the thirty-sixth through the thirty-eighth embodiments of the present invention will be explained with reference to FIGS. 51 through 53.

Embodiment 36

The nodes and the optical path network of the thirty-sixth embodiment of the present invention will now be explained with reference to FIGS. 51 and 52. FIG. 51 is a diagram showing the optical path network structure of the thirty-sixth embodiment of the present invention. FIG. 52 is a block diagram of a node of the thirty-sixth embodiment of the present invention.

Figure 51:
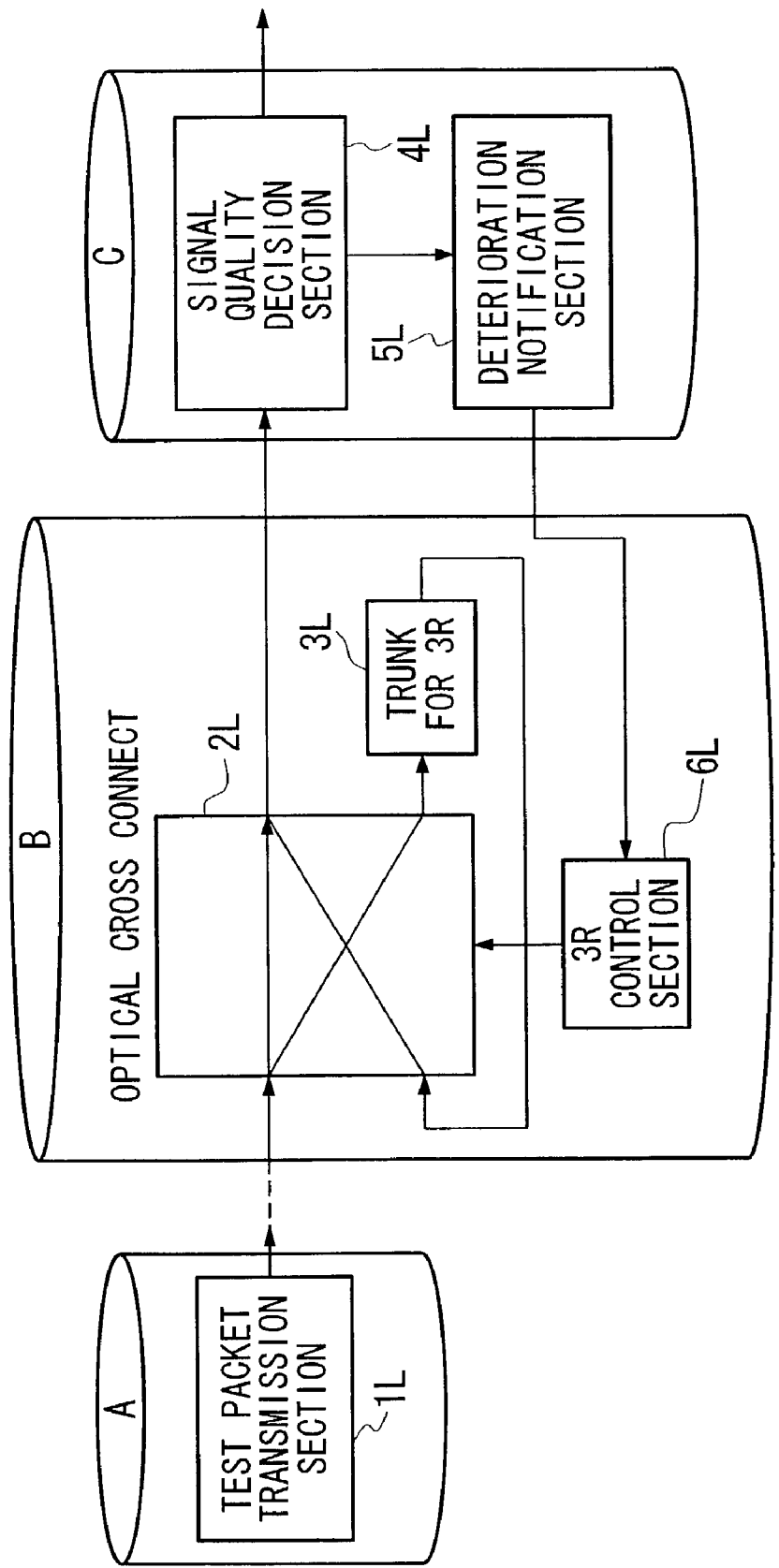
FIG. 51 is a diagram showing the optical path network structure of the thirty-sixth embodiment of the present invention.
Figure 52:
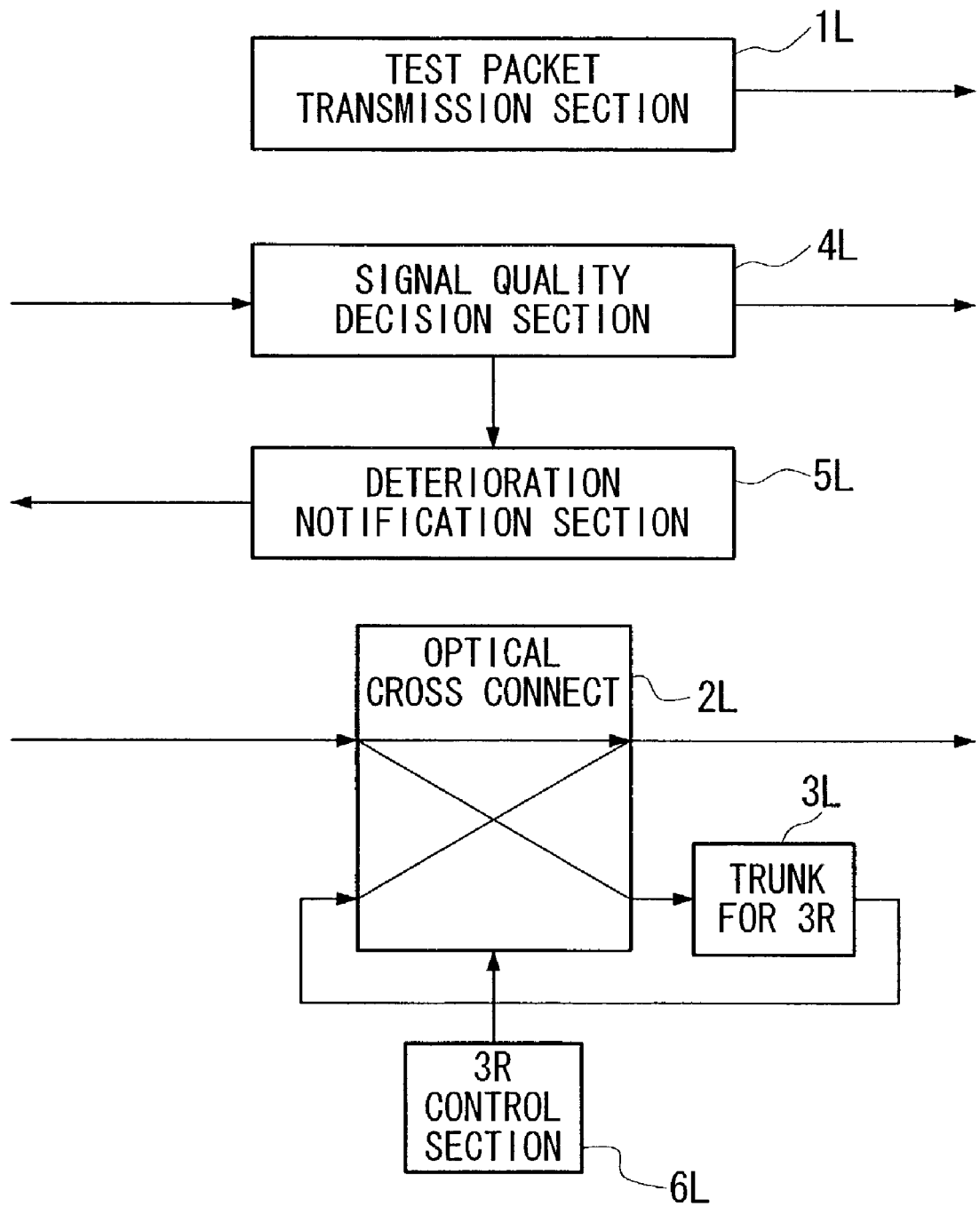
FIG. 52 is a block diagram of a node of the thirty-sixth embodiment of the present invention.

The thirty-sixth embodiment of the present invention, as shown in FIGS. 51 and 52, is a node which is distinguished by comprising: an optical packet for test transmission section 1L which, before establishment of an optical path, transmits an optical packet for test upon a path over which it is predicted the optical path will pass; a signal quality determination section 4L which receives this optical packet for test and determines its signal quality; a deterioration notification section 5L which, when it is determined by this signal quality determination section 4L that the signal quality has deteriorated, notifies the preceding stage node of this fact; and a trunk 3L for 3R processing and a 3R control section 6L which, when this notification is received, thereafter perform 3R processing for optical packets which are transmitted via the path.

Although, for the convenience of explanation, in FIG. 51 each of the nodes A through C is shown as a different block structure, in actuality, as shown in FIG. 52, each of the nodes A through C possesses a common block structure, and a block structure is implemented as becomes necessary, according to the service which each node must fulfill, as shown in FIG. 51.

The operation of this thirty-sixth embodiment of the optical path network according to the present invention will now be explained with reference to FIG. 51. Before the establishment of an optical path, the optical packet for test transmission section 1L of the node upon the transmission side A, transmits an optical packet for test upon the path over which it is predicted the optical path will pass. The signal quality is determined by the signal quality determination section 4L of each node by this optical packet for test. When the signal quality determination section 4L of the node C (for example) detects deterioration of the signal quality, the deterioration notification section of that node C notifies this fact to the preceding stage node B. The 3R processing control section 6L of the node B which has received this notification of deterioration controls the optical cross connect 2L and connects the path of the optical packet for test to the trunk 3L for 3R processing. By doing this, 3R processing is performed for the data which are being transmitted upon the path.

After the testing by the optical packet for test upon the path via the nodes A through C has been completed, the burst data transfer is performed. In burst data transfer via the cut through path, the data transfer is performed without converting the optical signal between the node upon the transmission side A and the node B into an electrical signal. At the node B, the optical signal is temporarily converted into an electrical signal and 3R processing is performed, and the resulting electrical signal after having been subjected to 3R processing is reconverted back into an optical signal and is transmitted to the node C.

Since in this manner, in this embodiment of the present invention, it is possible to specify the points at which 3R processing is to be performed by experiment using the optical packet for test, accordingly the process is simpler and also more reliable than specifying the points at which 3R processing is to be performed by calculation as in the conventional technology, and also it is possible to shorten the time period which is required for calculation.

Embodiment 37

The thirty-seventh embodiment of the present invention will now be explained with reference to FIG. 53. FIG. 53 is a diagram showing the 3R processing structure of the thirty-seventh embodiment of the present invention. The 3R processing structure of this thirty-seventh embodiment is distinguished by the feature that trunks 3-1 and 3-2 for 3R processing are provided at both of the output ports of the optical cross connect 2L. Since according to this structure the path over which 3R processing is performed does not loop back as was the case with the thirty-sixth embodiment, accordingly in comparison with the structure of the thirty-sixth embodiment it is possible to reduce the number of times of wavelength conversion, and there is the benefit that it is possible to suppress signal losses and deterioration to a low level.

Furthermore, although with the thirty-sixth embodiment the trunk 3L for 3R processing occupied specific input and output ports, which was undesirable, by contrast, with this thirty-seventh embodiment, due to the provision of the trunks 3-1 and 3-2 for 3R processing, such reduction of the number of output ports for connection of the transmission path is avoided, and accordingly it is possible to take advantage of the output ports more effectively.

Embodiment 38

Furthermore, it is possible to implement the node according to the present invention using a computer device, which constitutes an information processing device. In detail, this can be done by installing upon that computer device a program which causes that computer device to implement: a function, corresponding to a device which controls the node of this embodiment, of, corresponding to the optical packet for test transmission section 1L, before the establishment of an optical path, transmitting an optical packet for test upon a path which is established in advance; a function, corresponding to the signal quality determination section 4L, of receiving this optical packet for test and determining its signal quality; a function, corresponding to the deterioration notification section 5L, of, if it has been determined by this signal quality determination section 4L that the signal quality has deteriorated, notifying the preceding stage router of this fact; and a function, corresponding to the 3R processing control section 6L, of performing 3R processing for subsequent optical packets via the path, when this notification has been received.

Next, the thirty-ninth embodiment of the present invention will be explained with reference to FIGS. 54 through 56.

Embodiment 39

Figure 54:
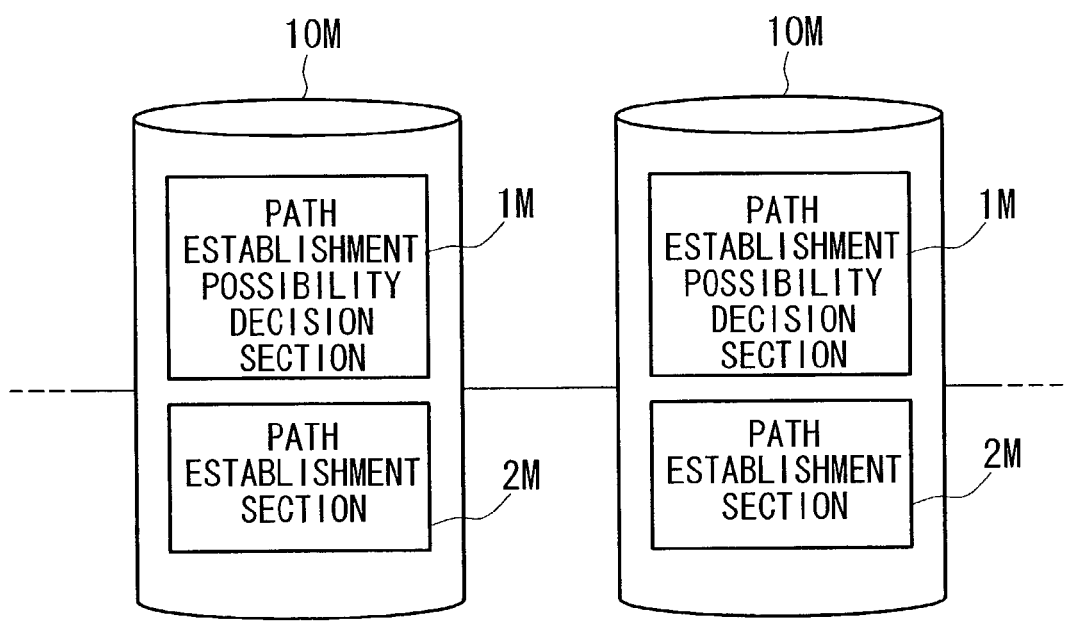
FIG. 54 is a block diagram of a node of the thirty-ninth embodiment of the present invention.

This thirty-ninth embodiment, as shown in FIG. 54, is a node distinguished, when transferring an IP packet for signaling which is performed before establishment of a path based upon its IP address, in that the next stage node is a node which is included in the most suitable route for transferring the IP packet, and by comprising a path establishment possibility decision section 1 and a path establishment section 2 which, when it is impossible to establish the path because no resources are available for establishing a path to this next stage node, establish a path to a neighboring node which has resources for establishing a path, as a substitute node for the next stage node, irrespective of whether or not it is included upon the most suitable route.

Figure 55:
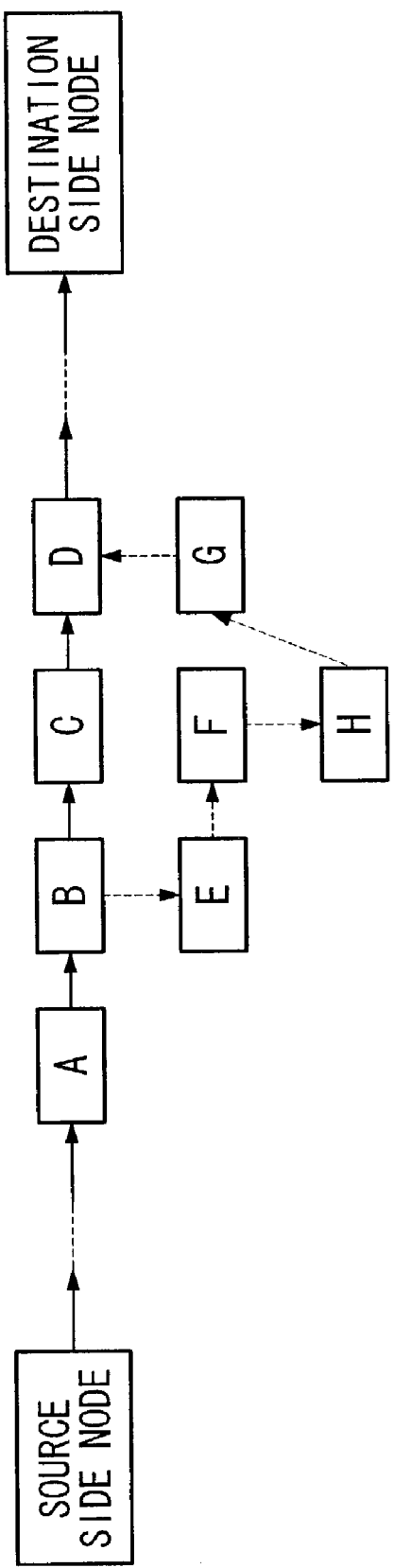
FIG. 55 is a diagram for explanation of a path establishment procedure of the thirty-ninth embodiment of the present invention.

In the example shown in FIG. 55, the most suitable path is shown by the solid lines from the node upon the transmission side -> . . . ->A->B->C->D-> . . . -> the node upon the reception side, but, since in this case at the node B there are no resources available for establishing a cut through path to the node C, the cut through path establishment possibility decision section 1M decides that it is impossible to establish a cut through path. Next, upon the result of making a decision as to whether or not it is possible to establish a cut through path to another neighboring node E being that indeed resources are available, this cut through path establishment decision possibility section 1M decides that it is possible to establish such a cut through path.

In this twenty-third embodiment, in this type of case, the establishment section 2M establishes a cut through path with the neighboring node for which resources are available, irrespective of whether or not it is upon the most suitable route. In the example shown in FIG. 55, a cut through path is established as shown by the broken lines from the node upon the transmission side -> . . . ->A->B->E->F->H->G->D-> . . . -> the node upon the reception side. Although this path is somewhat circuitous as compared with the most suitable route, nevertheless, when it is compared with the alternative case of a notification that it has been impossible to ensure resources being transmitted from the node B to the node upon the transmission side, and the node upon the transmission side retrying to establish a cut through path, it is sufficiently outstanding from the point of view of being able to transfer the burst data quickly using a cut through path.

Furthermore, as another alternative structure, as shown in FIG. 54, a path establishment possibility decision section 1M is provided which, when an IP packet for signaling is transferred before performing the establishment of a path based upon IP address, if the next stage node is a node which is included in the most suitable route for the IP packet transfer, and a decision has been made that it is impossible to establish a cut through path since no resources are available for establishing a cut through path to this next stage node, notifies this fact to the preceding stage node, and the preceding stage node which receives this notification from this path establishment possibility decision section 1M comprises its own path establishment possibility decision section 1M, and a path establishment section 2M which establishes a cut through path to a neighboring node which has resources available for establishing a cut through path, as a substitute node, irrespective of whether or not it is included upon the most suitable route.

Figure 56:
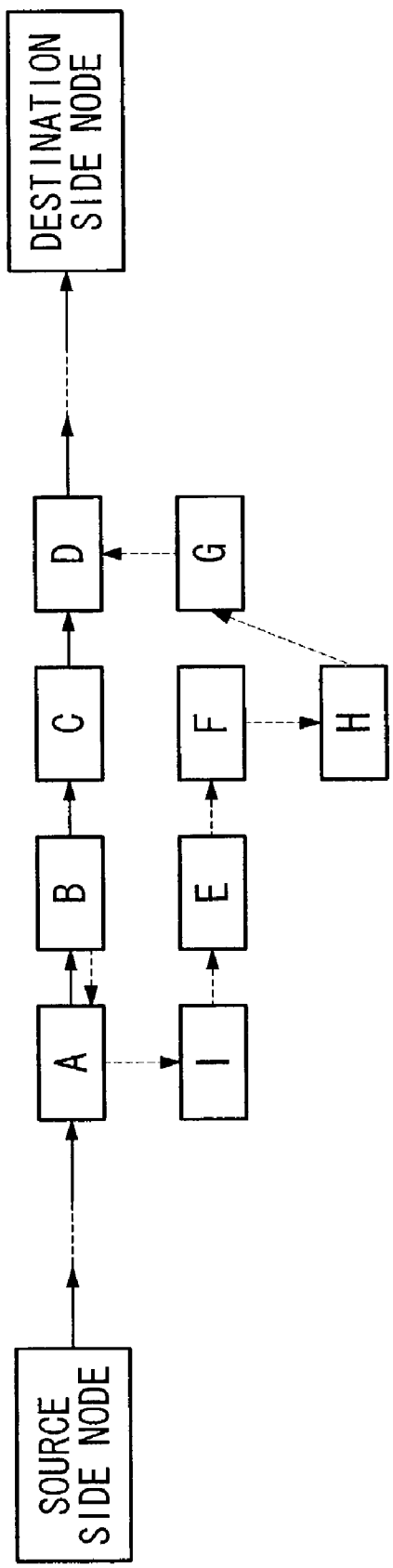
FIG. 56 is another diagram for explanation of a path establishment procedure of the thirty-ninth embodiment of the present invention.

In the example shown in FIG. 56, the most suitable path is shown by the solid lines from the node upon the transmission side -> . . . ->A->B->C->D-> . . . -> the node upon the reception side, but, since in this case at the node B there is no vacant wavelength for establishing a cut through path to the node C, the cut through path establishment possibility decision section 1M decides that it is impossible to establish a cut through path.

In this other structure, in this type of case, the cut through path establishment possibility decision section 1M of the node B issues a notification to the node A that it is impossible to establish a cut through path. When it receives this notification, the cut through path establishment decision possibility section 1M of the node A decides that it is possible to establish a cut through path, since the result of performing the cut through path establishment possibility decision for another neighboring node I is that resources are available.

In the path establishment section 2M of the node A, a cut through path is established with the neighboring node for which resources are available, irrespective of whether or not it is upon the most suitable route. In the example shown in FIG. 56, a cut through path is established as shown by the broken lines from the node upon the transmission side -> . . . ->A->I->E->F->H->G->D-> . . . -> the node upon the reception side. Although this path is somewhat circuitous as compared with the most suitable route, nevertheless, when it is compared with the alternative case of a notification being transmitted from the node B to the node upon the transmission side A that it is impossible to ensure resources, and the node upon the transmission side A retrying the establishment of a path, it is sufficiently outstanding from the point of view of being able to transfer the burst data quickly using a cut through path.

In other words, the node at which it has been impossible to establish a cut through path notifies the preceding stage node of that fact, and a procedure is executed at this preceding stage node which has received this notification for establishing a cut through path to a neighboring node. That is to say, since there is a high possibility of occurrence of congestion at the node at which it has been impossible to establish a cut through path, and it is considered that, at this type of node, even if an attempt were to be made to establish a path to a neighboring node, the success ratio would be low, accordingly the process returns to the preceding stage node at which the probability of the occurrence of congestion is low, and an attempt is made to establish a cut through path from that node to a neighboring node.

Furthermore, it is possible to implement the node according to this thirty-ninth embodiment of the present invention using a computer device, which constitutes an information processing device. In detail, this can be done by installing upon that computer device a program which is distinguished by causing that computer device to act as a device corresponding to one which controls the node according to this thirty-ninth embodiment, by implementing functions corresponding to the above described cut through path establishment decision possibility section 1M and path establishment section 2M.

Next, the fortieth embodiment of the present invention will be explained with reference to FIGS. 40 and 57 through 60.

Embodiment 40

This fortieth embodiment consists of a node which is provided with a path establishment success ratio enhancement function of establishing a plurality of cut through path candidates in advance, collecting together statistical information relating to the success ratio for cut through path establishment for this plurality of candidate paths, and, based upon this statistical information, transmitting a signaling packet for establishing a cut through path for the candidate path whose path establishment success ratio is the highest.

It should be noted that, when establishing the plurality of path candidates between the node upon the transmission side and the node upon the reception side, this is performed based upon a policy of, for example, selecting a plurality of path candidates when there exist a plurality of path candidates of equal length, or, when there exist a plurality of path candidates whose length is different, selecting a plurality of path candidates in sequence from the path candidate whose length is the shortest, or the like.

Figure 58:
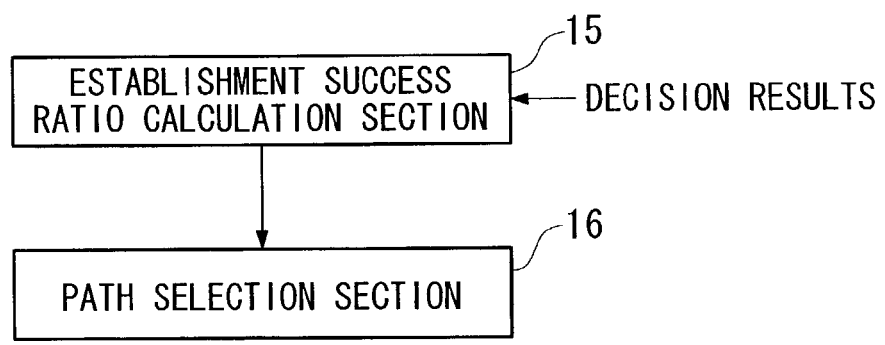
FIG. 58 is a block diagram of a node upon the transmission side of the fortieth embodiment of the present invention.
Figure 57:
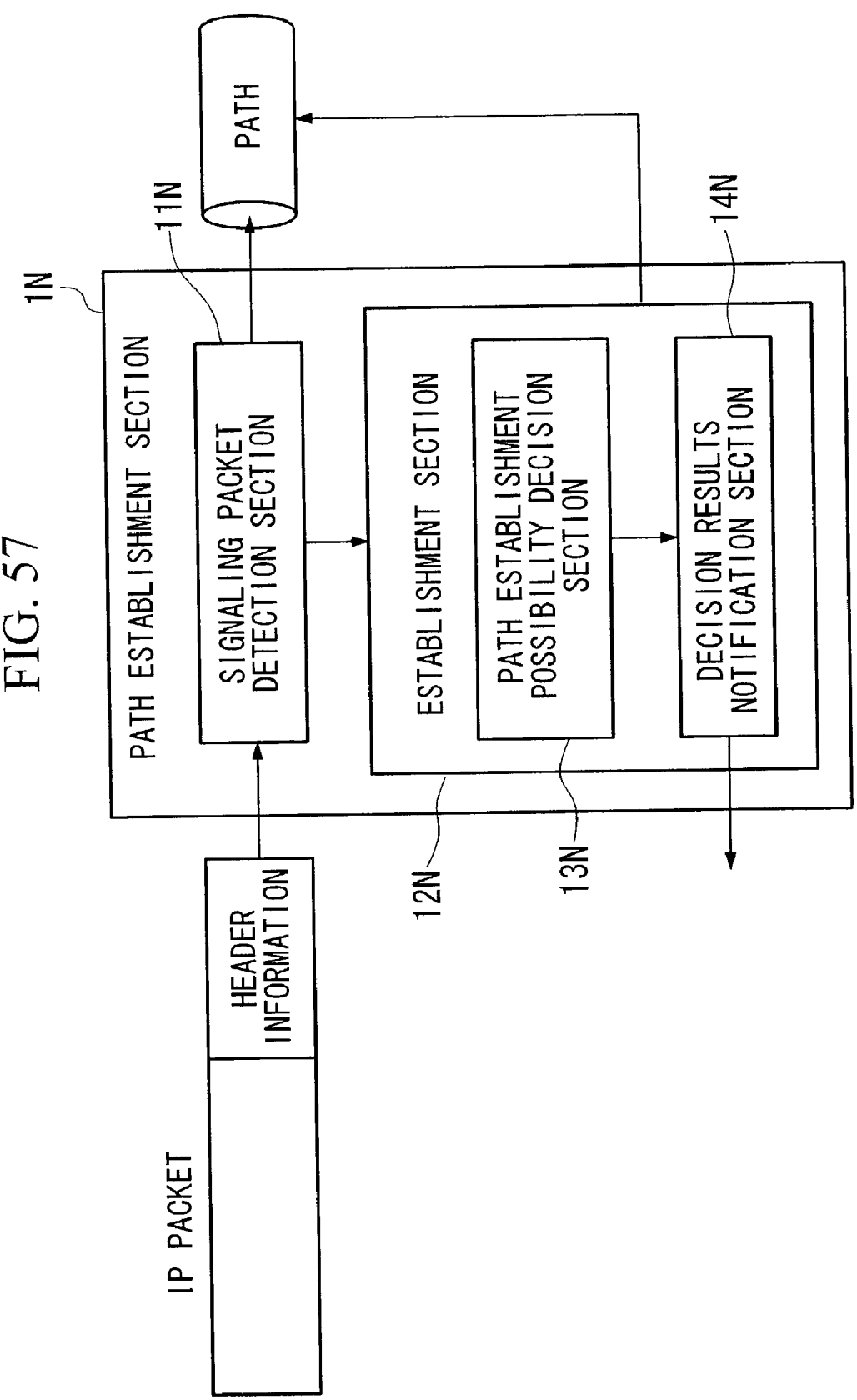
FIG. 57 is a block diagram of a path establishment section of the fortieth embodiment of the present invention.
Figure 60:
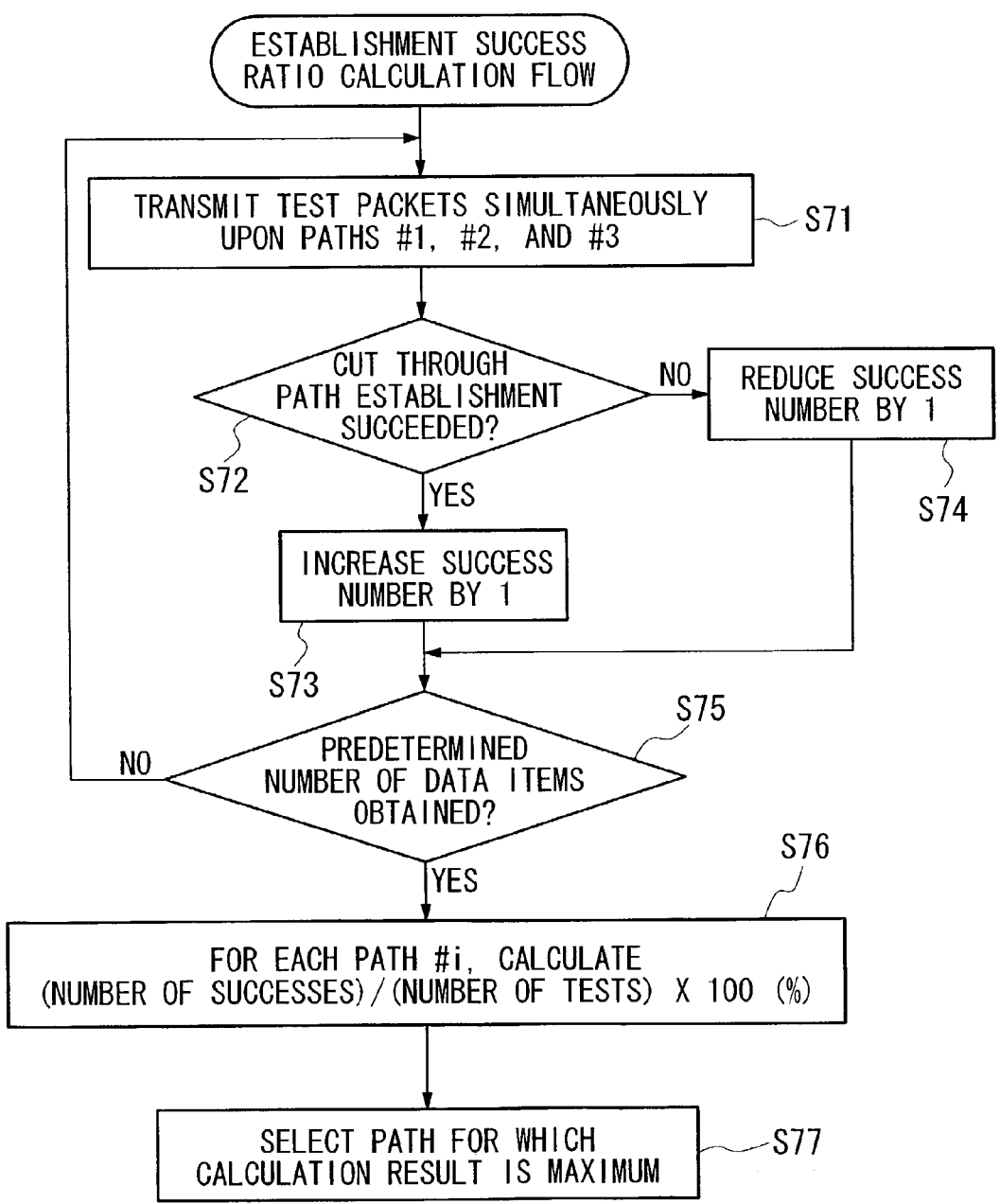
FIG. 60 is another flow chart showing the control flow of the establishment success ratio calculation, in the fortieth embodiment of the present invention.

FIG. 57 is a block diagram of a path establishment section of the fortieth embodiment of the present invention. FIG. 58 is a block diagram of a node upon the transmission side of the fortieth embodiment of the present invention. FIG. 59 is a flow chart showing the control flow of an establishment success ratio calculation, in the fortieth embodiment of the present invention. FIG. 60 is another flow chart showing the control flow of the establishment success ratio calculation, in the fortieth embodiment of the present invention.

This fortieth embodiment, as shown in FIG. 40, comprises a node upon the transmission side A, a node upon the reception side N, and relay nodes B through M which are located on paths between the node upon the transmission side A and the node upon the reception side N; and these relay nodes B through M, as shown in FIG. 57, are nodes which are distinguished by the feature that they comprise a path establishment section 1N which establishes a path according to the IP addresses of IP packets which arrive, and in that: this path establishment section 1N comprises a signaling packet arrival detection section 11N which detects the arrival of an IP packet for signaling which is transferred before the establishment of a path, and an establishment section 12N which establishes a path to the next stage relay node when the arrival of the IP packet has been detected by this signaling packet arrival detection section 11N; the establishment section 12N comprises a path establishment possibility decision section 13N which determines whether or not it is possible to establish a path to the next stage relay node, and a decision result notification section 14N which notifies the decision result of this path establishment possibility decision section 13N to the node upon the transmission side A; and, as shown in FIG. 40, a plurality of paths #1, #2, and #3 are established in advance between the node upon the transmission side A and the node upon the reception side N, and the node on the transmission side A, as shown in FIG. 58, comprises an establishment success ratio calculation section 15N which calculates the respective path establishment success ratios by the path establishment sections 1N according to the decision results which are notified by the decision result notification sections 14N relating to the plurality of paths #1 through #3, and a path selection section 16N which establishes a path upon a path for which the path establishment success ratio is high, according to the result of calculation by this establishment success ratio calculation section 15N.

The flow of the establishment success ratio calculation in the fortieth embodiment of the present invention will now be explained with reference to FIG. 59. This establishment success ratio calculation flow, in the process of normal data transfer, is the embodiment for calculating statistically a path establishment success ratio for each of paths #1 through #3. Each time data transfer takes place along the plurality of paths #1, #2, and #3 shown in FIG. 40, it is taken advantage of cyclically. In other words, as shown in FIG. 59, when the data transfer takes place, for example, path #1 is taken advantage of (in a step S61). If the establishment of a cut through path during this data transfer process has been successful (a step S62), the number of success times is increased by 1 (in a step S63). Furthermore, if the establishment of the cut through path fails, then the number of success times is diminished by 1 (in the step S64). However, if the result after subtraction is less than zero, it is reset to zero. The next time that data transfer takes place, path #2 is taken advantage of (in a step S66 and in the step S61). In the same way as with path #1, if the establishment of the cut through path in the data transfer process is successful (the step S62), the number of success times is increased by 1 (in the step S63). Furthermore, if the establishment of the cut through path fails, then the number of success times is diminished by 1 (in the step S64), and if the result after subtraction is less than zero, it is reset to zero. The next time that data transfer takes place, path #3 is taken advantage of (in the step S66 and in the step S61). In the same way as with paths #1 and #2, if the establishment of the cut through path in the data transfer process is successful (the step S62), the number of success times is increased by 1 (in the step S63). Furthermore, if the establishment of the cut through path fails, then the number of success times is diminished by 1 (in the step S64), and if the result after subtraction is less than zero, it is reset to zero. In this manner, after data has been obtained a predetermined number of times (the step S65), for each of the paths #1, #2, and #3, the value (number of success times/number of attempts×100%) is calculated (in the step S67), and the path for which the result of this calculation is the greatest is selected as that path for which the establishment success ratio is the greatest (in the step S68).

It is possible to take advantage of a cut through path for which the establishment success ratio is high by executing this type of establishment success ratio calculation flow periodically, and by transferring the burst data by taking advantage of the cut through path selected as a result thereof.

The flow of another form of establishment success ratio calculation will now be explained with reference to FIG. 60. This other establishment success ratio calculation flow is an embodiment in which test packets for calculation of cut through path establishment success ratio are transmitted at the same time upon each of the paths #1 through #3, and the cut through path establishment success ratios are statistically calculated. In comparison to the flow of the calculation shown in FIG. 59, it is possible to perform the calculation in any desired time period, since test packets which bear no relationship to data transfer are utilized. In detail, as shown in FIG. 60, test packets are transmitted at the same time upon the paths #1, #2, and #3 (in the step S71). If, in the transfer process for these test packets, success is obtained in establishing a cut through path (the step S72), the number of success times is increased by 1 (in the step S73). Furthermore, if the establishment of the cut through path fails, then the number of success times is diminished by 1 (in the step S74). However, if the result after subtraction is less than zero, it is reset to zero. In this manner, after data has been obtained a predetermined number of times (the step S75), for each of the paths #1, #2, and #3, the value (number of success times/number of attempts×100%) is calculated (in the step S76), and the path for which the result of this calculation is the greatest is selected as that path for which the establishment success ratio is the greatest (in the step S77).

It is possible to take advantage of a cut through path for which the establishment success ratio is high by executing this type of establishment success ratio calculation flow periodically, and by transferring the burst data by taking advantage of the path selected as a result thereof.

Figure 61:
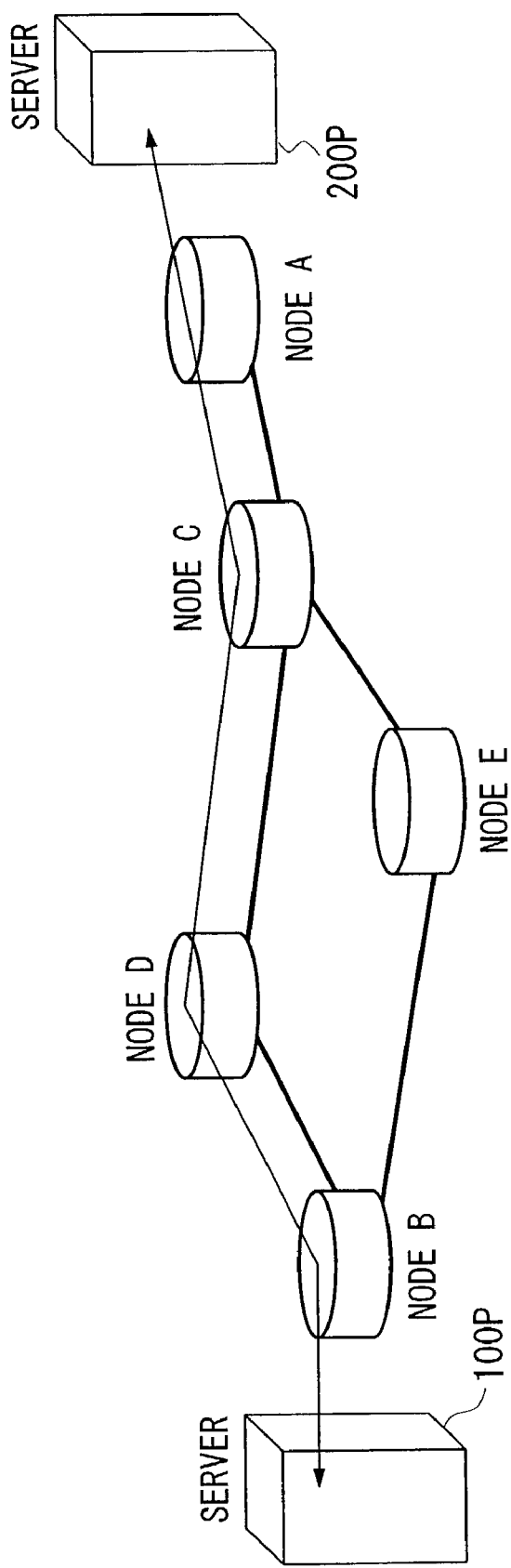
FIG. 61 is a diagram showing a network with a node according to the forty-first through the forty-fourth embodiments of the present invention.
Figure 62:
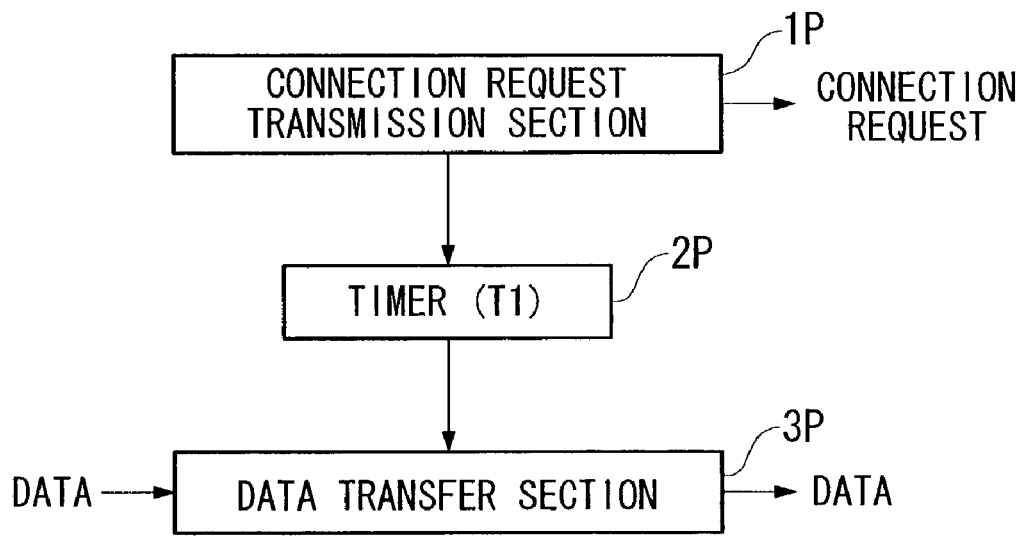
FIG. 62 is a block diagram of a node upon the transmission side of the forty-first embodiment of the present invention.
Figure 63:
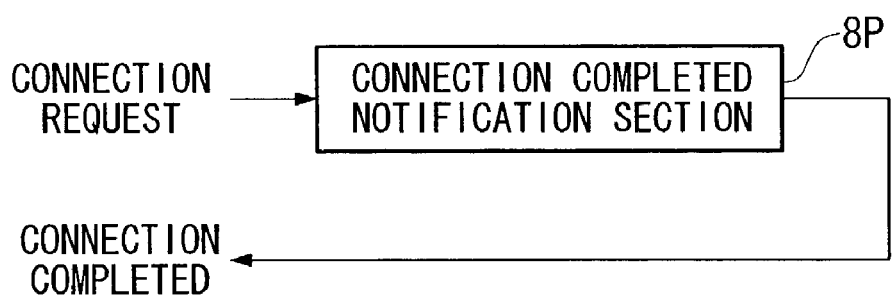
FIG. 63 is a block diagram of a node upon the reception side of the forty-second embodiment of the present invention.
Figure 65:
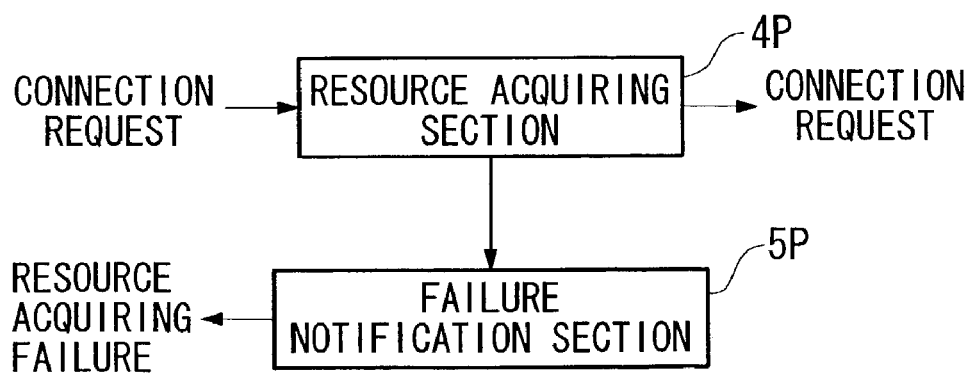
FIG. 65 is a block diagram of a relay node of the forty-second embodiment of the present invention.
Figure 64:
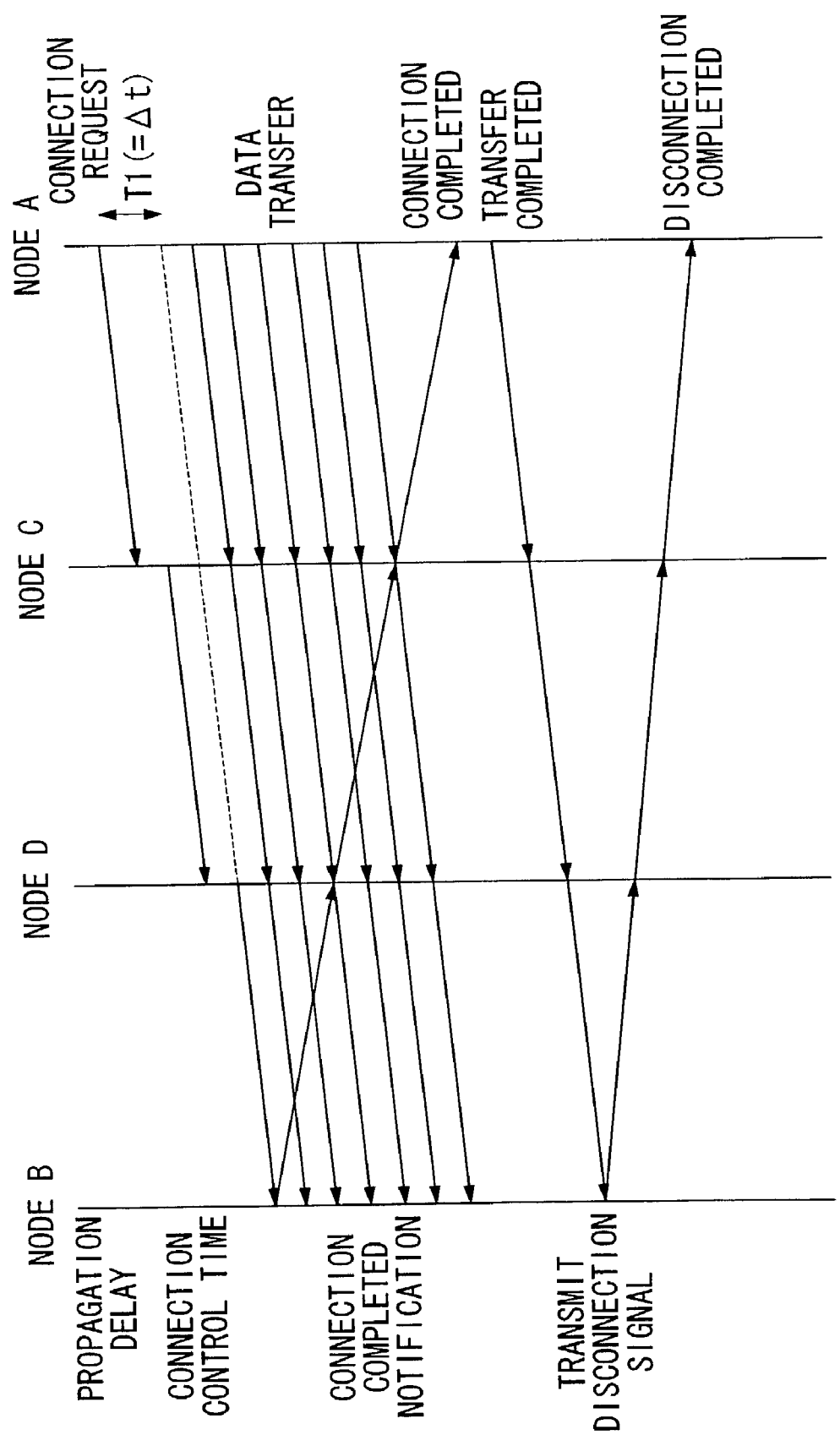
FIG. 64 is a diagram showing a path connection and data transfer procedure, in the forty-first embodiment of the present invention.
Figure 66:
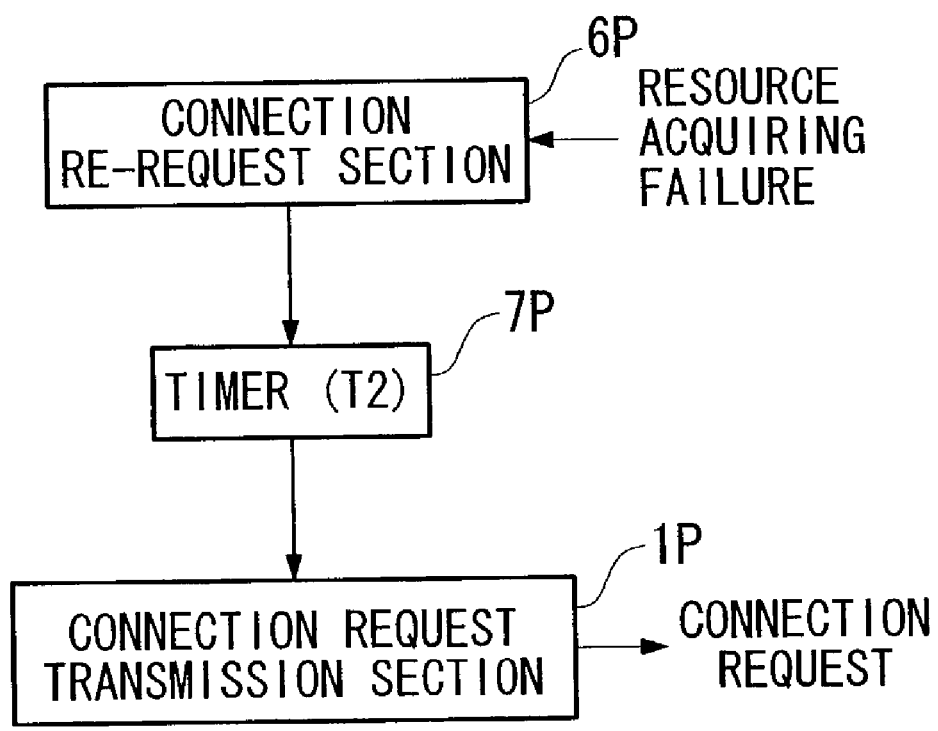
FIG. 66 is a block diagram of a node upon the transmission side of the forty-second embodiment of the present invention.
Figure 67:
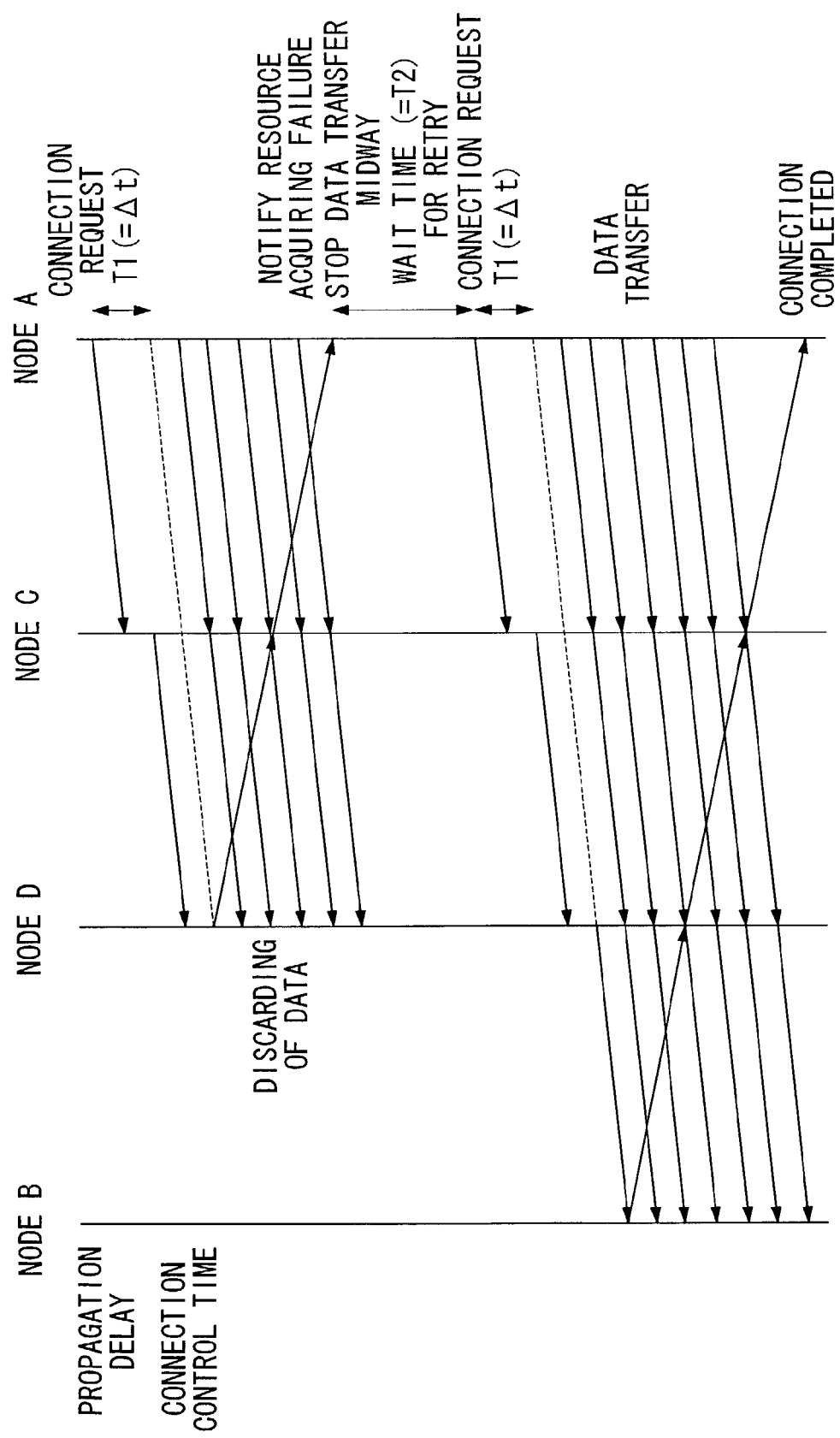
FIG. 67 is a diagram showing a path connection and data transfer procedure, in the forty-second embodiment of the present invention.
Figure 68:
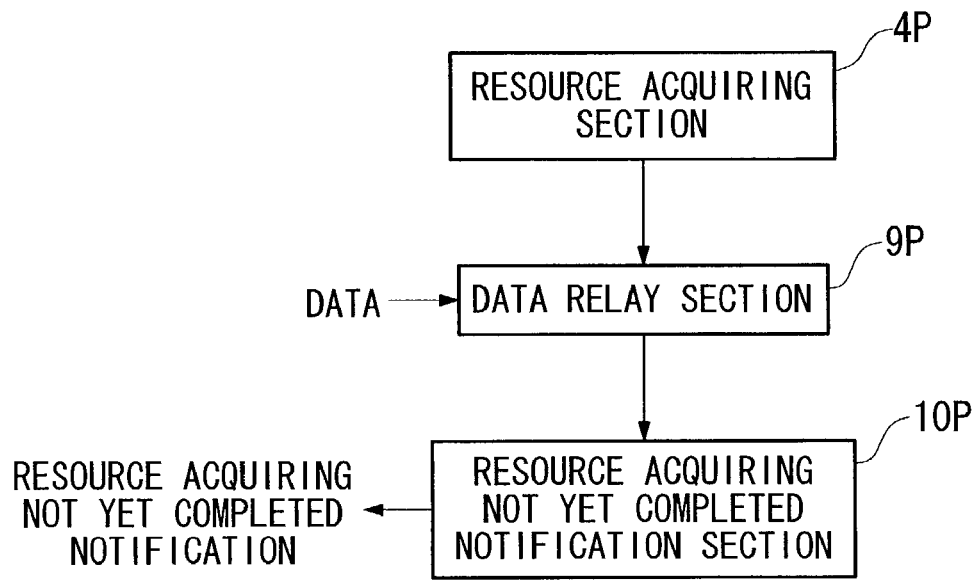
FIG. 68 is a block diagram of a relay node of the forty-third embodiment of the present invention.
Figure 71:
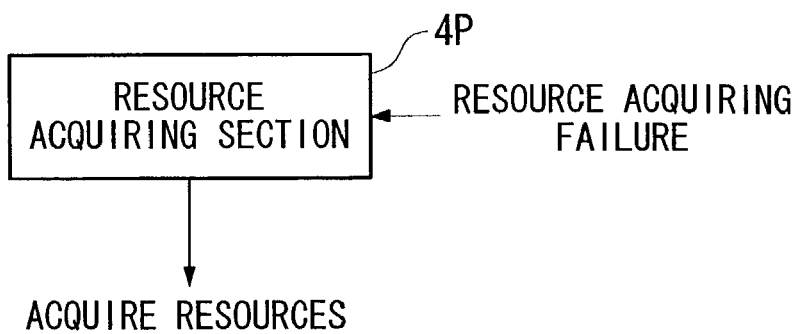
FIG. 71 is a block diagram of a relay node of the forty-fourth embodiment of the present invention.
Figure 69:
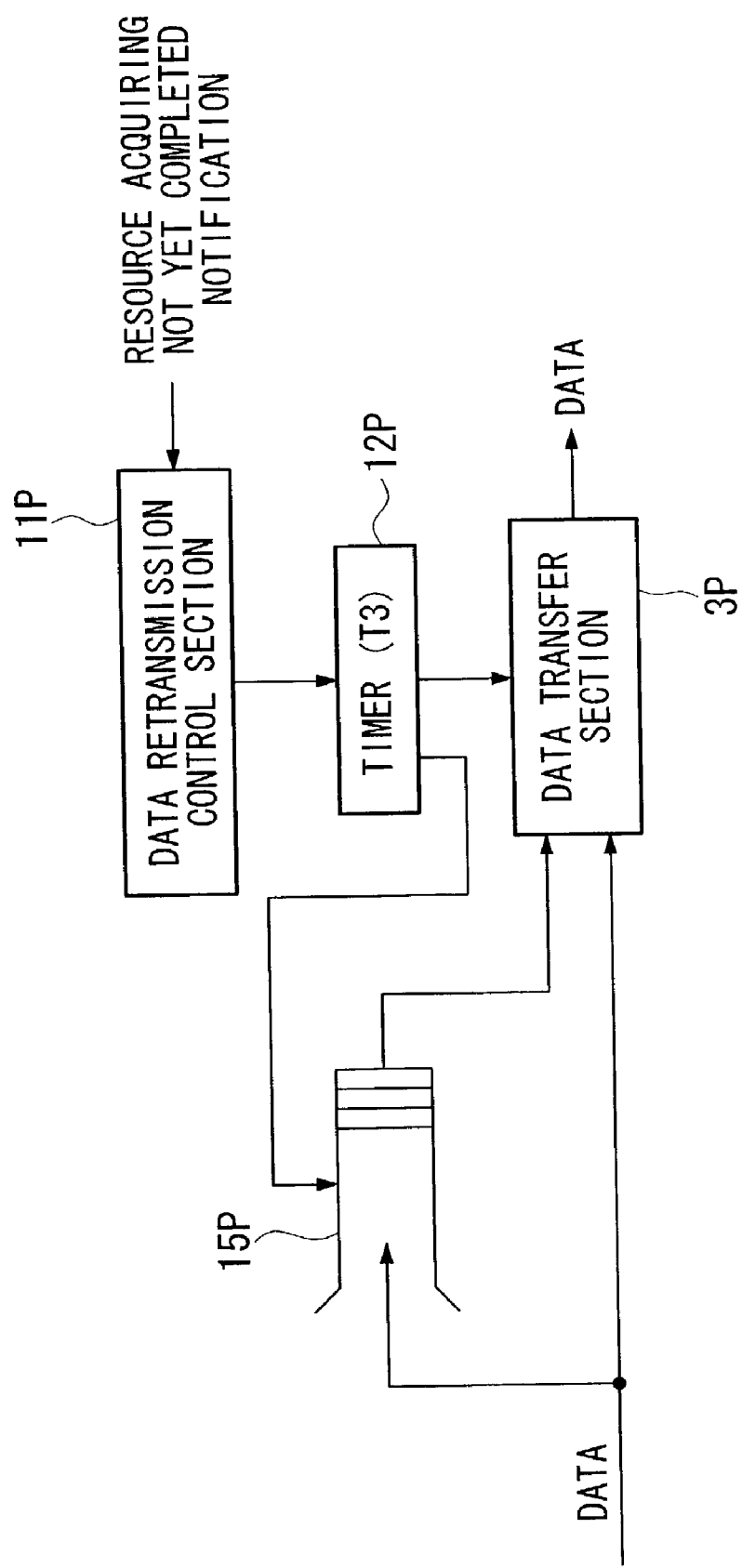
FIG. 69 is a block diagram of a node upon the transmission side of the forty-third and the forty-fourth embodiments of the present invention.
Figure 70:
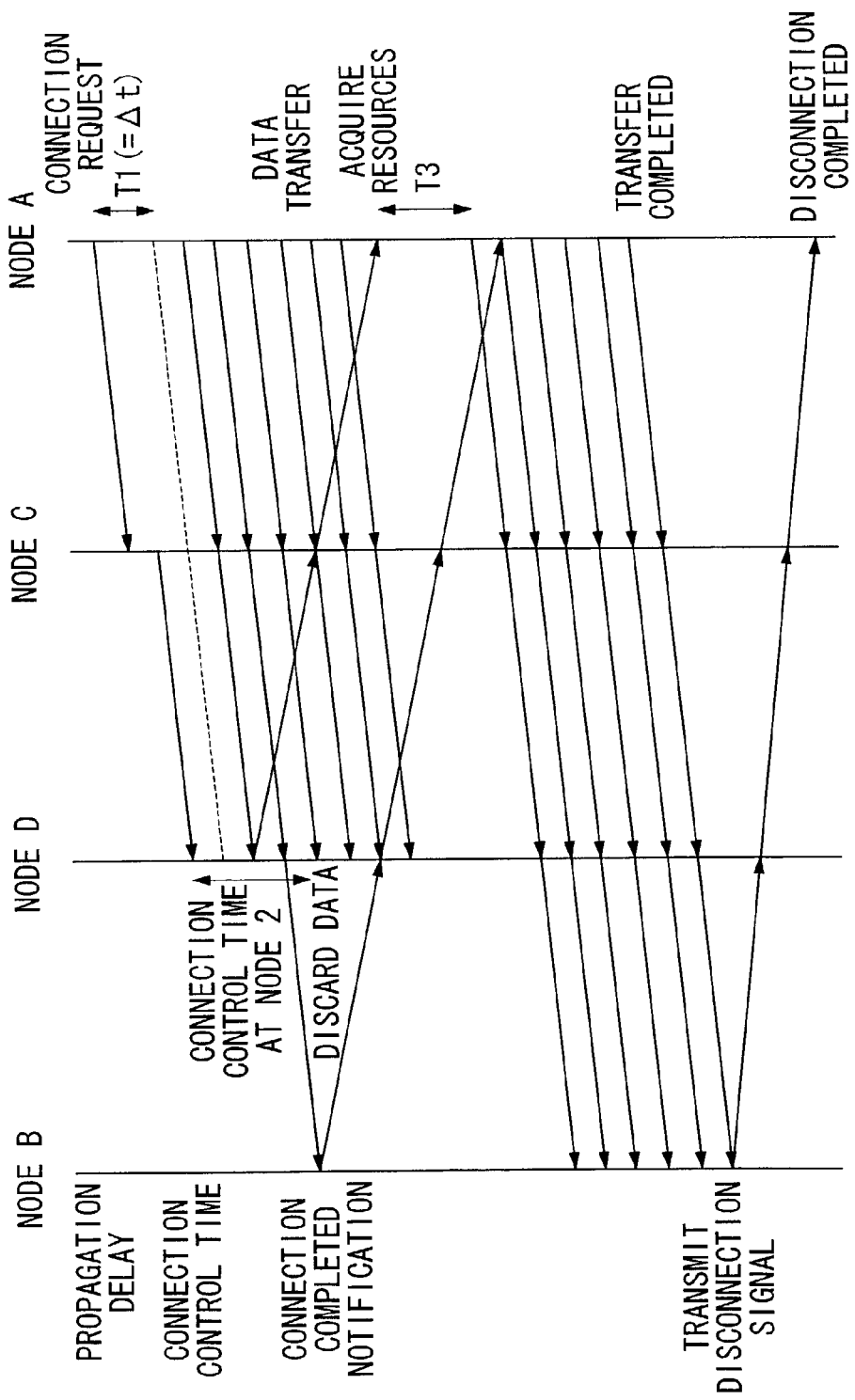
FIG. 70 is a diagram showing a path connection and data transfer procedure, in the forty-third embodiment of the present invention.
Figure 72:
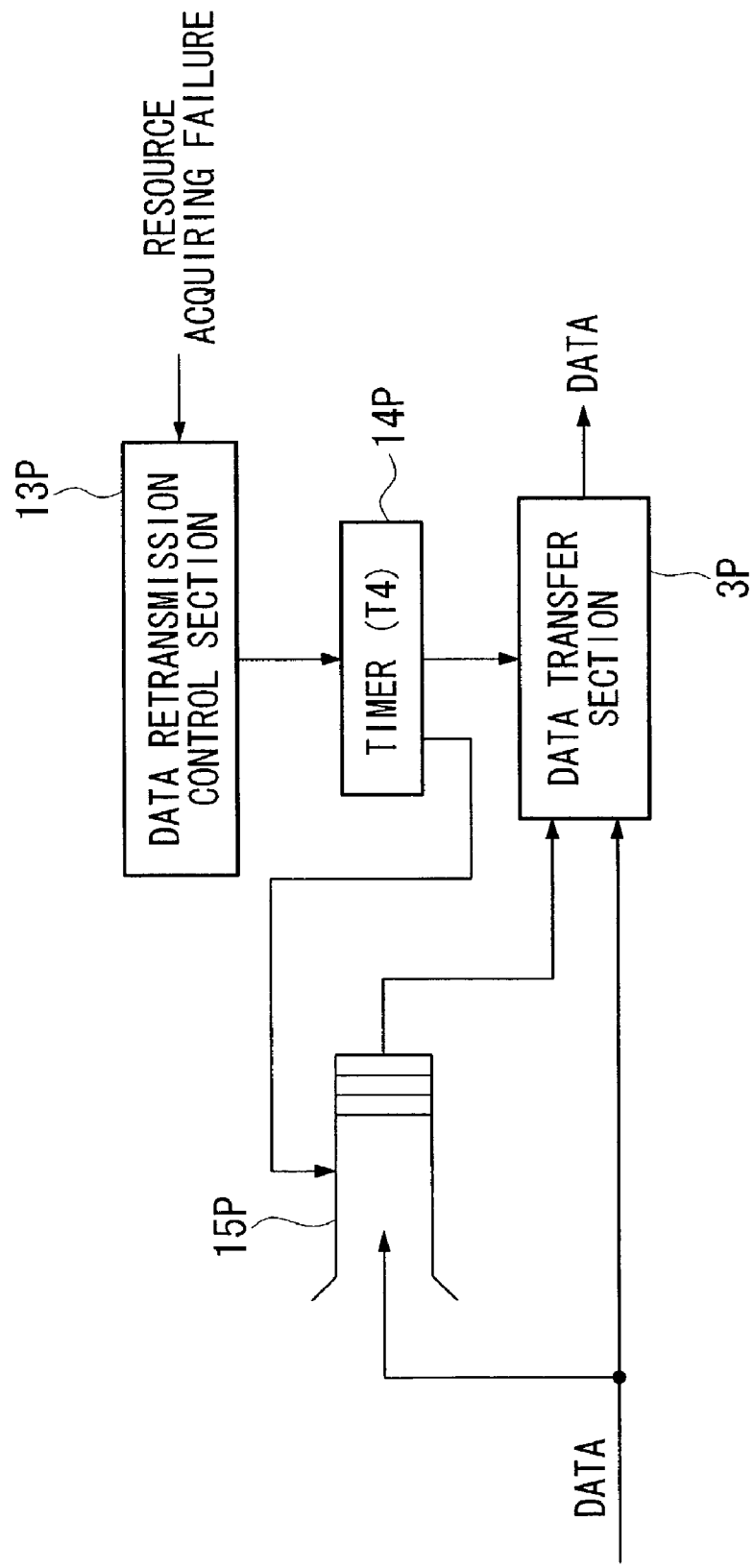
FIG. 72 is a block diagram of a node upon the transmission side of the forty-fourth embodiment of the present invention.
Figure 73:
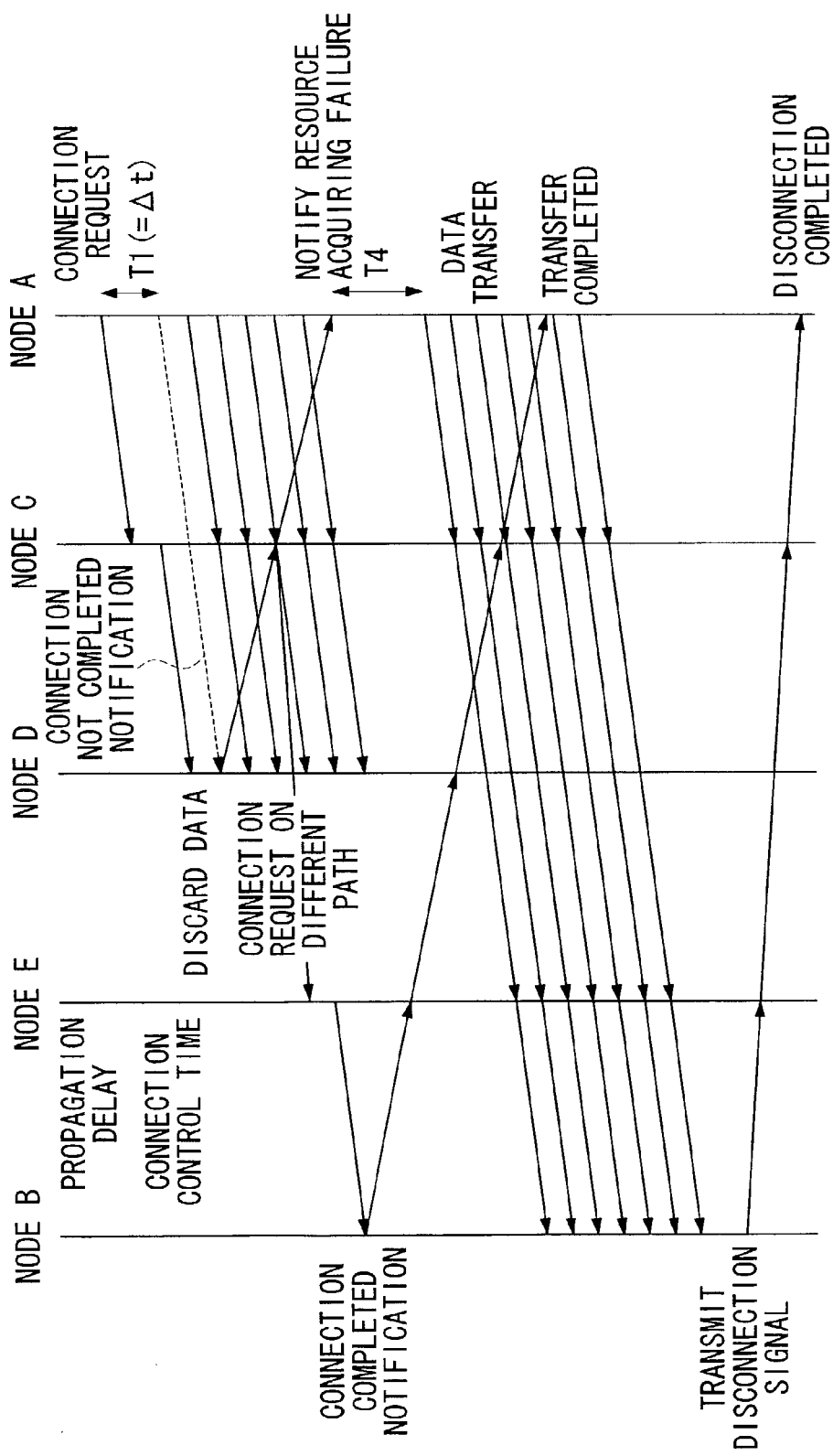
FIG. 73 is a diagram showing a path connection and data transfer procedure, in the forty-fourth embodiment of the present invention.

Next, the forty-first through the forty-fourth embodiments of the present invention will be explained with reference to FIGS. 61 through 74. FIG. 61 is a diagram showing a network structure with a node of the forty-first through the forty-fourth embodiments of the present invention. FIG. 62 is a block diagram of a node upon the transmission side of the forty-first embodiment of the present invention. FIG. 63 is a block diagram of a node upon the reception side of the forty-first embodiment of the present invention. FIG. 64 is a diagram showing a path connection and data transfer procedure, in the forty-first embodiment of the present invention. FIG. 65 is a block diagram of a relay node of the forty-second embodiment of the present invention. FIG. 66 is a block diagram of a node upon the transmission side of the forty-second embodiment of the present invention. FIG. 67 is a diagram showing a path connection and data transfer procedure, in the forty-second embodiment of the present invention. FIG. 68 is a block diagram of a relay node of the forty-third embodiment of the present invention. FIG. 69 is a block diagram of a node upon the transmission side of the forty-third and the forty-fourth embodiments of the present invention. FIG. 70 is a diagram showing a path connection and data transfer procedure, in the forty-third embodiment of the present invention. FIG. 71 is a block diagram of a relay node of the forty-fourth embodiment of the present invention. FIG. 72 is a block diagram of a node upon the transmission side of the forty-fourth embodiment of the present invention. And FIG. 73 is a diagram showing a path connection and data transfer procedure, in the forty-fourth embodiment of the present invention.

The functioning of the forty-first through the forty-fourth embodiments of the present invention is distinguished by the fact that, by its being added to the node previously described, data transfer is started after a time period T1 in any case, irrespective of whether or not the node upon the transmission side which has transmitted a path connection request has received input of this connecting request. This time period T1 is set to be shorter than the proper time period until some type of answer is returned in response to a connection request. By doing this, it is possible to shorten the time period from the point that the user makes a request for data transfer until actual start of the data transfer, so that it is possible to anticipate effective advantage being taken of network resources.

Embodiment 41

The forty-first embodiment of the present invention will now be explained with reference to FIGS. 61 through 64. FIG. 61, according to the present invention, shows a network which is made up from: a node upon the transmission side A which comprises a connection request transmission section 1P which transmits a connection request for a cut through path; a node upon the reception side B which is the destination of this connection request and which comprises a connection completed notification section 8P which notifies to the node upon the transmission side A the completion of establishment of a cut through path according to this connection request; and relay nodes C, D, and E which are provided upon paths between the node upon the transmission side A and the node upon the reception side B, and which comprise a resource ensuring section 4P which ensures resources for establishing a cut through path based upon the connection request.

Here, the distinguishing feature of this embodiment is that there are provided a timer 2 and a data transfer section 3 which start data transfer after a time period T1 from the transmission of a connection request by a connection request transmission section 1, irrespective of whether or not there has been a notification of path establishment completion by the node upon the transmission side A to the node upon the reception side B.

In detail, in the case of a server 200P which keeps data from a server 100P, suppose that a request is made for high speed transfer of high volume data. With TCP/IP according to the conventional technology, the time period which is required for data to be transferred serially by the stored and transfer method at each node A through E until the data transfer is complete has become long.

However, with this embodiment, at the node A which is connected to the server 200P, when it is detected that it is necessary to perform this high capacity data transfer, a cut through path is established from this node A to the node B which is connected to the server 100P, along a route from the node A, via the nodes C and D, to the node B. When the path has been established, the data transfer starts forthwith. After the data transfer is completed, the path is released immediately.

In other words, with this embodiment, as shown in FIG. 64, without waiting at the node upon the transmission side A for receipt of the notification of completion of connection from the node upon the reception side B, data transfer is started in advance of the connection completed notification, so as to transmit the data at a timing for connection at the enroute nodes C and D to be completed. From outputting the connection request, the data is transferred from the node A after the lapse of a time period T1 (=Δt) which is of the order of the time period in which it is expected that the control at each node will be completed. This time period T1 is set to the sum of the connection control time periods at the nodes upon the route. As compared with conventional methods, it is possible to shorten the transfer time period by just the time period required for propagation of the return signal from the node B to the node A which consists of a notification of completion of connection.

Embodiment 42

The forty-second embodiment of the present invention will now be explained with reference to FIGS. 65 through 67. In this embodiment, when a failure has occurred in the attempt to ensure resources based upon the connection request, a resource ensuring section 4P notifies the node upon the transmission side A of this failure in ensuring resources. In this embodiment, the node upon the transmission side A comprises a connection re-request section 6P and a timer 7P, which transmit a re-connection request after a time period T2 has elapsed from when this notification of failure in resource ensuring has been received.

In other words, in this embodiment, as shown in FIG. 67, if due to insufficiency of resources for a path at some intermediate relay node or the like, connection of the cut through path has not been completed, then this relay node returns the notification of failure in resource ensuring to the node upon the transmission side A. At this relay node, if data which has been transferred in advance from the node A arrives, this data is discarded.

At the node A, the data transfer is immediately stopped when this notification of failure in resource ensuring is received. After receiving this notification of failure in resource ensuring, and after then waiting for the time period T2, the re-connection request is repeated. For network resources along a path, the shorter is the average data transfer time period, the more is it possible to reduce the probability of failure during connection. Furthermore it becomes possible to operate more efficiently over the entire network as a whole, than if the data transfer request were to be repeated from the beginning, since the probability that such a retry process will fail even if it is repeated two or three times is quite low.

Since, if the blocked state of network resources has not changed from the time point of transmission of the first connection request, the same result will be obtained even if a re-connection request is transmitted, it should be understood that the time period T2 is taken as the time period in which it is predicted that it is likely that a change will have taken place in the blocked state of network resources.

Embodiment 43

The forty-third embodiment of the present invention will now be explained with reference to FIGS. 68 through 70. In this embodiment, the relay nodes are distinguished by comprising a resource ensuring non-completion notification section 10P which, when the data from the node upon the transmission side has been received before the ensuring of resources based upon the connection request by the resource ensuring section 4P has been completed, notifies to the node upon the transmission side A that the ensuring of resources has not been completed; and the node upon the transmission side A is distinguished by comprising a data resend control section 11P, a timer 12P, and a buffer 15P, which start data transfer for a second time after a time period T3 has elapsed from when this notification of non completeness of resource ensuring has been received.

That is to say, with this embodiment, as shown in FIG. 70, let us consider the case in which the time period related to connection control at the relay node D is longer than the time period for initial establishment, and data arrives before the connection has been completed. In this case, on the one hand the data which arrives at the node D is discarded, and also the fact that the connection has not yet been completed is immediately notified to the node A as a resource ensuring failure notification. At the node A, after the time period T3 has elapsed from the receipt of the resource ensuring failure notification, the data is resent. By doing this, it is possible to avoid the omission of a portion of the data at the relay node.

When increase of the control connect time period occurs unexpectedly at the node D, since the possibility is high that already the establishment of a connection will have been completed about when that the data after the waiting time period at this time arrives, accordingly the time period T3 of the timer 12P is set to be short, and the data is resent immediately after receipt of the notification.

However, if the control time period for the node as a whole is extended, since there is a possibility that the initial waiting time period is too short, accordingly a learning function is implemented at the side of the node A; in other words, the function is implemented of increasing or decreasing this time period. In this embodiment, if a notification that resource ensuring is not yet completed has been repeatedly received a predetermined number of times, the data resend control section 11 is arranged to reset the time period T3 of the timer 12 to be longer. Furthermore, since it is desirable that this time period T3 should, within the limits of possibility, be short, accordingly it is gradually set longer and longer, and it is controlled so that its most suitable value is found. Yet further, if over a long time period absolutely no notification that resource ensuring is not yet completed has been received, then, since it may be considered that the time period T3 is too long with respect to the time period which is required for ensuring resources, in order to avoid such a situation, it is again reset to be short.

Embodiment 44

The forty-fourth embodiment of the present invention will now be explained with reference to FIGS. 66 through 73. A resource ensuring section 4P which comprises a failure notification section 5P which notifies failure in resource ensuring to the node upon the transmission side A when a failure has occurred in the attempt to ensure resources based upon a connection request has already been explained, but, in this embodiment, the resource ensuring section 4P of a relay node, when a notification of failure in ensuring resources transmitted towards the node upon the transmission side A has been received from another relay node, ensures the resources at its own relay node based upon the connection request, if such ensuring of resources is possible. In this connection, the node upon the transmission side A is distinguished by including a data resend control section 13P, a timer 14P, and a buffer 15P which, if a notification of failure in ensuring resources has been received, restart data transfer after a time period T4 has elapsed.

In other words, with this embodiment, as shown in FIG. 73, if the connection has not been completed at the node D, the data which has arrived at the node D is discarded, and a notification of failure in ensuring resources is sent to the node C. At the node C, if it is determined that it is possible to connect the path via a different node, a notification of failure in ensuring resources is issued to the node A, and, while issuing a data transfer request, a request for connection to the destination node via the node E is issued. By doing this, it is possible to shorten the control time period for establishing a connection, and to perform data transfer at high efficiency.

With this forty-fourth embodiment of the present invention, even if the node A upon the transmission side receives a notification that an error has occurred during the ensuring of resources, it expects a different cut through path to be established, and does not transmit a request for reconnection, but simply performs resending of the data.

By recording the program according to any of the above described embodiments of the present invention upon a recording medium according to a corresponding embodiment of the present invention, it is possible to install the program according to the present invention upon the computer device, using this recording medium. Alternatively, it is also possible to install the program according to the present invention upon the computer device directly via a network from a server upon which the program according to the present invention is kept.

By doing this, it is possible to establish an optical path network and a node which make it possible, using the computer device, to perform burst data transfer reliably at high speed, and furthermore make it possible to reduce the labor and the time period which are required for establishing the cut through path, and also the number of invalid retentions.

Furthermore, it is possible to establish an optical path network and a node which make it possible, using the computer device, along with reducing the labor and the time period which are required for establishing the 3R implementation points, also to specify their position accurately, and which also make it possible to count upon taking advantage of network resources effectively.

What is claimed is:

1. A node comprising:
   a transmission function for transferring data;
   a receiving function for receiving data;
   a unit for establishing and releasing a cut through path, through which a leading packet of burst data and a packet of the burst data subsequent to the leading packet are transferred in one stroke from a start point of the cut-through path to an end point of the cut-through path in the form of an optical signal without reading header information from the packets, to a next stage node; and
   a unit for detecting the arrival of the leading packet of burst data, and
   wherein the unit for establishing and releasing a cut through path comprises a unit for establishing the cut through path to the next stage node, when the arrival of the leading packet of the burst data is detected by the leading packet arrival detection unit.

2. A node according to claim 1, wherein the node is a transmission side edge node which accommodates a data transfer source or a relay node, each of which being provided in a network.

3. A node according to claim 2, wherein subsequent burst data amount information is written in the leading packet as header information, and
   wherein the leading packet arrival detection unit comprises a burst data leading packet arrival detection unit which refers to the subsequent burst data amount information.

4. A node according to claim 3, wherein the burst data amount information is packet number information or packet length information for packets subsequent to the leading packet.

5. A node according to claim 4, wherein a threshold value is set for the packet number information or the packet length information, and
   the burst data leading packet arrival detection unit comprises a unit which compares together the packet number information or the packet length information and the threshold value, and, if the packet number information or the packet length information is greater than the threshold value, detects the packet as a leading packet of burst data.

6. A node according to claim 5, further comprising:
   a unit which collects together processing load information at nodes, and
   a unit which sets the threshold value adaptively according to a relationship between the processing load information which has been collected together by the collection together unit, and a target value for processing load which is set in advance.

7. A node according to claim 6, wherein the unit for setting the threshold value adaptively comprises a unit which sets a target upper limit value and a target lower limit value for processing load, periodically collects together processing load information, makes a decision as to whether or not the value of the processing load information is between the target upper limit value and the target lower limit value, and: if the value of the processing load information which has been collected together is not between the target upper limit value and the target lower limit value and furthermore the value of the processing load information is smaller than the target lower limit value, increases the packet number n as threshold value by $\Delta n$ or increases the packet length L as threshold value by $\Delta L$, while if the value of the processing load information is greater than the target lower limit value, it reduces the packet number n as threshold value by $\Delta n$ or reduces the packet length L as threshold value by $\Delta L$.

8. A node according to claim 6, wherein the unit for setting the threshold value adaptively comprises a unit which sets a processing load target value, periodically collects together processing load information, compares together the processing load target value and the value of the processing load information, and: if the value of the processing load information is smaller than the processing load target value, increases the packet number n as threshold value by Δn or increases the packet length L as threshold value by ΔL, while if the value of the processing load information is greater than the processing load target value, it reduces the packet number n as threshold value by Δn or reduces the packet length L as threshold value by ΔL.

9. A node according to claim 1, wherein, upon a network, the leading packet arrival detection unit is provided with a unit which monitors the arrival of the leading packet at the transmission side edge node and relay nodes all together.

10. A node according to claim 9, wherein subsequent burst data amount information is written in the leading packet as header information, and
wherein the leading packet arrival detection unit comprises a burst data leading packet arrival detection unit which refers to the subsequent burst data amount information.

11. A node according to claim 10, wherein the burst data amount information is packet number information or packet length information for packets subsequent to the leading packet.

12. A node according to claim 11, wherein a threshold value is set for the packet number information or the packet length information, and
the burst data leading packet arrival detection unit comprises a unit which compares together the packet number information or the packet length information and the threshold value, and, if the packet number information or the packet length information is greater than the threshold value, detects the packet as a leading packet of burst data.

13. A node according to claim 12, further comprising:
a unit which collects together processing load information at nodes, and
a unit which sets the threshold value adaptively according to a relationship between the processing load information which has been collected together by the collection together unit, and a target value for processing load which is set in advance.

14. A node according to claim 13, wherein the unit for setting the threshold value adaptively comprises a unit which sets a target upper limit value and a target lower limit value for processing load, periodically collects together processing load information, makes a decision as to whether or not the value of the processing load information is between the target upper limit value and the target lower limit value, and: if the value of the processing load information which has been collected together is not between the target upper limit value and the target lower limit value and furthermore the value of the processing load information is smaller than the target lower limit value, increases the packet number n as threshold value by Δn or increases the packet length L as threshold value by ΔL, while if the value of the processing load information is greater than the target lower limit value, it reduces the packet number n as threshold value by Δn or reduces the packet length L as threshold value by ΔL.

15. A node according to claim 13, wherein the unit for setting the threshold value adaptively comprises a unit which sets a processing load target value, periodically collects together processing load information, compares together the processing load target value and the value of the processing load information, and: if the value of the processing load information is smaller than the processing load target value, increases the packet number n as threshold value by Δn or increases the packet length L as threshold value by ΔL, while if the value of the processing load information is greater than the processing load target value, it reduces the packet number n as threshold value by Δn or reduces the packet length L as threshold value by ΔL.

16. A node according to claim 1, wherein a unit for detecting the arrival of a final packet of burst data is provided, and
the unit for establishing and releasing a cut through path comprises a unit for, when the arrival of a final packet of burst data has been detected by the final packet arrival detection unit, releasing a cut through path which is established with a preceding stage node after the passage of the final packet.

17. A node according to claim 16, wherein the node is a transmission side edge node, a relay node, or a reception side edge node, each of which being provided in a network.

18. A node according to claim 16, wherein the final packet arrival detection unit comprises a unit for monitoring the arrival of the final packet at the transmission side edge node, the relay nodes, and the reception side edge node all together.

19. A node according to claim 16, wherein information which indicates that the packet is the final packet of burst data is written as header information into the final packet, and
the final packet arrival detection unit comprises a unit for detecting the final packet of burst data by referring to the information which indicates that the packet is the final packet.

20. A node according to claim 1, wherein the unit for establishing and releasing a cut through path comprises:
a unit for determining whether or not establishment of a cut through path to a next stage node is possible;
a unit for temporarily accumulating burst data which arrives if the determination result of the determination unit is that such establishment is impossible; and
an IP transfer unit which transfers individual packets which make up the burst data which have been accumulated by the temporary accumulation unit individually according to their IP addresses.

21. A node according to claim 20, wherein subsequent burst data amount information is written in the leading packet as header information, and
wherein the leading packet arrival detection unit comprises a burst data leading packet arrival detection unit which refers to the subsequent burst data amount information.

22. A node according to claim 21, wherein the burst data amount information is packet number information or packet length information for packets subsequent to the leading packet.

23. A node according to claim 20, wherein information which indicates that the packet is the final packet of burst data is written as header information into the final packet, and
the final packet arrival detection unit comprises a unit for detecting the final packet of burst data by referring to this information which indicates that the packet is the final packet.

24. A node according to claim 20, wherein the unit for determining whether or not establishment is possible comprises a unit for determining whether or not a vacant wavelength is available for establishing a cut through path to the next stage node, for determining the difference between the permissible transfer speed up to this node itself and the permissible transfer speed to the next stage node, and for determining the signal quality of the burst data.

25. A node according to claim 24, wherein the unit for establishing and releasing a cut through path comprises a unit for establishing a cut through path at a permissible transfer speed to the next stage node, and further comprising a unit for, when burst data, for which it has been determined by the unit for determining whether or not establishment is possible that establishment of a cut through path is not possible because the permissible transfer speed to the next stage node is smaller than the permissible transfer speed up to this node itself, is accumulated in the temporary accumulation unit, transferring to the next stage node, using the cut through path, the burst data which has been accumulated in the temporary accumulation unit while performing rate conversion upon the burst data in order to bring it equivalent to the permissible transfer speed to the next stage node.

26. A node according to claim 25, wherein the unit for establishing a cut through path at the permissible transfer speed to the next stage node comprises a unit for establishing a plurality of cut through paths to the next stage node, and
the node further comprising a unit for transferring the burst data which has been accumulated in the temporary accumulation unit to the next stage node while dispersing the burst data almost uniformly among the plurality of cut through paths.

27. A node according to claim 26, wherein the unit for establishing the cut through path at the permissible transfer speed to the next stage node comprises:
a calculation unit which divides the permissible transfer speed up to this node itself by the permissible transfer speed to the next stage node, and
a unit for establishing an integral number of cut through paths to the next stage node greater than or equal to the value of the division result provided by the calculation unit.

28. A node according to claim 24, wherein a unit is provided for, when it has been determined by the unit for determining whether or not establishment is possible that it is impossible to establish a cut through path because of deterioration of the signal quality of the leading packet of burst data which has arrived, notifying this fact to the preceding stage node, and further comprising a unit for performing 3R (Reshaping, Retiming, Regenerating) processing of burst data which arrives, according to notification by the notification unit.

29. A node according to claim 24, wherein the unit for establishing and releasing a cut through path comprises a unit for, when a next stage node is a node which is included in the most suitable route for transfer of the burst data, and it has been determined by the unit for determining whether or not establishment is possible that it is impossible to establish a cut through path because no vacant wavelength is available for establishing a cut through path to the next stage node, establishing a cut through path by substituting for the next stage node, as the node, a neighboring node which has a vacant wavelength for establishing a cut through path, irrespective of whether or not the neighboring node is included upon the most suitable route.

30. A node according to claim 24, wherein a unit is provided for, when a next stage node is a node which is included in the most suitable route for transfer of the burst data, and it has been determined by the unit for determining whether or not establishment is possible that it is impossible to establish a cut through path because no vacant wavelength is available for establishing a cut through path to the next stage node, notifying the preceding stage node of this fact, and
wherein the unit for establishing and releasing a cut through path of the preceding stage node which has received notification by the notification unit comprises a unit for establishing a cut through path by substituting for the next stage node, as the node, a neighboring node which has a vacant wavelength for establishing a cut through path, irrespective of whether or not the neighboring node is included upon the most suitable route.

31. A node according to claim 24, wherein:
when no vacant wavelength is available for establishing a cut through path to a next stage node, and it has been determined by the unit for determining whether or not establishment is possible that it is impossible to establish a cut through path, the individual packets which make up the burst data are transferred individually according to IP address by the IP transfer unit;
a storage unit is provided for storing cut through path request information which indicates that it is really wished to transfer the packets making up the burst data which are being transferred individually according to the IP address by a cut through path; and
wherein the cut through path establishment unit comprises a unit for: when a vacant wavelength for establishing a cut through path to the next stage node appears, and the decision result of the unit for determining whether or not establishment is possible transits from the decision that it is impossible to establish such cut through path to the decision that it is possible, establishing a cut through path for cut through transfer from partway through the burst data which is being transferred as individual packets according to the IP address, according to the cut through request information which is stored in the storage unit.

32. A node according to claim 20, wherein the unit for establishing and releasing a cut through path establishes a plurality of paths in advance between a plurality of preceding stage and next stage nodes, and
the node further comprising:
a unit for transmitting individually the same burst data upon the plurality of paths; and
a unit for discarding, among the same burst data which arrives individually from the plurality of paths, the received burst data other than those burst data which arrive most quickly.

33. A node according to claim 20, wherein the unit for establishing and releasing a cut through path comprises a unit for notifying the decision result of the decision unit to a preceding stage node.

34. A node according to claim 33, wherein the unit for establishing and releasing a cut through path establishes a plurality of paths in advance between a plurality of preceding stage and next stage nodes, and
the node further comprising:
a unit for, for paths among the plurality of paths for which, according to notification by the notification unit, the establishment of cut through paths has become impossible, stopping the transmission of the same burst data; and
a unit for discarding the burst data, if the same burst data is accumulated in its own temporary accumulation unit, and, if the arrival of the same burst data is interrupted for a predetermined time period.

35. A node according to claim 34, wherein the unit for establishing and releasing a cut through path further comprises a unit for, if, according to notification by the notification unit, the node itself is present upon a path other than the path for which the preceding stage node has succeeded in reception, stopping the transmission of the same burst data, and, if the same burst data is accumulated in its own the temporary accumulation unit, discarding the burst data.

36. A node according to claim 35, wherein the unit for establishing and releasing a cut through path further comprises a unit for stopping the transmission of the same burst data for paths other than the path for which the next stage node has succeeded in reception, according to notification by the notification unit.

37. A node according to claim 1, wherein a data base in which the circumstances of use of optical wavelengths are recorded is provided to the unit for establishing and releasing a cut through path, and:
the unit for establishing and releasing a cut through path comprises a unit for referring to the data base and establishing a cut through path via an optical wavelength which is not in use, and updating in the data base to 'in use' the circumstances of use of the optical wavelength which was used for the establishment of the cut through path; and
the unit for releasing the cut through path after the passage of the final packet comprises a unit for updating in the data base to 'vacant' the circumstances of use of the optical wavelength which has been released after the release of the cut through path.

38. A node according to claim 1, wherein the unit for establishing and releasing a cut through path comprises:
a unit for retaining burst data amount information for burst data being transferred by cut through paths which are already established;
a unit for, if wavelength resources are not available for newly establishing a cut through path for transferring burst data which has newly arrived, referring to the burst data amount information for the burst data which is being transferred by cut through paths which are already established, which is being retained in the retaining unit; and
a unit for establishing a cut through path for transferring the newly arrived burst data by comparing together the result of referring to the referring unit, and the burst data amount information for the burst data which has newly arrived, and releasing one or another of cut through paths through which is being transferred burst data of a smaller burst data amount than the burst data amount of the burst data which has newly arrived.

39. A node according to claim 1, wherein the unit for establishing and releasing a cut through path comprises:
a unit for, if wavelength resources are not available for newly establishing a cut through path for transferring burst data which has newly arrived, detecting the not yet transferred burst data amount of burst data being transferred by cut through paths which are already established; and
a unit for establishing a cut through path for transferring the burst data which has newly arrived by releasing one or another of cut through paths through which is being transferred burst data of which the not yet transferred burst data amount, according to the result of detection by the detection unit, is smaller than the burst data amount which is obtained by referring to the burst data amount information of the burst data which has newly arrived.

40. A node according to claim 1, further comprising a unit for, when the establishment of a cut through path by the unit for establishing and releasing a cut through path is impossible, accumulating for a predetermined time period burst data which arrives at the node for which the establishment has become impossible.

41. A node according to claim 40, wherein the unit for establishing and releasing a cut through path comprises a unit for, when establishment of a cut through path is impossible, retrying the establishment of the cut through path a predetermined number of times.

42. A node according to claim 40, further comprising an establishment request waiting information queue which, when establishment of cut through paths by the unit for establishing and releasing a cut through path is impossible, temporarily accumulates the cut through path establishment requests, and
wherein the unit for establishing and releasing a cut through path comprises a unit for retrying the establishment of the cut through path a predetermined number of times, in sequence from the leading establishment request of this queue.

43. A node according to claim 40, further comprising a unit which, when establishment of a cut through path by the unit for establishing and releasing a cut through path has not succeeded within the predetermined time period, transfers the packets which make up the burst data which have accumulated in the accumulation unit for the burst data over the predetermined time period according to their IP addresses, without using any cut through path.

44. A node according to claim 40, further comprising a unit which, when establishment of a cut through path by the unit for establishing and releasing a cut through path has not succeeded within the predetermined time period, discards burst data which have accumulated in the accumulation unit for the burst data over the predetermined time period.

45. A node according to claim 1, further comprising:
a unit for temporarily accumulating burst data which arrives, until establishment of a cut through path by the unit for establishing and releasing a cut through path has been completed; and
a unit for, when establishment of a cut through path by the unit for establishing and releasing a cut through path has been completed, transferring the burst data which has accumulated in the unit for temporarily accumulating burst data to the next stage node using the cut through path.

46. A node according to claim 45, wherein, if the transfer speed between a first node and a second node is termed $v1$, the transfer speed between a third node and a fourth node is termed $v2$, and the transfer speed between the second node and the fourth node is termed $v3$: if a communication path is used which is made up from the second node and the fourth node for which $v1 \leq v3$ and moreover $v2 \leq v3$, then the temporary accumulation unit is comprised in the second node.

47. A node according to claim 1, wherein the leading packet includes path information for establishing a cut through path from the transmission side edge node to the reception side edge node in advance.

48. A node according to claim 47, wherein the path information is wavelength information.

49. A node according to claim 47, wherein the path information is address information for the transmission side edge node, the relay nodes, and the reception side edge node.

50. A node according to claim 47, wherein:
a unit is provided for collecting together network topology information;
respective unit of a plurality of nodes are provided for notifying to the collection unit, wavelength resource information which they retain;
a unit is provided for writing the path information into a leading packet; and
the writing unit comprises a unit for referring to wavelength resource information for each node which has been collected together by the collecting unit and generating the path information.

51. A node according to claim 47, wherein:
respective unit are provided for mutually notifying to one another wavelength resource information which they retain;
a unit is provided for writing the path information into a leading packet; and
the writing unit comprises a unit for referring to wavelength resource information for each node which is retained by the transmission side edge node and generating the path information.

52. A node according to claim 1, further comprising, in the case of being used as a transmission side edge node, a unit for delaying the transmission of burst data following the leading packet by the sum of the cut through path establishment processing time periods at the plurality of the relay nodes which it is predicted that the cut through path established by leading packets which the node transmits itself will pass through.

53. A node according to claim 52, wherein the delay unit comprises:
a unit for predicting, based upon topology information for an optical communication network, the plurality of the relay nodes through which it is predicted that a cut through path established by a leading packet which has been transmitted by a preceding stage node will pass; and
a unit for calculating the sum of the respective cut through path establishment processing time periods for the plurality of relay nodes.

54. A node according to claim 53, further comprising a unit for, if being used as a relay node, notifying to the calculation unit statistical information relating to cut through path establishment processing time periods for past leading packets; and
wherein the calculation unit comprises a unit for calculating the sum of the cut through path establishment processing time periods, according to the statistical information which has been notified by the notification unit.

55. A node according to claim 53, further comprising:
a unit for periodically transmitting a route performance check packet towards a next stage node;
a unit for receiving the route performance check packet and for returning the route performance check packet back to the transmission side edge node of its transmission source; and
a unit for recording in a route performance check packet, when the route performance check packet has arrived, statistical information relating to cut through path establishment processing time periods for past leading packets; and
wherein the calculation unit comprises a unit for calculating the sum of the cut through path establishment processing time periods according to the statistical information which has been recorded in the route performance check packet.

56. A node according to claim 1, further comprising:
a unit for, before the establishment of a path, transmitting an optical packet for test upon the path which is scheduled for establishment;
a unit for receiving the optical packet for test and determining its signal quality;
a unit for, when the signal quality as determined by the determination unit deteriorates, notifying a preceding stage node to this fact; and
a unit for, when such a notification is received, thereafter performing 3R (Reshaping, Retiming, Regenerating) processing for optical packets via the path.

57. A computer-readable medium which stores a program which, by installation in an information processing device, provides the information processing device with:
a transmission function for transferring data and a receiving function for receiving data;
a function for establishing and releasing a cut through path, through which a leading packet of burst data and a packet of the burst data subsequent to the leading packet are transferred in one stroke from a start point of the cut-through path to an end point of the cut-through path in the form of an optical signal without reading header information from the packets, to a next stage node;
a function for detecting the arrival of the leading packet of the burst data; and
a function for establishing the cut through path to the next stage node, when the arrival of the leading packet of the burst data is detected by the function for detecting the arrival of a leading packet.

58. An optical communication network comprising:
a transmission side edge node which accommodates a data transfer source,
a reception side edge node which accommodates a data transfer destination, and
relay nodes which relay between the edge nodes,
wherein each of the nodes is provided with a function as described in claim 16.

* * * * *